(12) United States Patent
Li et al.

(10) Patent No.: US 11,469,843 B2
(45) Date of Patent: Oct. 11, 2022

(54) SYNCHRONIZATION METHOD AND APPARATUS

(71) Applicant: HUAWEI TECHNOLOGIES CO., LTD., Shenzhen (CN)

(72) Inventors: Yexing Li, Shanghai (CN); Yuan Wang, Shanghai (CN); Feng Yu, Beijing (CN); Yan Wang, Shanghai (CN); Qi Su, Shanghai (CN); Zhongping Chen, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 0 days.

(21) Appl. No.: 17/132,150

(22) Filed: Dec. 23, 2020

(65) Prior Publication Data

US 2021/0119717 A1    Apr. 22, 2021

Related U.S. Application Data

(63) Continuation of application No. PCT/CN2019/093123, filed on Jun. 26, 2019.

(30) Foreign Application Priority Data

Jun. 26, 2018  (CN) .......................... 201810672083.7
Oct. 8, 2018   (CN) .......................... 201811168721.8

(51) Int. Cl.
*H04J 3/06*     (2006.01)
*H04W 56/00*    (2009.01)

(52) U.S. Cl.
CPC ......... *H04J 3/0667* (2013.01); *H04W 56/001* (2013.01)

(58) Field of Classification Search
None
See application file for complete search history.

(56) References Cited

U.S. PATENT DOCUMENTS

| 7,876,791 | B2 * | 1/2011 | Jung | ..................... H04J 3/0667 |
| | | | | 370/503 |
| 8,023,976 | B2 * | 9/2011 | Shao | ................. H04W 56/0065 |
| | | | | 455/502 |
| 8,290,523 | B2 * | 10/2012 | Shao | ................. H04W 56/0015 |
| | | | | 455/502 |

(Continued)

FOREIGN PATENT DOCUMENTS

| CN | 101175014 A | 5/2008 |
| CN | 102480331 A | 5/2012 |

(Continued)

OTHER PUBLICATIONS

ETSI GS NGP 008 V 0.0.3 (Jun. 2018), Next Generation Protocols (NGP); Mobile Deterministic Networking, 22 pages.

(Continued)

*Primary Examiner* — Alpus Hsu
(74) *Attorney, Agent, or Firm* — Womble Bond Dickinson (US) LLP

(57) ABSTRACT

A synchronization method and an apparatus are provided to meet a time precision requirement of an industrial factory in a scenario in which a mobile network is connected to an Ethernet network. In an embodiment, a first device determines seventh timestamp information by using timestamp information of receiving and sending packets in a mobile network, so that a second device calculates a time offset between the first device and the second device based on the seventh timestamp information and time points of receiving and sending packets in an Ethernet network, to perform time synchronization. In the method, impact of a transmission delay between the first device and the second device can be avoided, so that a time precision requirement of an industrial factory can be met in a scenario in which the mobile network is connected to the Ethernet network.

20 Claims, 22 Drawing Sheets

(56) References Cited

U.S. PATENT DOCUMENTS

| | | | | |
|---|---|---|---|---|
| 8,489,776 | B2* | 7/2013 | Lynch | H04J 3/0667 |
| | | | | 713/400 |
| 8,660,152 | B2* | 2/2014 | Fourcand | H04J 3/0682 |
| | | | | 370/509 |
| 9,665,121 | B2* | 5/2017 | Aweya | G06F 1/10 |
| 10,341,083 | B2* | 7/2019 | Mayer | H04J 3/0667 |
| 10,348,429 | B2* | 7/2019 | Galea | H04W 56/001 |
| 2013/0173950 | A1 | 7/2013 | Banerjea et al. | |
| 2015/0341881 | A1* | 11/2015 | Hiltunen | H04W 56/005 |
| | | | | 370/350 |
| 2017/0048671 | A1* | 2/2017 | Marri Sridhar | H04W 56/001 |
| 2017/0237512 | A1* | 8/2017 | Galea | H04J 3/0644 |
| | | | | 370/350 |
| 2018/0076886 | A1* | 3/2018 | Mehrvar | H04B 10/40 |
| 2018/0338265 | A1* | 11/2018 | Goel | H04W 40/12 |
| 2019/0190635 | A1* | 6/2019 | Goel | H04J 3/0644 |
| 2019/0357165 | A1* | 11/2019 | Koelemeij | H04W 56/006 |
| 2021/0058181 | A1* | 2/2021 | Dwivedi | H04J 3/0667 |

FOREIGN PATENT DOCUMENTS

| | | |
|---|---|---|
| CN | 103475461 A | 12/2013 |
| CN | 104115432 A | 10/2014 |
| CN | 106656387 A | 5/2017 |
| CN | 107113073 A | 8/2017 |
| EP | 3235156 A1 | 10/2017 |
| WO | 2016037259 A1 | 3/2016 |
| WO | 2016095972 A1 | 6/2016 |

OTHER PUBLICATIONS

Huawei, HiSilicon, Discussion on the motivation of High Accuracy Time Synchronization for URLLC. 3GPP TSG RAN WGI Meeting #92bis, Sanya, China, Apr. 16-Apr. 20, 2018, R1-1804429, 7 pages.
3GPP TR 22 821 V16.1.0 3rd Generation Partnership Project; Technical Specification Group Services and System Aspects; Feasibility Study on LAN Support in 5G (Release 16) Jun. 2018 total 52 pages.
3GPP TS 22.281 V15.1 0 (Dec. 2017);3rd Generation Partnership Project Technical Specification Group Services and System Aspects;Mission Critical Video services(Release 15);total 31 pages.
IEEE Std 802.1AS™-2011,IEEE Standard for Local and metropolitan area networks—Timing and Synchronization for Time-Sensitive Applications in Bridged Local Area Networks,IEEE Computer Society,Sponsored by the LAN/MAN Standards Committee,Mar. 30, 2011,total 292 pages.

* cited by examiner

SYNCHRONIZATION METHOD AND APPARATUS

CROSS-REFERENCE TO RELATED APPLICATIONS

This application is a continuation of International Patent Application No. PCT/CN2019/093123, filed on Jun. 26, 2019, which claims priority to Chinese Patent Application No. 201811168721.8 filed on Oct. 8, 2018 and Chinese Patent Application No. 201810672083.7 filed on Jun. 26, 2018. All of the aforementioned patent applications are hereby incorporated by reference in their entireties.

TECHNICAL FIELD

This application relates to the field of communications technologies, and in particular, to a synchronization method and an apparatus.

BACKGROUND

A master clock selection and negotiation algorithm, a path delay calculation and compensation mechanism, and a clock frequency matching and adjustment mechanism are defined in the IEEE 802.1AS protocol. Communications devices exchange standard Ethernet messages, to synchronize times of all nodes in a network with a common master clock. This defines a precise clock synchronization system in a broad sense. For example, the 802.1AS protocol defines that network-wide synchronization is implemented in a hop-by-hop synchronization manner. For example, a master clock node (referred to as a master below) starts to send an 802.1AS synchronization packet to a neighboring node (referred to as a slaver below). After each slaver performs clock synchronization with reference to the master, the slaver serves as a master to exchange the 802.1AS synchronization packet with a neighboring node, and obtains a time offset and/or a frequency offset between a master clock and a slave clock through calculation to implement clock synchronization.

For example, an 802.1AS time synchronization mechanism is as follows: The master and the slaver send 802.1AS packets to each other, and calculate a time offset based on time points of receiving and sending packets by the master and time points of receiving and sending packets by the slaver. However, when the master sends a packet to the slaver and the slaver sends a packet to the master, there is an unknown transmission delay. Therefore, a transmission delay needs to be considered during calculation of the time offset. 802.1AS time synchronization is implemented based on the same delay for receiving and sending packets. For example, precise time synchronization can be implemented only when transmission delays are the same. In an existing fixed network, two adjacent nodes are directly connected through a cable, and a transmission delay does not exceed μs. Therefore, precision of the 802.1AS protocol in the fixed network can reach μs. This meets a requirement.

An 802.1AS frequency synchronization mechanism is as follows: The master sends 802.1AS packets to the slaver at two different time points. The slaver calculates a frequency offset based on the two sending time points of the master and two receiving time points. Similarly, an 802.1AS frequency synchronization principle is as follows: precise frequency synchronization can be implemented only when delays in two times of packet transmission are the same. Therefore, a requirement can be met in the fixed network.

Currently, the IEEE 802.1AS protocol is widely used. For example, a time sensitive network (TSN) is an Ethernet network in an industrial factory. To meet a high-precision clock synchronization requirement in the industrial factory, the 802.1AS protocol is used as a protocol specification for clock synchronization in the TSN. However, in an actual industrial factory scenario, a mobile network needs to be connected to the TSN, and the mobile network is used as a segment of a transmission path to provide a communications service for the industrial factory. Therefore, the mobile network also needs to support the 802.1AS protocol. However, when two adjacent nodes (for example, a terminal device and a user plane network element) in the TSN perform clock synchronization, a packet passes through a multi-hop device (for example, an access device) in the mobile network in a transmission process. Therefore, co-directional transmission delays and round-trip transmission delays of packets transmitted between the two adjacent nodes may be different. Therefore, the 802.1AS synchronization mechanism cannot be met, and consequently a time precision requirement of the industrial factory cannot be met.

SUMMARY

This application provides a synchronization method and apparatus, to meet a time precision requirement of an industrial factory in a scenario in which a mobile network is connected to an Ethernet network (for example, a TSN).

According to a first aspect, this application provides a synchronization method.

First, a first device sends a first packet to an access device, where the first packet carries first timestamp information, and determines second timestamp information, where the first timestamp information is a moment that is in an Ethernet network and at which the first device sends the first packet, and the second timestamp information is a moment that is in a mobile network and at which the first device sends the first packet. Then, the first device receives a second packet from an access device, where the second packet carries third timestamp information and fourth timestamp information, the third timestamp information is a moment that is in the mobile network and at which a second device receives a third packet sent by the access device to the second device based on the first packet, the fourth timestamp information is a moment that is in the mobile network and at which the second device sends a fourth packet to the access device, and the second packet is sent by the access device to the first device based on the fourth packet. Subsequently, the first device determines fifth timestamp information and sixth timestamp information, where the fifth timestamp information is a moment that is in the Ethernet network and at which the first device receives the second packet, and the sixth timestamp information is a moment that is in the mobile network and at which the first device receives the second packet. Finally, the first device determines seventh timestamp information based on the second timestamp information, the third timestamp information, the fourth timestamp information, the fifth timestamp information, and the sixth timestamp information, and the first device forwards the seventh timestamp information to the second device by using the access device. The first device is a user plane network element and the second device is a terminal device, or the first device is a terminal device and the second device is a user plane network element.

According an embodiment, the first device determines the seventh timestamp information by using timestamp information of receiving and sending packets in the mobile network, so that the second device calculates a time offset between the first device and the second device based on the seventh timestamp information and time points of receiving and sending packets in the Ethernet network, to perform time synchronization. In the method, impact of a transmission delay between the first device and the second device can be avoided, so that a time precision requirement of an industrial factory can be met in a scenario in which the mobile network is connected to the Ethernet network.

In an embodiment, a method in which the first device determines the seventh timestamp information based on the second timestamp information, the third timestamp information, the fourth timestamp information, the fifth timestamp information, and the sixth timestamp information may be: After determining a round-trip transmission delay difference between the first device and the second device based on the second timestamp information, the third timestamp information, the fourth timestamp information, and the sixth timestamp information, the first device calculates a sum of the moment corresponding to the fifth timestamp information and the round-trip transmission delay difference, to obtain the seventh timestamp information.

According to an embodiment, the first device may accurately obtain the seventh timestamp information, so that the second device calculates a time offset between the first device and the second device based on the seventh timestamp information and time points of receiving and sending packets in the Ethernet network, to perform time synchronization.

In an embodiment, after determining the second timestamp information, the first device locally records the second timestamp information, so that the first device subsequently calculates the round-trip transmission delay difference between the first device and the second device. In this way, the first device may subsequently obtain the seventh timestamp information by using the recorded second timestamp information.

In an embodiment, after receiving the second packet from the access device, the first device extracts the third timestamp information and the fourth timestamp information that are carried in a first protocol field included in the second packet.

According to the method, the first device may subsequently determine the seventh timestamp information by using the third timestamp information and the fourth timestamp information.

In an embodiment, the first protocol field may be an existing protocol field, or may be a newly added protocol field in an existing protocol stack framework. For example, if the first protocol field is the existing protocol field, when the first device is the user plane network element, the first protocol field may be a general packet radio service (GPRS) tunneling protocol (GTP) field. When the first device is the terminal device, the first protocol field may be a service data protocol (SDAP) field or a packet data convergence protocol (PDCP) field. For another example, when the first protocol field is the newly added protocol field, the first protocol field may be a NEW field.

According to the method, the access device may use the protocol field in the packet to carry the third timestamp information and the fourth timestamp information, to send the third timestamp information and the fourth timestamp information to the first device.

In an embodiment, there may be the following three cases in which after receiving the second packet from the access device, the first device extracts the third timestamp information and the fourth timestamp information that are carried in the first protocol field included in the second packet.

Case 1: The first device extracts the third timestamp information and the fourth timestamp information from the GTP field. In this case, the first device is the user plane network element.

Case 2: The first device extracts the third timestamp information and the fourth timestamp information from the SDAP field or the PDCP field. In this case, the first device is the terminal device.

Case 3: The first device extracts the third timestamp information and the fourth timestamp information from the NEW field. In this case, the first device is the terminal device or the user plane network element.

According to the method, the first device can accurately obtain the third timestamp information and the fourth timestamp information.

According to a second aspect, this application further provides a synchronization method.

After receiving a first packet from a first device, an access device sends a third packet to a second device based on the first packet, where the first packet carries first timestamp information, the first timestamp information is a moment that is in an Ethernet network and at which the first device sends the first packet, and the third packet carries the first timestamp information. After receiving a fourth packet from the second device, the access device sends a second packet to the first device, where the fourth packet carries third timestamp information and fourth timestamp information, the third timestamp information is a moment that is in a mobile network and at which the second device receives the third packet, the fourth timestamp information is a moment that is in the mobile network and at which the second device sends the fourth packet to the access device, and the second packet carries the third timestamp information and the fourth timestamp information. The access device receives seventh timestamp information from the first device, and sends the seventh timestamp information to the second device. The first device is a user plane network element and the second device is a terminal device, or the first device is a terminal device and the second device is a user plane network element.

According to an embodiment, the access device transmits timestamp information required for clock synchronization to the first device and the second device, to complete clock synchronization.

In an embodiment, a method in which the access device sends the second packet to the first device may be: When detecting that a second protocol field included in the fourth packet carries the third timestamp information and the fourth timestamp information, the access device encapsulates the third timestamp information and the fourth timestamp information in a first protocol field included in the fourth packet to generate the second packet, and sends the second packet to the first device.

According to the method, the access device may successfully send the third timestamp information and the fourth timestamp information to the first device, so that the first device determines the seventh timestamp information.

In an embodiment, before encapsulating the third timestamp information and the fourth timestamp information in the first protocol field included in the fourth packet, the access device extracts the third timestamp information and the fourth timestamp information that are carried in the second protocol field included in the fourth packet.

In an embodiment, the first protocol field may be an existing protocol field, or may be a newly added protocol field (for example, a NEW field) in an existing protocol stack framework. The second protocol field may alternatively be an existing protocol field, or may be a newly added protocol field (for example, a NEW field) in an existing protocol stack framework.

In an embodiment, when the first device is the user plane network element, the second protocol field is a SDAP field or a PDCP field, and the first protocol field is a GTP field. When the first device is the terminal device, the second protocol field is a GTP field, and the first protocol field is an SDAP field or a PDCP field.

According to a third aspect, this application further provides a synchronization method.

A second device receives a third packet from an access device, where the third packet carries first timestamp information, the first timestamp information is a moment that is in an Ethernet network and at which a first device sends a first packet, and the third packet is sent by the access device based on the first packet after the access device receives the first packet from the first device. The first device is a user plane network element and the second device is a terminal device, or the first device is a terminal device and the second device is a user plane network element. Then, the second device determines third timestamp information and eighth timestamp information, where the third timestamp information is a moment that is in a mobile network and at which the second device receives the third packet, and the eighth timestamp information is a moment that is in the Ethernet network and at which the second device receives the third packet. The second device sends a fourth packet to the access device, where the fourth packet carries the third timestamp information and fourth timestamp information, and the fourth timestamp information is a moment that is in the mobile network and at which the second device sends the fourth packet to the access device. Then, the second device determines ninth timestamp information, where the ninth timestamp information is a moment that is in the Ethernet network and at which the second device sends the fourth packet to the access device. Finally, the second device receives seventh timestamp information from the access device; and determines a time offset between the first device and the second device based on the first timestamp information, the eighth timestamp information, the ninth timestamp information, and the seventh timestamp information, and performs time synchronization based on the time offset.

According to an embodiment, the second device calculates the time offset between the first device and the second device based on the seventh timestamp information and time points of receiving and sending packets in the Ethernet network, to perform time synchronization. In the method, impact of a transmission delay between the first device and the second device can be avoided, so that a time precision requirement of an industrial factory can be met in a scenario in which the mobile network is connected to the Ethernet network.

In an embodiment, the second device determines, based on the seventh timestamp information, a moment that is in the Ethernet network and at which the first device receives the second packet, where the second packet is sent by the access device to the first device based on the fourth packet. In this way, the second device may perform time synchronization based on the seventh timestamp information.

In an embodiment, that the fourth packet carries the third timestamp information and fourth timestamp information is: The second device uses a second protocol field included in the fourth packet to carry the third timestamp information and the fourth timestamp information. In this way, the second device can successfully transmit the third timestamp information and the fourth timestamp information to the access device.

In an embodiment, the second protocol field may be an existing protocol field, or may be a newly added protocol field (for example, a NEW field) in an existing protocol stack framework.

In an embodiment, when the second device is the terminal device, the second protocol field is a SDAP field or a PDCP field. When the second device is the user plane network element, the second protocol field is a GTP field.

According to a fourth aspect, this application further provides a synchronization method.

A first device sends a first packet to an access device, where the first packet carries first timestamp information and second timestamp information, the first timestamp information is a moment that is in an Ethernet network and at which the first device sends the first packet, and the second timestamp information is a moment that is in a mobile network and at which the first device sends the first packet. Then, the first device receives a second packet from the access device, and determines third timestamp information and fourth timestamp information, where the third timestamp information is a moment that is in the Ethernet network and at which the first device receives the second packet, and the fourth timestamp information is a moment that is in the mobile network and at which the first device receives the second packet. Finally, the first device sends the third timestamp information and the fourth timestamp information to the access device, where the first timestamp information, the second timestamp information, the third timestamp information, and the fourth timestamp information are used for time synchronization. The first device is a user plane network element and a second device is a terminal device, or the first device is a terminal device and a second device is a user plane network element.

According to an embodiment, the first device sends, to the second device, timestamp information of receiving and sending packets in the mobile network, so that the second device calculates a time offset between the first device and the second device by using the timestamp information of receiving and sending the packets in the mobile network and timestamp information of receiving and sending packets in the Ethernet network, to perform time synchronization. Impact of a transmission delay between the first device and the second device can be avoided, so that a time precision requirement of an industrial factory can be met in a scenario in which the mobile network is connected to the Ethernet network.

In an embodiment, that the first packet carries second timestamp information may be: The first device uses a first protocol field included in the first packet to carry the second timestamp information.

According to an embodiment, the first device can successfully transmit the second timestamp information to the access device, so that the access device subsequently transmits the second timestamp information to the second device.

In an embodiment, the first protocol field may be an existing protocol field, or may be a newly added protocol field (for example, a NEW field) in an existing protocol stack framework.

In an embodiment, when the first device is the user plane network element, the first protocol field is a GTP field. When the first device is the terminal device, the first protocol field is a field or a PDCP field.

According to a fifth aspect, this application further provides a synchronization method.

After receiving a first packet from a first device, an access device sends a third packet to a second device based on the first packet, where the first packet carries first timestamp information and second timestamp information, the first timestamp information is a moment that is in an Ethernet network and at which the first device sends the first packet, the second timestamp information is a moment that is in a mobile network and at which the first device sends the first packet, and the third packet carries the first timestamp information and the second timestamp information. The access device receives a fourth packet from the second device, and sends a second packet to the first device based on the fourth packet. The access device receives third timestamp information and fourth timestamp information from the first device, where the third timestamp information is a moment that is in the Ethernet network and at which the first device receives the second packet, and the fourth timestamp information is a moment that is in the mobile network and at which the first device receives the second packet. The access device sends the third timestamp information and the fourth timestamp information to the second device, where the first timestamp information, the second timestamp information, the third timestamp information, and the fourth timestamp information are used for time synchronization. The first device is a user plane network element and the second device is a terminal device, or the first device is a terminal device and the second device is a user plane network element.

According to an embodiment, the access device transmits timestamp information required for clock synchronization to the first device and the second device, to complete clock synchronization.

In an embodiment, a method in which the access device sends the third packet to the second device based on the first packet may be: When the access device detects that a first protocol field included in the first packet includes the second timestamp information, the access device encapsulates the second timestamp information in a second protocol field included in the first packet to generate the third packet, and sends the third packet to the second device.

According to an embodiment, the access device may successfully send the second timestamp information to the second device, so that the second device performs clock synchronization.

In an embodiment, the first protocol field may be an existing protocol field, or may be a newly added protocol field (for example, a NEW field) in an existing protocol stack framework. The second protocol field may alternatively be an existing protocol field, or may be a newly added protocol field (for example, a NEW field) in an existing protocol stack framework.

In an embodiment, when the first device is the user plane network element, and the second device is the terminal device, the first protocol field is a GTP field, and the second protocol field is a service data protocol SDAP field or a PDCP field. When the first device is the terminal device, and the second device is the user plane network element, the first protocol field is an SDAP field or a PDCP field, and the second protocol field is a GTP field.

According to a sixth aspect, this application further provides a synchronization method.

A second device receives a third packet from an access device, where the third packet carries first timestamp information and second timestamp information, the first timestamp information is a moment that is in an Ethernet network and at which a first device sends a first packet, the second timestamp information is a moment that is in a mobile network and at which the first device sends the first packet, and the third packet is sent by the access device based on the first packet after the access device receives the first packet from the first device. The second device determines fifth timestamp information and sixth timestamp information, where the fifth timestamp information is a moment that is in the Ethernet network and at which the second device receives the third packet, and the sixth timestamp information is a moment that is in the mobile network and at which the second device receives the third packet. The second device sends a fourth packet to the access device, and determines seventh timestamp information and eighth timestamp information, where the seventh timestamp information is a moment that is in the Ethernet network and at which the second device sends the fourth packet to the access device, and the eighth timestamp information is a moment that is in the mobile network and at which the second device sends the fourth packet to the access device. The second device receives third timestamp information and fourth timestamp information from the access device, where the third timestamp information is a moment that is in the Ethernet network and at which the first device receives a second packet, the fourth timestamp information is a moment that is in the mobile network and at which the first device receives the second packet, and the second packet is sent by the access device to the first device based on the fourth packet. The second device determines a time offset between the first device and the second device based on the first timestamp information, the second timestamp information, the sixth timestamp information, the eighth timestamp information, the third timestamp information, the fourth timestamp information, the fifth timestamp information, and the seventh timestamp information, and performs time synchronization based on the time offset. The first device is a user plane network element and the second device is a terminal device, or the first device is a terminal device and the second device is a user plane network element.

According to an embodiment, the second device calculates the time offset between the first device and the second device by using timestamp information of receiving and sending packets in the mobile network and timestamp information of receiving and sending packets in the Ethernet network, to perform time synchronization. In the method, impact of a transmission delay between the first device and the second device can be avoided, so that a time precision requirement of an industrial factory can be met in a scenario in which the mobile network is connected to the Ethernet network.

In an embodiment, a method in which the second device determines the time offset between the first device and the second device based on the first timestamp information, the second timestamp information, the sixth timestamp information, the eighth timestamp information, the third timestamp information, the fourth timestamp information, the fifth timestamp information, and the seventh timestamp information may be: The second device determines a round-trip transmission delay difference between the first device and the second device based on the second timestamp information, the sixth timestamp information, the eighth timestamp information, and the fourth timestamp information. The second device determines the time offset between the first device and the second device based on the first timestamp information, the third timestamp information, the fifth timestamp information, the seventh timestamp information, and the round-trip transmission delay difference.

According to the method, the second device may determine the round-trip transmission delay difference between the first device and the second device, to determine the time offset between the first device and the second device.

In an embodiment, a method in which the second device determines the time offset between the first device and the second device based on the first timestamp information, the third timestamp information, the fifth timestamp information, the seventh timestamp information, and the round-trip transmission delay difference may be: The second device determines ninth timestamp information, where the ninth timestamp information is a sum of the moment corresponding to the third timestamp information and the round-trip transmission delay difference. Then, the second device determines the time offset between the first device and the second device based on the first timestamp information, the fifth timestamp information, the seventh timestamp information, and the ninth timestamp information.

According to an embodiment, the second device can accurately determine the time offset between the first device and the second device, so that the second device performs time synchronization based on the time offset.

In an embodiment, after the second device receives the third packet from the access device, the second device extracts the second timestamp information carried in a second protocol field included in the third packet.

In an embodiment, the second protocol field may be an existing protocol field, or may be a newly added protocol field (for example, a NEW field) in an existing protocol stack framework.

In an embodiment, if the second protocol field is the existing protocol field, when the second device is the terminal device, the second protocol field is a SDAP field or a PDCP field. When the second device is the user plane network element, the second protocol field is a GTP field.

According to a seventh aspect, this application further provides a synchronization method.

A first device sends a first packet to an access device, where the first packet carries first timestamp information and second timestamp information, the first timestamp information is a moment that is in an Ethernet network and at which the first device sends the first packet, and the second timestamp information is a moment that is in a mobile network and at which the first device sends the first packet. Then, the first device sends a second packet to the access device, where the second packet carries third timestamp information and fourth timestamp information, the third timestamp information is a moment that is in the Ethernet network and at which the first device sends the second packet, and the fourth timestamp information is a moment that is in the mobile network and at which the first device sends the second packet. The first device is a user plane network element and a second device is a terminal device, or the first device is a terminal device and a second device is a user plane network element.

According to an embodiment, the first device sends a packet to the second device, so that the second device calculates a frequency offset between the first device and the second device by using time points of receiving and sending packets in the mobile network and time points of receiving and sending packets in the Ethernet network during packet transmission initiated by the first device, to perform frequency synchronization. Impact of a transmission delay between the first device and the second device can be avoided, so that a time precision requirement of an industrial factory can be met in a scenario in which the mobile network is connected to the Ethernet network.

In an embodiment, that the first packet carries second timestamp information may be: The first device uses a first protocol field included in the first packet to carry the second timestamp information.

According to the method, the first device can successfully transmit the second timestamp information to the access device, so that the access device subsequently transmits the second timestamp information to the second device.

In an embodiment, the first protocol field may be an existing protocol field, or may be a newly added protocol field (for example, a NEW field) in an existing protocol stack framework.

In an embodiment, when the first device is the user plane network element, the first protocol field is a general packet radio service GPRS tunneling protocol GTP field. When the first device is the terminal device, the first protocol field is a service data protocol SDAP field or a data convergence protocol PDCP field.

In an embodiment, that the second packet carries fourth timestamp information may be: The first device uses a second protocol field included in the second packet to carry the fourth timestamp information.

According to an embodiment, the first device can successfully transmit the fourth timestamp information to the access device, so that the access device subsequently transmits the fourth timestamp information to the second device.

In an embodiment, the second protocol field may be an existing protocol field, or may be a newly added protocol field (for example, a NEW field) in an existing protocol stack framework.

In an embodiment, when the first device is the user plane network element, the second protocol field is a general packet radio service GPRS tunneling protocol GTP field. When the first device is the terminal device, the second protocol field is a service data protocol SDAP field or a data convergence protocol PDCP field.

According to an eighth aspect, this application further provides a synchronization method.

An access device receives a first packet from a first device, and sends a third packet to a second device based on the first packet, where the first packet carries first timestamp information and second timestamp information, the first timestamp information is a moment that is in an Ethernet network and at which the first device sends the first packet, the second timestamp information is a moment that is in a mobile network and at which the first device sends the first packet, and the third packet carries the first timestamp information and the second timestamp information. Then, the access device receives a second packet from the first device, and sends a fourth packet to the second device based on the second packet, where the second packet carries third timestamp information and fourth timestamp information, the third timestamp information is a moment that is in the Ethernet network and at which the first device sends the second packet, the fourth timestamp information is a moment that is in the mobile network and at which the first device sends the second packet, and the fourth packet carries the third timestamp information and the fourth timestamp information. The first device is a user plane network element and the second device is a terminal device, or the first device is a terminal device and the second device is a user plane network element.

According to an embodiment, the access device transmits timestamp information required for clock synchronization to the first device and the second device, to complete clock synchronization.

In an embodiment, a method in which the access device sends the third packet to the second device based on the first packet may be: When the access device detects that a first protocol field included in the first packet includes the second timestamp information, the access device encapsulates the second timestamp information in a third protocol field included in the first packet to generate the third packet, and sends the third packet to the second device.

According to an embodiment, the access device may successfully send the second timestamp information to the second device, so that the second device performs clock synchronization.

In an embodiment, before the access device encapsulates the second timestamp information in the third protocol field included in the first packet, the access device extracts the second timestamp information included in a first protocol field included in the first packet.

In an embodiment, the first protocol field may be an existing protocol field, or may be a newly added protocol field (for example, a NEW field) in an existing protocol stack framework. The third protocol field may alternatively be an existing protocol field, or may be a newly added protocol field (for example, a NEW field) in an existing protocol stack framework.

In an embodiment, when the first device is the user plane network element and the second device is the terminal device, the first protocol field is a GTP field, and the third protocol field is a SDAP field or a PDCP field. When the first device is the terminal device and the second device is the user plane network element, the first protocol field is an SDAP field or a PDCP field, and the third protocol field is a GTP field.

In an embodiment, a method in which the access device sends the fourth packet to the second device based on the second packet may be: When the access device detects that a second protocol field included in the second packet includes the fourth timestamp information, the access device encapsulates the fourth timestamp information in a fourth protocol field in the second packet to generate the fourth packet, and sends the fourth packet to the second device.

According to the method, the access device may successfully send the fourth timestamp information to the second device, so that the second device performs clock synchronization.

In an embodiment, before the access device encapsulates the fourth timestamp information in the fourth protocol field included in the second packet, the access device extracts the second timestamp information included in the second protocol field included in the second packet.

In an embodiment, the fourth protocol field may be an existing protocol field, or may be a newly added protocol field (for example, a NEW field) in an existing protocol stack framework. The second protocol field may alternatively be an existing protocol field, or may be a newly added protocol field (for example, a NEW field) in an existing protocol stack framework.

In an embodiment, when the first device is the user plane network element and the second device is the terminal device, the second protocol field is a GTP field, and the fourth protocol field is a SDAP field or a PDCP field. When the first device is the terminal device and the second device is the user plane network element, the second protocol field is an SDAP field or a PDCP field, and the fourth protocol field is a GTP field.

According to a ninth aspect, this application further provides a synchronization method.

A second device receives a third packet from an access device, where the third packet carries first timestamp information and second timestamp information, the first timestamp information is a moment that is in an Ethernet network and at which a first device sends a first packet to the access device, the second timestamp information is a moment that is in a mobile network and at which the first device sends the first packet to the access device, and the third packet is sent by the access device to the second device based on the first packet.

The second device determines fifth timestamp information and sixth timestamp information, where the fifth timestamp information is a moment that is in the Ethernet network and at which the second device receives the third packet, and the sixth timestamp information is a moment that is in the mobile network and at which the second device receives the third packet. The second device receives a fourth packet from the access device, where the fourth packet carries third timestamp information and fourth timestamp information, the third timestamp information is a moment that is in the Ethernet network and at which the first device sends a second packet to the access device, the fourth timestamp information is a moment that is in the mobile network and at which the first device sends the second packet to the access device, and the fourth packet is sent by the access device to the second device based on the second packet. The second device determines seventh timestamp information and eighth timestamp information, where the seventh timestamp information is a moment that is in the Ethernet network and at which the second device receives the fourth packet, and the eighth timestamp information is a moment that is in the mobile network and at which the second device receives the fourth packet. The second device determines a frequency offset between the first device and the second device based on the first timestamp information, the second timestamp information, the third timestamp information, the fourth timestamp information, the fifth timestamp information, the sixth timestamp information, the seventh timestamp information, and the eighth timestamp information, and performs frequency synchronization based on the frequency offset. The first device is a user plane network element and the second device is a terminal device, or the first device is a terminal device and the second device is a user plane network element.

According to an embodiment, the second device calculates the frequency offset between the first device and the second device by using time points of receiving and sending packets in the mobile network and time points of receiving and sending packets in the Ethernet network during packet transmission initiated by the first device, to perform frequency synchronization. In the method, impact of a transmission delay between the first device and the second device can be avoided, so that a clock precision requirement of an industrial factory can be met in a scenario in which the mobile network is connected to the Ethernet network.

In an embodiment, a method in which the second device determines the frequency offset between the first device and the second device based on the first timestamp information, the second timestamp information, the third timestamp information, the fourth timestamp information, the fifth timestamp information, the sixth timestamp information, the seventh timestamp information, and the eighth timestamp information may be: The second device determines a first difference between the moment corresponding to the sixth timestamp information and the moment corresponding to the second timestamp information, and determines a second difference between the moment corresponding to the eighth timestamp information and the moment corresponding to the fourth timestamp information. The second device determines the frequency offset between the first device and the second device based on the first timestamp information, the third timestamp information, the fifth timestamp information, the seventh timestamp information, the first difference, and the second difference.

According to the method, the second device can accurately determine the frequency offset between the first device and the second device.

In an embodiment, a method in which the second device determines the frequency offset between the first device and the second device based on the first timestamp information, the third timestamp information, the fifth timestamp information, the seventh timestamp information, the first difference, and the second difference may be:

The second device determines a value relationship between the first difference and the second difference.

When the second device determines that the second difference is less than the first difference, the second device determines that the frequency offset is a quotient of a first value and a second value, where the first value is a difference between the moment corresponding to the third timestamp information and the moment corresponding to the first timestamp information, the second value is a value obtained by adding a third value to a difference between the moment corresponding to the seventh timestamp information and the moment corresponding to the fifth timestamp information, the third value is a product value of a fourth value and a fifth value, the fourth value is a value obtained by subtracting the second difference from the first difference, and the fifth value is a value obtained by dividing the difference between the moment corresponding to the seventh timestamp information and the moment corresponding to the fifth timestamp information by a difference between the moment corresponding to the eighth timestamp information and the moment corresponding to the sixth timestamp information.

When the second device determines that the second difference is greater than the first difference, the second device determines that the frequency offset is a quotient of a first value and a sixth value, where the sixth value is a value obtained by subtracting a seventh value from a difference between the moment corresponding to the seventh timestamp information and the moment corresponding to the fifth timestamp information, the seventh value is a product value of an eighth value and a fifth value, and the eighth value is a value obtained by subtracting the first difference from the second difference.

According to the method, the second device can accurately determine the frequency offset between the first device and the second device, to perform frequency synchronization.

According to a tenth aspect, this application further provides a synchronization method.

After determining first timestamp information, a first device sends a first packet to an access device, where the first packet carries the first timestamp information, the first timestamp information is a difference between a moment corresponding to second timestamp information and a moment corresponding to third timestamp information, the second timestamp information is master clock information in an Ethernet network, and the third timestamp information is master clock information in a mobile network. The first device is a user plane network element and a second device is a terminal device, or the first device is a terminal device and a second device is a user plane network element.

According to the method, the first device determines a difference between the master clock information in the mobile network and the master clock information in the Ethernet network, and sends the difference to the second device, so that the second device directly completes clock synchronization by using the difference between the master clock information. In the method, impact of a transmission delay between the first device and the second device can be avoided, so that a time precision requirement of an industrial factory can be met in a scenario in which the mobile network is connected to the Ethernet network.

In an embodiment, that the first packet carries the first timestamp information may be: The first device uses a first protocol field included in the first packet to carry the first timestamp information.

According to an embodiment, the first device can successfully transmit the first timestamp information to the access device, so that the access device subsequently transmits the first timestamp information to the second device.

In an embodiment, the first protocol field may be an existing protocol field, or may be a newly added protocol field (for example, a NEW field) in an existing protocol stack framework.

In an embodiment, when the first device is the user plane network element, the first protocol field is a general packet radio service (GPRS) tunneling protocol (GTP) field. When the first device is the terminal device, the first protocol field is a service data protocol (SDAP) field or a data convergence protocol (PDCP) field.

In an embodiment, the first device receives a second packet from the access device, where the second packet is used to notify the first device that time synchronization has been completed.

According to an embodiment, the first device can terminate transmission of a packet after a third packet in an existing synchronization procedure by identifying that time synchronization is completed, thereby reducing resource consumption.

According to an eleventh aspect, this application further provides a synchronization method.

An access device receives a first packet from a first device, and sends a third packet to a second device based on the first packet, where the first packet carries first timestamp information, the first timestamp information is a difference between a moment corresponding to second timestamp information and a moment corresponding to third timestamp information, the second timestamp information is master clock information in an Ethernet network, the third timestamp information is master clock information in a mobile network, and the third packet carries the first timestamp information. The first device is a user plane network element and the second device is a terminal device, or the first device is a terminal device and the second device is a user plane network element.

According to an embodiment, the access device transmits timestamp information required for clock synchronization to the first device and the second device, to complete clock synchronization.

In an embodiment, when the access device detects that a first protocol field included in the first packet includes the first timestamp information, the access device encapsulates the first timestamp information in a second protocol field included in the first packet to generate the third packet, and sends the third packet to the second device.

According to an embodiment, the access device may successfully send the first timestamp information to the second device, so that the second device performs clock synchronization.

In an embodiment, before the access device encapsulates the first timestamp information in the second protocol field included in the first packet, the access device extracts the second timestamp information included in the first protocol field included in the first packet.

In an embodiment, the first protocol field may be an existing protocol field, or may be a newly added protocol field (for example, a NEW field) in an existing protocol stack framework. The second protocol field may alternatively be an existing protocol field, or may be a newly added protocol field (for example, a NEW field) in an existing protocol stack framework.

In an embodiment, when the first device is the user plane network element and the second device is the terminal device, the first protocol field is a GTP field, and the second protocol field is a SDAP field or a PDCP field. When the first device is the terminal device and the second device is the user plane network element, the first protocol field is an SDAP field or a PDCP field, and the second protocol field is a GTP field.

In an embodiment, the access device receives a second packet from the second device, and forwards the second packet to the first device, where the second packet is used to notify the first device that time synchronization is completed.

According to an embodiment, the first device can terminate transmission of a packet after a third packet in an existing synchronization procedure by identifying that time synchronization is completed, thereby reducing resource consumption.

According to a twelfth aspect, this application further provides a synchronization method.

A second device receives a third packet from an access device, where the third packet carries first timestamp information, the first timestamp information is a difference between a moment corresponding to second timestamp information and a moment corresponding to third timestamp information, the second timestamp information is master clock information in an Ethernet network, the third timestamp information is master clock information in a mobile network, the third packet is sent by the access device based on a first packet, and the first packet is sent by a first device to the access device. The first device is a user plane network element and the second device is a terminal device, or the first device is a terminal device and the second device is a user plane network element. Then, the second device determines fourth timestamp information, and completes time synchronization by adding the difference corresponding to the first timestamp information to a moment corresponding to the fourth timestamp information, where the fourth timestamp information is a moment that is in the mobile network and at which the second device receives the third packet.

According to an embodiment, the second device directly completes clock synchronization by using a difference between the master clock information. In the method, impact of a transmission delay between the first device and the second device can be avoided, so that a time precision requirement of an industrial factory can be met in a scenario in which the mobile network is connected to the Ethernet network.

In an embodiment, after the second device receives the third packet from the access device, the second device extracts the first timestamp information carried in a second protocol field included in the third packet.

In an embodiment, the second protocol field may be an existing protocol field, or may be a newly added protocol field (for example, a NEW field) in an existing protocol stack framework.

In an embodiment, when the second device is the terminal device, the second protocol field is a service data protocol SDAP field or a data convergence protocol PDCP field. When the second device is the user plane network element, the second protocol field is a general packet radio service GPRS tunneling protocol GTP field.

In an embodiment, the second device sends a second packet to the access device, where the second packet is used to notify the first device that time synchronization is completed.

According to an embodiment, the access device subsequently forwards the second packet to the first device, so that the first device can terminate transmission of a packet after the third packet in an existing synchronization procedure by identifying that time synchronization is completed, thereby reducing resource consumption.

According to a thirteenth aspect, this application further provides a first device. The first device has a function of implementing behavior of the first device in the method example in the first aspect, the fourth aspect, the seventh aspect, or the tenth aspect. The function may be implemented by hardware, or may be implemented by hardware executing corresponding software. The hardware or software includes one or more modules corresponding to the foregoing function.

In an embodiment, a structure of the first device includes a sending unit, a processing unit, and a receiving unit. These units may perform corresponding functions in the method example in the first aspect, the fourth aspect, the seventh aspect, or the tenth aspect. For details, refer to the detailed descriptions in the method example. Details are not described herein again.

In an embodiment, a structure of the first device includes a transceiver, a processor, and a memory. The transceiver is configured to: receive and send data, and communicate and interact with another device in a communications system. The processor is configured to support the first device in performing a corresponding function in the method in the first aspect, the fourth aspect, the seventh aspect, or the tenth aspect. The memory is coupled to the processor, and the memory stores a program instruction and data that are necessary for the first device.

According to a fourteenth aspect, this application further provides an access device. The access device has a function of implementing behavior of the access device in the method example in the second aspect, the fifth aspect, the eighth aspect, or the eleventh aspect. The function may be implemented by hardware, or may be implemented by hardware executing corresponding software. The hardware or software includes one or more modules corresponding to the foregoing function.

In an embodiment, a structure of the access device includes a sending unit and a receiving unit. These units may perform corresponding functions in the method example in the second aspect, the fifth aspect, the eighth aspect, or the eleventh aspect. For details, refer to the detailed descriptions in the method example. Details are not described herein again.

In an embodiment, a structure of the access device includes a transceiver, a processor, and a memory. The transceiver is configured to: receive and send data, and communicate and interact with another device in a communications system. The processor is configured to support the access device in performing a corresponding function in the method in the second aspect, the fifth aspect, the eighth aspect, or the eleventh aspect. The memory is coupled to the processor, and the memory stores a program instruction and data that are necessary for the access device.

According to a fifteenth aspect, this application further provides a second device. The second device has a function of implementing behavior of the second device in the method example in the third aspect, the sixth aspect, the ninth aspect, or the twelfth aspect. The function may be implemented by hardware, or may be implemented by hardware executing corresponding software. The hardware or software includes one or more modules corresponding to the foregoing function.

In an embodiment, a structure of the second device includes a receiving unit, a processing unit, and a sending unit. These units may perform corresponding functions in the method example in the third aspect, the sixth aspect, the ninth aspect, or the twelfth aspect. For details, refer to the detailed descriptions in the method example. Details are not described herein again.

In an embodiment, a structure of the second device includes a transceiver, a processor, and a memory. The transceiver is configured to: receive and send data, and communicate and interact with another device in a communications system. The processor is configured to support the second device in performing a corresponding function in the method in the third aspect, the sixth aspect, the ninth aspect, or the twelfth aspect. The memory is coupled to the processor, and the memory stores a program instruction and data that are necessary for the second device.

According to a sixteenth aspect, this application further provides a communications system. The communications system may include the first device, the access device, the second device, and the like mentioned in the foregoing designs.

According to a seventeenth aspect, this application further provides a computer storage medium. The computer storage medium stores a computer executable instruction, and when the computer executable instruction is invoked by a computer, the computer is enabled to perform any one of the foregoing methods.

According to an eighteenth aspect, this application further provides a computer program product including an instruction. When the computer program product is run on a computer, the computer is enabled to perform any one of the foregoing methods.

According to a nineteenth aspect, this application further provides a chip. The chip is connected to a memory, and is configured to: read and execute a program instruction stored in the memory, to implement any one of the foregoing methods.

According to a twentieth aspect, this application further provides a synchronization method.

First, after receiving a first packet from a third device, a first device determines first timestamp information, and sends a first packet to a second device by using an access device, where the first timestamp information is a moment that is in a mobile network and at which the first device receives the first packet. Then, after receiving a second packet from the third device, the first device sends a third packet to the access device based on the second packet, where the third packet carries the first timestamp information. Subsequently, after receiving a fourth packet from the access device, the first device sends the fourth packet to the third device, and determines second timestamp information, where the second timestamp information is a moment that is in the mobile network and at which the first device sends the fourth packet to the third device. After receiving a fifth packet from the third device, the first device determines third timestamp information, and sends a sixth packet to the access device based on the fifth packet, where the sixth packet carries the second timestamp information, and the third timestamp information is a moment that is in the mobile network and at which the first device receives the fifth packet. Finally, after receiving a seventh packet from the third device, the first device sends an eighth packet to the access device, where the seventh packet carries fourth timestamp information, the fourth timestamp information is a moment that is in an Ethernet network and at which the third device sends the fifth packet to the first device, and the eighth packet carries the third timestamp information and the fourth timestamp information. The first device is a user plane network element and the second device is a terminal device, or the first device is a terminal device and the second device is a user plane network element.

According to an embodiment, impact of a transmission delay between the first device and the second device can be avoided, so that a time precision requirement of an industrial factory can be met in a scenario in which the mobile network is connected to the Ethernet network.

In an embodiment, that the third packet carries the first timestamp information may be: The first device uses a first protocol field included in the third packet to carry the first timestamp information. In this way, the first device can successfully transmit the first timestamp information to the access device.

In an embodiment, the first protocol field may be an existing protocol field, or may be a newly added protocol field (for example, a NEW field) in an existing protocol stack framework.

In an embodiment, when the first device is the terminal device, the first protocol field is an SDAP field or a PDCP field. Alternatively, when the first device is the user plane network element, the first protocol field is a GTP field.

In an embodiment, that the sixth packet carries the second timestamp information may be: The first device uses a second protocol field included in the sixth packet to carry the second timestamp information. In this way, the first device can successfully transmit the second timestamp information to the access device.

In an embodiment, the second protocol field may be an existing protocol field, or may be a newly added protocol field (for example, a NEW field) in an existing protocol stack framework.

In an embodiment, when the first device is the terminal device, the second protocol field is an SDAP field or a PDCP field. Alternatively, when the second device is the user plane network element, the second protocol field is a GTP field.

In an embodiment, that the eighth packet carries the third timestamp information may be: The first device uses a third protocol field included in the eighth packet to carry the third timestamp information. In this way, the first device can successfully transmit the third timestamp information to the access device.

In an embodiment, the third protocol field may be an existing protocol field, or may be a newly added protocol field (for example, a NEW field) in an existing protocol stack framework.

In an embodiment, when the first device is the terminal device, the third protocol field is an SDAP field or a PDCP field. Alternatively, when the second device is the user plane network element, the third protocol field is a GTP field.

According to a twenty-first aspect, this application further provides a synchronization method.

After receiving a first packet from a first device, an access device forwards the first packet to a second device. After receiving a third packet from the first device, the access device sends a ninth packet to the second device based on the third packet, where the third packet carries first timestamp information, the ninth packet carries the first timestamp information, and the first timestamp information is a moment that is in a mobile network and at which the first device receives the first packet from a third device. After receiving a fourth packet from the second device, the access device sends the fourth packet to the first device. After receiving a sixth packet from the first device, the access device sends a tenth packet to the second device based on the sixth packet, where the sixth packet is sent by the first device to the access device based on a fifth packet after the first device receives the fifth packet from the third device, the sixth packet carries second timestamp information, the second timestamp information is a moment that is in the mobile network and at which the first device sends the fourth packet to the third device after receiving the fourth packet from the access device, and the tenth packet carries the second timestamp information. The access device receives an eighth packet from the first device, and sends an eleventh packet to the second device based on the eighth packet, where the eighth packet carries third timestamp information and fourth timestamp information, the third timestamp information is a moment that is in the mobile network and at which the first device receives the fifth packet from the third device, the fourth timestamp information is a moment that is in an Ethernet network and at which the third device sends the fifth packet to the first device, and the eleventh packet carries the third timestamp information and the fourth timestamp information. The first device is a user plane network element and the second device is a terminal device, or the first device is a terminal device and the second device is a user plane network element.

According to the method, the access device transmits timestamp information required for clock synchronization to the first device and the second device, to complete clock synchronization.

In an embodiment, that the access device sends a ninth packet to the second device based on the third packet may be: When detecting that a first protocol field included in the third packet carries the first timestamp information, the access device encapsulates the first timestamp information in a fourth protocol field in the third packet to generate the ninth packet, and sends the ninth packet to the second device. In this way, the access device may transmit the first timestamp information to the second device.

In an embodiment, the first protocol field may be an existing protocol field, or may be a newly added protocol field (for example, a NEW field) in an existing protocol stack framework. The fourth protocol field may alternatively be an existing protocol field, or may be a newly added protocol field (for example, a NEW field) in an existing protocol stack framework.

In an embodiment, when the first device is the terminal device, the first protocol field is an SDAP field or a PDCP field, and the fourth protocol field is a GTP field. Alternatively, when the first device is the user plane network element, the first protocol field is a GTP field, and the fourth protocol field is an SDAP field or a PDCP field.

In an embodiment, that the access device sends a tenth packet to the second device based on the sixth packet may be: When detecting that a second protocol field included in the sixth packet carries the second timestamp information, the access device encapsulates the second timestamp information in a fifth protocol field in the sixth packet to generate the tenth packet, and sends the tenth packet to the second device. In this way, the access device may transmit the second timestamp information to the second device.

In an embodiment, the second protocol field may be an existing protocol field, or may be a newly added protocol field (for example, a NEW field) in an existing protocol stack framework. The fifth protocol field may alternatively be an existing protocol field, or may be a newly added protocol field (for example, a NEW field) in an existing protocol stack framework.

In an embodiment, when the first device is the terminal device, the second protocol field is an SDAP field or a PDCP field, and the fifth protocol field is a GTP field. Alternatively, when the first device is the user plane network element, the second protocol field is a GTP field, and the fifth protocol field is an SDAP field or a PDCP field.

In an embodiment, that the access device sends an eleventh packet to the second device based on the eighth packet may be: When detecting that a third protocol field included in the eighth packet carries the third timestamp information, the access device encapsulates the third timestamp information in a sixth protocol field in the eighth packet to generate the eleventh packet, and sends the eleventh packet to the second device. In this way, the access device may transmit the third timestamp information to the second device.

In an embodiment, the third protocol field may be an existing protocol field, or may be a newly added protocol field (for example, a NEW field) in an existing protocol stack framework. The sixth protocol field may alternatively be an existing protocol field, or may be a newly added protocol field (for example, a NEW field) in an existing protocol stack framework.

In an embodiment, when the first device is the terminal device, the third protocol field is an SDAP field or a PDCP field, and the sixth protocol field is a GTP field. Alternatively, when the first device is the user plane network element, the third protocol field is a GTP field, and the sixth protocol field is an SDAP field or a PDCP field.

According to a twenty-second aspect, this application further provides a synchronization method.

First, after receiving a first packet from an access device, a second device sends the first packet to a fourth device, and determines fifth timestamp information, where the fifth timestamp information is a moment that is in a mobile network and at which the second device sends the first packet to the fourth device. Then, after receiving a ninth packet from the access device, the second device sends a twelfth packet to the fourth device based on the ninth packet, where the ninth packet carries first timestamp information, and the first timestamp information is a moment that is in the mobile network and at which a first device receives the first packet from a third device. The second device receives a fourth packet from the fourth device, determines sixth timestamp information, and sends the fourth packet to the access device, where the sixth timestamp information is a moment that is in the mobile network and at which the second device receives the fourth packet. The second device receives a tenth packet from the access device, where the tenth packet carries second timestamp information, and the second timestamp information is a moment that is in the mobile network and at which the first device sends the fourth packet to the third device after the access device sends the fourth packet to the first device. The second device sends a thirteenth packet to the fourth device, and determines seventh timestamp information, where the seventh timestamp information is a moment that is in the mobile network and at which the second device sends the thirteenth packet to the fourth device. The second device receives an eleventh packet from the access device, where the eleventh packet carries third timestamp information and fourth timestamp information, the third timestamp information is a moment that is in the mobile network and at which the first device receives a fifth packet from the third device, and the fourth timestamp information is a moment that is in an Ethernet network and at which the third device sends the fifth packet to the first device. Finally, the second device determines eighth timestamp information based on the first timestamp information, the second timestamp information, the third timestamp information, the fourth timestamp information, the fifth timestamp information, the sixth timestamp information, and the seventh timestamp information. The second device sends the eighth timestamp information to the fourth device, so that the fourth device performs time synchronization based on the eighth timestamp information.

According to an embodiment, impact of a transmission delay between the first device and the second device can be avoided, so that a time precision requirement of an industrial factory can be met in a scenario in which the mobile network is connected to the Ethernet network.

In an embodiment, after receiving the ninth packet from the access device, the second device extracts the first timestamp information carried in a fourth protocol field included in the ninth packet. In this way, the second device may subsequently determine the eighth timestamp information by using the first timestamp information.

In an embodiment, the fourth protocol field may be an existing protocol field, or may be a newly added protocol field (for example, a NEW field) in an existing protocol stack framework.

In an embodiment, when the second device is the user plane network element, the fourth protocol field is a GTP field. Alternatively, when the second device is the terminal device, the fourth protocol field is an SDAP field or a PDCP field.

In an embodiment, after receiving the tenth packet from the access device, the second device extracts the second timestamp information carried in a fifth protocol field included in the tenth packet. In this way, the second device may subsequently determine the eighth timestamp information by using the second timestamp information.

In an embodiment, the fifth protocol field may be an existing protocol field, or may be a newly added protocol field (for example, a NEW field) in an existing protocol stack framework.

In an embodiment, when the second device is the user plane network element, the fifth protocol field is a GTP field. Alternatively, when the second device is the terminal device, the fifth protocol field is an SDAP field or a PDCP field.

In an embodiment, after receiving the eleventh packet from the access device, the second device extracts the third timestamp information carried in a sixth protocol field included in the eleventh packet. In this way, the second device may subsequently determine the eighth timestamp information by using the third timestamp information.

In an embodiment, the sixth protocol field may be an existing protocol field, or may be a newly added protocol field (for example, a NEW field) in an existing protocol stack framework.

In an embodiment, when the second device is the user plane network element, the sixth protocol field is a GTP field. Alternatively, when the second device is the terminal device, the sixth protocol field is an SDAP field or a PDCP field.

According to a twenty-third aspect, this application further provides a synchronization method.

First, a first device sends a first packet to an access device, and determines first timestamp information and second timestamp information, where the first timestamp information is a moment that is in an Ethernet network and at which the first device sends the first packet, and the second timestamp information is a moment that is in a mobile network and at which the first device sends the first packet. The first device sends a second packet to the access device, where the second packet carries the first timestamp information and the second timestamp information. Then, the first device receives a third packet from the access device, and determines third timestamp information, where the third timestamp information is a moment that is in the Ethernet network and at which the first device receives the third packet. The first device sends a fourth packet to the access device, and determines fourth timestamp information, where the fourth timestamp information is a moment that is in the Ethernet network and at which the first device sends the fourth packet, and the fourth packet carries the third timestamp information. Finally, the first device sends a fifth packet to the access device, where the fifth packet carries the fourth timestamp information. The first device is a user plane network element and a second device is a terminal device, or the first device is a terminal device and a second device is a user plane network element.

According to an embodiment, impact of a transmission delay between the first device and the second device can be avoided, so that a time precision requirement of an industrial factory can be met in a scenario in which the mobile network is connected to the Ethernet network.

In an embodiment, that the second packet carries the second timestamp information may be: The first device uses a first protocol field included in the second packet to carry the second timestamp information. In this way, the first device can successfully transmit the second timestamp information to the access device.

In an embodiment, the first protocol field may be an existing protocol field, or may be a newly added protocol field (for example, a NEW field) in an existing protocol stack framework.

In an embodiment, when the first device is the terminal device, the first protocol field is an SDAP field or a PDCP field. Alternatively, when the first device is the user plane network element, the first protocol field is a GTP field.

According to a twenty-fourth aspect, this application further provides a synchronization method.

After receiving a first packet from a first device, an access device forwards the first packet to a second device. After receiving a second packet from the first device, the access device sends a sixth packet to the second device based on the second packet, where the second packet carries first timestamp information and second timestamp information, the first timestamp information is a moment that is in an Ethernet network and at which the first device sends the first packet to the access device, the second timestamp information is a moment that is in a mobile network and at which the first device sends the first packet to the access device, and the sixth packet carries the first timestamp information and the second timestamp information. After receiving a third packet from the second device, the access device forwards the third packet to the first device. After receiving a fourth packet from the first device, the access device forwards the fourth packet to the second device, where the fourth packet carries third timestamp information, and the third timestamp information is a moment that is in the Ethernet network and at which the first device receives the third packet sent by the access device. After receiving a fifth packet from the first device, the access device forwards the fifth packet to the second device, where the fifth packet carries fourth timestamp information, and the fourth timestamp information is a moment that is in the Ethernet network and at which the first device sends the fourth packet to the access device. The first device is a user plane network element and the second device is a terminal device, or the first device is a terminal device and the second device is a user plane network element.

According to the method, the access device transmits timestamp information required for clock synchronization to the first device and the second device, to complete clock synchronization.

In an embodiment, that the access device sends a sixth packet to the second device based on the second packet may be: When detecting that a first protocol field included in the second packet carries the second timestamp information, the access device encapsulates the second timestamp information in a second protocol field in the second packet to generate the sixth packet, and sends the sixth packet to the second device.

In an embodiment, the first protocol field may be an existing protocol field, or may be a newly added protocol field (for example, a NEW field) in an existing protocol stack framework. The second protocol field may alternatively be an existing protocol field, or may be a newly added protocol field (for example, a NEW field) in an existing protocol stack framework.

In an embodiment, when the first device is the terminal device, the first protocol field is an SDAP field or a PDCP field, and the second protocol field is a GTP field. Alternatively, when the first device is a user plane network element, the first protocol field is a GTP field, and the second protocol field is an SDAP field or a PDCP field.

According to a twenty-fifth aspect, this application further provides a synchronization method.

A second device receives a first packet from an access device, and determines fifth timestamp information and sixth timestamp information, where the fifth timestamp information is a moment that is in an Ethernet network and at which the second device receives the first packet, and the sixth timestamp information is a moment that is in a mobile network and at which the second device receives the first packet. The second device receives a sixth packet from the access device, where the sixth packet carries first timestamp information and second timestamp information, the first timestamp information is a moment that is in the Ethernet network and at which a first device sends the first packet to the access device, and the second timestamp information is a moment that is in the mobile network and at which the first device sends the first packet to the access device. The second device sends a third packet to the access device, and determines seventh timestamp information, where the seventh timestamp information is a moment that is in the Ethernet network and at which the second device sends the third packet. The second device receives a fourth packet from the access device, and determines eighth timestamp information, where the eighth timestamp information is a moment that is in the Ethernet network and at which the second device receives the fourth packet, the fourth packet carries third timestamp information, and the third timestamp information is a moment that is in the Ethernet network and at which the first device receives the third packet after the access device receives the third packet from the second device and forwards the third packet to the first device. The second device receives a fifth packet from the access device, where the fifth packet carries fourth timestamp information, and the fourth timestamp information is a moment that is in the Ethernet network and at which the first device sends the fourth packet to the access device. The second device determines a time offset between the first device and the second device based on the first timestamp information, the second timestamp information, the third timestamp information, the fourth timestamp information, the fifth timestamp information, the sixth timestamp information, the seventh timestamp information, and the eighth timestamp information, and performs time synchronization based on the time offset. The first device is a user plane network element and the second device is a terminal device, or the first device is a terminal device and the second device is a user plane network element.

In an embodiment, impact of a transmission delay between the first device and the second device can be avoided, so that a time precision requirement of an industrial factory can be met in a scenario in which the mobile network is connected to the Ethernet network.

In an embodiment, that the second device determines a time offset between the first device and the second device based on the first timestamp information, the second timestamp information, the third timestamp information, the fourth timestamp information, the fifth timestamp information, the sixth timestamp information, the seventh timestamp information, and the eighth timestamp information may be: The second device determines ninth timestamp information based on the second timestamp information, the third timestamp information, the sixth timestamp information, the seventh timestamp information, and the eighth timestamp information. The second device deletes the fourth timestamp information, and determines, based on the ninth timestamp information, the moment that is in the Ethernet network and at which the first device sends the fourth packet to the access device. The second device determines the time offset between the first device and the second device based on the first timestamp information, the third timestamp information, the fifth timestamp information, the seventh timestamp information, the eighth timestamp information, and the ninth timestamp information.

According to an embodiment, the second device can accurately determine the time offset between the first device and the second device.

In an embodiment, after receiving the sixth packet from the access device, the second device extracts the second timestamp information carried in a second protocol field included in the sixth packet.

In an embodiment, the second protocol field may be an existing protocol field, or may be a newly added protocol field (for example, a NEW field) in an existing protocol stack framework.

In an embodiment, when the second device is the user plane network element, the second protocol field is a GTP field. Alternatively, when the second device is the terminal device, the second protocol field is an SDAP field or a PDCP field.

According to a twenty-sixth aspect, this application further provides a synchronization method.

First, after receiving a first packet from a third device, a first device sends the first packet to a second device by using an access device, and determines first timestamp information, where the first timestamp information is a moment that is in a mobile network and at which the first device receives the first packet. Then, after receiving a second packet from the access device, the first device sends a third packet to the third device, where the second packet carries second timestamp information and third timestamp information, the second timestamp information is a moment that is in the mobile network and at which the second device sends the first packet to a fourth device after receiving the first packet, and the third timestamp information is a moment that is in the mobile network and at which the second device receives a fifth packet from the fourth device. The first device determines fourth timestamp information, where the fourth timestamp information is a moment that is in the mobile network and at which the first device sends the third packet. Subsequently, the first device receives a sixth packet from the third device, where the sixth packet carries fifth timestamp information, and the fifth timestamp information is a moment that is in an Ethernet network and at which the third device receives the third packet sent by the first device. Finally, the first device determines sixth timestamp information based on the first timestamp information, the second timestamp information, the third timestamp information, the fourth timestamp information, and the fifth timestamp information, and forwards the sixth timestamp information to the second device by using the access device. The first device is a user plane network element and the second device is a terminal device, or the first device is a terminal device and the second device is a user plane network element.

In an embodiment, impact of a transmission delay between the first device and the second device can be avoided, so that a time precision requirement of an industrial factory can be met in a scenario in which the mobile network is connected to the Ethernet network.

In an embodiment, that the first device determines sixth timestamp information based on the first timestamp information, the second timestamp information, the third timestamp information, the fourth timestamp information, and the fifth timestamp information may be: The first device determines a round-trip transmission delay difference between the first device and the second device based on the first timestamp information, the second timestamp information, the third timestamp information, and the fourth timestamp information. The first device calculates a sum of the moment corresponding to the fifth timestamp information and the round-trip transmission delay difference, to obtain the sixth timestamp information.

According to an embodiment, the first device may accurately determine the sixth timestamp information, so that the fourth device calculates a time offset between the third device and the fourth device based on the sixth timestamp information and time points of receiving and sending packets in the Ethernet network, to perform time synchronization.

In an embodiment, after receiving the second packet from the access device, the first device extracts the second timestamp information and the third timestamp information that are carried in a first protocol field included in the second packet. In this way, the first device can transmit the second timestamp information and the third timestamp information to the access device.

In an embodiment, the first protocol field may be an existing protocol field, or may be a newly added protocol field (for example, a NEW field) in an existing protocol stack framework.

In an embodiment, when the first device is the user plane network element, the first protocol field is a GTP field. Alternatively, when the first device is the terminal device, the first protocol field is an SDAP field or a PDCP field.

According to a twenty-seventh aspect, this application further provides a synchronization method.

First, after receiving a first packet from a first device, an access device sends the first packet to a second device. Then, the access device receives a fourth packet from the second device, where the fourth packet carries second timestamp information and third timestamp information, the second timestamp information is a moment that is in a mobile network and at which the second device sends the first packet to a fourth device after receiving the first packet, the fourth packet is sent by the second device to the access device based on a fifth packet after the second device receives the fifth packet from the fourth device, and the third timestamp information is a moment that is in the mobile network and at which the second device receives the fifth packet, Subsequently, the access device sends a second packet to the first device, where the second packet carries the second timestamp information and the third timestamp information. Finally, the access device receives sixth timestamp information from the first device, and sends the sixth timestamp information to the second device. The first device is a user plane network element and the second device is a terminal device, or the first device is a terminal device and the second device is a user plane network element.

According to an embodiment, the access device transmits timestamp information required for clock synchronization to the first device and the second device, to complete clock synchronization.

In an embodiment, that the access device sends a second packet to the first device may be: When detecting that a second protocol field included in the fourth packet carries the second timestamp information and the third timestamp information, the access device encapsulates the second timestamp information and the third timestamp information in a first protocol field included in the fourth packet to generate the second packet, and sends the second packet to the first device. In this way, the access device can transmit the second timestamp information and the third timestamp information to the second device.

In an embodiment, the second protocol field may be an existing protocol field, or may be a newly added protocol field (for example, a NEW field) in an existing protocol stack framework. The second protocol field may alternatively be an existing protocol field, or may be a newly added protocol field (for example, a NEW field) in an existing protocol stack framework.

In an embodiment, when the first device is the user plane network element, the second protocol field is an SDAP field or a PDCP field, and the first protocol field is a GTP field. Alternatively, when the first device is the terminal device, the second protocol field is a GTP field, and the first protocol field is an SDAP field or a PDCP field.

According to a twenty-eighth aspect, this application further provides a synchronization method.

First, after receiving a first packet from an access device, a second device sends the first packet to a fourth device, and determines second timestamp information, where the second timestamp information is a moment that is in a mobile network and at which the second device sends the first packet. Then, the second device receives a fifth packet from the fourth device, and determines third timestamp information, where the third timestamp information is a moment that is in the mobile network and at which the second device receives the fifth packet. Subsequently, the second device sends a fourth packet to the access device, where the fourth packet carries the second timestamp information and the third timestamp information. Finally, the second device receives sixth timestamp information from the access device, and sends the sixth timestamp information to the fourth device, so that the fourth device performs time synchronization based on the sixth timestamp information.

In an embodiment, that the fourth packet carries the second timestamp information and the third timestamp information may be: The second device uses a second protocol field included in the fourth packet to carry the second timestamp information and the third timestamp information. In this way, the second device can transmit the second timestamp information and the third timestamp information to the access device.

In an embodiment, the second protocol field may be an existing protocol field, or may be a newly added protocol field (for example, a NEW field) in an existing protocol stack framework.

In an embodiment, when the second device is a terminal device, the second protocol field is an SDAP field or a PDCP field. Alternatively, when the second device is a user plane network element, the second protocol field is a GTP field.

According to a twenty-ninth aspect, this application further provides a synchronization method.

First, a first device receives a first packet from a third device, and determines first timestamp information, where the first timestamp information is a moment that is in a mobile network and at which the first device receives the first packet. Then, the first device sends a second packet to an access device based on the first packet, where the second packet carries the first timestamp information. Subsequently, after receiving a third packet from the access device, the first device sends the third packet to the third device, and determines second timestamp information, where the second timestamp information is a moment that is in the mobile network and at which the first device sends the third packet. Finally, the first device receives a fourth packet from the third device, where the fourth packet carries third timestamp information, and the third timestamp information is a moment that is in an Ethernet network and at which the third device receives the third packet sent by the first device; and the first device sends the second timestamp information and the third timestamp information to the access device. The first device is a user plane network element and a second device is a terminal device, or the first device is a terminal device and a second device is a user plane network element.

According to an embodiment, impact of a transmission delay between the first device and the second device can be avoided, so that a time precision requirement of an industrial factory can be met in a scenario in which the mobile network is connected to the Ethernet network.

In an embodiment, that the second packet carries the first timestamp information may be: The first device uses a first protocol field included in the second packet to carry the first timestamp information. In this way, the first device can successfully transmit the first timestamp information to the access device.

In an embodiment, the first protocol field may be an existing protocol field, or may be a newly added protocol field (for example, a NEW field) in an existing protocol stack framework.

In an embodiment, when the first device is the user plane network element, the first protocol field is a GTP field. Alternatively, when the first device is the terminal device, the first protocol field is an SDAP field or a PDCP field.

According to a thirtieth aspect, this application further provides a synchronization method.

First, an access device receives a second packet from a first device, where the second packet carries first timestamp information, the second packet is sent by the first device to the access device after the first device receives a first packet from a third device, and the first timestamp information is a moment that is in a mobile network and at which the first device receives the first packet. Then, the access device sends a fifth packet to a second device based on the second packet, where the fifth packet carries the first timestamp information. Subsequently, after receiving a third packet from the second device, the access device sends the third packet to the first device. Finally, the access device receives second timestamp information and third timestamp information from the first device, and sends the second timestamp information and the third timestamp information to the second device, where the second timestamp information is a moment that is in the mobile network and at which the first device sends the third packet to the third device after receiving the third packet, and the third timestamp information is a moment that is in an Ethernet network and at which the third device receives the third packet sent by the first device. The first device is a user plane network element and the second device is a terminal device, or the first device is a terminal device and the second device is a user plane network element.

According to an embodiment, the access device transmits timestamp information required for clock synchronization to the first device and the second device, to complete clock synchronization.

In an embodiment, that the access device sends a fifth packet to a second device based on the second packet may be: When the access device detects that a first protocol field included in the second packet includes the first timestamp information, the access device encapsulates the first timestamp information in a second protocol field included in the second packet to generate the fifth packet, and sends the fifth packet to the second device. In this way, the access device can successfully transmit the first timestamp information to the second device.

In an embodiment, the first protocol field may be an existing protocol field, or may be a newly added protocol field (for example, a NEW field) in an existing protocol stack framework. The second protocol field may alternatively be an existing protocol field, or may be a newly added protocol field (for example, a NEW field) in an existing protocol stack framework.

In an embodiment, when the first device is the user plane network element, and the second device is the terminal device, the first protocol field is a GTP field, and the second protocol field is an SDAP field or a PDCP field. Alternatively, when the first device is the terminal device, and the second device is the user plane network element, the first protocol field is an SDAP field or a PDCP field, and the second protocol field is a GTP field.

According to a thirty-first aspect, this application further provides a synchronization method.

First, a second device receives a fifth packet from an access device, where the fifth packet carries first timestamp information, and the first timestamp information is a moment that is in a mobile network and at which a first device receives a first packet from a third device; and the second device sends a sixth packet to a fourth device, and determines fourth timestamp information, where the fourth timestamp information is a moment that is in the mobile network and at which the second device sends the sixth packet. Then, the second device receives a third packet from the fourth device, determines fifth timestamp information, and sends the third packet to the access device, where the fifth timestamp information is a moment that is in the mobile network and at which the second device receives the third packet. Subsequently, the second device receives second timestamp information and third timestamp information from the access device, where the second timestamp information is a moment that is in the mobile network and at which the first device sends the third packet to the third device after the access device receives the third packet and sends the third packet to the first device, and the third timestamp information is a moment that is in an Ethernet network and at which the third device receives the third packet sent by the first device. Finally, the second device determines sixth timestamp information based on the first timestamp information, the second timestamp information, the third timestamp information, the fourth timestamp information, and the fifth timestamp information, and sends the sixth timestamp information to the fourth device, so that the fourth device performs time synchronization based on the sixth timestamp information. The first device is a user plane network element and the second device is a terminal device, or the first device is a terminal device and the second device is a user plane network element.

According to an embodiment, impact of a transmission delay between the first device and the second device can be avoided, so that a time precision requirement of an industrial factory can be met in a scenario in which the mobile network is connected to the Ethernet network.

In an embodiment, that the second device determines sixth timestamp information based on the first timestamp information, the second timestamp information, the third timestamp information, the fourth timestamp information, and the fifth timestamp information may be: The second device determines a round-trip transmission delay difference between the first device and the second device based on the first timestamp information, the second timestamp information, the fourth timestamp information, and the fifth timestamp information. The second device calculates a sum of the moment corresponding to the third timestamp information and the round-trip transmission delay difference, to obtain the sixth timestamp information.

According to the method, the second device may accurately determine the sixth timestamp information, so that the fourth device calculates a time offset between the third device and the fourth device based on the sixth timestamp information and time points of receiving and sending packets in the Ethernet network, to perform time synchronization.

In an embodiment, after receiving the fifth packet from the access device, the second device extracts the first timestamp information carried in a second protocol field included in the fifth packet. In this way, the second device may subsequently determine the sixth timestamp information by using the first timestamp information.

In an embodiment, the second protocol field may be an existing protocol field, or may be a newly added protocol field (for example, a NEW field) in an existing protocol stack framework.

In an embodiment, when the second device is the terminal device, the second protocol field is an SDAP field or a PDCP field. Alternatively, when the second device is the user plane network element, the second protocol field is a GTP field.

According to a thirty-second aspect, this application further provides a first device. The first device has a function of implementing behavior of the first device in the method example in the twentieth aspect, the twenty-third aspect, the twenty-sixth aspect, or the twenty-ninth aspect. The function may be implemented by hardware, or may be implemented by hardware executing corresponding software. The hardware or software includes one or more modules corresponding to the foregoing function.

In an embodiment, a structure of the first device includes a sending unit, a processing unit, and a receiving unit. These units may perform corresponding functions in the method example in the twentieth aspect, the twenty-third aspect, the twenty-sixth aspect, or the twenty-ninth aspect. For details, refer to the detailed descriptions in the method example. Details are not described herein again.

In an embodiment, a structure of the first device includes a transceiver, a processor, and a memory. The transceiver is configured to: receive and send data, and communicate and interact with another device in a communications system. The processor is configured to support the first device in performing a corresponding function in the method in the twentieth aspect, the twenty-third aspect, the twenty-sixth aspect, or the twenty-ninth aspect. The memory is coupled to the processor, and the memory stores a program instruction and data that are necessary for the first device.

According to a thirty-third aspect, this application further provides an access device. The access device has a function of implementing behavior of the access device in the method example in the twenty-first aspect, the twenty-fourth aspect, the twenty-seventh aspect, or the thirtieth aspect. The function may be implemented by hardware, or may be implemented by hardware executing corresponding software. The hardware or software includes one or more modules corresponding to the foregoing functions.

In an embodiment, a structure of the access device includes a sending unit and a receiving unit. These units may perform corresponding functions in the method example in the twenty-first aspect, the twenty-fourth aspect, the twenty-seventh aspect, or the thirtieth aspect. For details, refer to the detailed descriptions in the method example. Details are not described herein again.

In an embodiment, a structure of the access device includes a transceiver, a processor, and a memory. The transceiver is configured to: receive and send data, and communicate and interact with another device in a communications system. The processor is configured to support the access device in performing a corresponding function in the method in the twenty-first aspect, the twenty-fourth aspect, the twenty-seventh aspect, or the thirtieth aspect. The memory is coupled to the processor, and the memory stores a program instruction and data that are necessary for the access device.

According to a thirty-fourth aspect, this application further provides a second device. The second device has a function of implementing behavior of the second device in the method example in the twenty-second aspect, the twenty-fifth aspect, the twenty-eighth aspect, or the thirty-first aspect. The function may be implemented by hardware, or may be implemented by hardware executing corresponding software. The hardware or software includes one or more modules corresponding to the foregoing function.

In an embodiment, a structure of the second device includes a receiving unit, a processing unit, and a sending unit. These units may perform corresponding functions in the method example in the twenty-second aspect, the twenty-fifth aspect, the twenty-eighth aspect, or the thirty-first aspect. For details, refer to the detailed descriptions in the method example. Details are not described herein again.

In an embodiment, a structure of the second device includes a transceiver, a processor, and a memory. The transceiver is configured to: receive and send data, and communicate and interact with another device in a communications system. The processor is configured to support the second device in performing a corresponding function in the method in the twenty-second aspect, the twenty-fifth aspect, the twenty-eighth aspect, or the thirty-first aspect. The memory is coupled to the processor, and the memory stores a program instruction and data that are necessary for the second device.

According to a thirty-fifth aspect, this application further provides a computer storage medium. The computer storage medium stores a computer executable instruction, and when the computer executable instruction is invoked by a computer, the computer is enabled to perform any one of the foregoing methods in the twentieth aspect to the thirty-first aspect.

According to a thirty-sixth aspect, this application further provides a computer program product including an instruction. When the computer program product is run on a computer, the computer is enabled to perform any one of the foregoing methods in the twentieth aspect to the thirty-first aspect.

According to a thirty-seventh aspect, this application further provides a chip. The chip is connected to a memory, and is configured to: read and execute a program instruction stored in the memory, to implement any one of the foregoing methods in the twentieth aspect to the thirty-first aspect.

DESCRIPTION OF EMBODIMENTS

Figure 1:
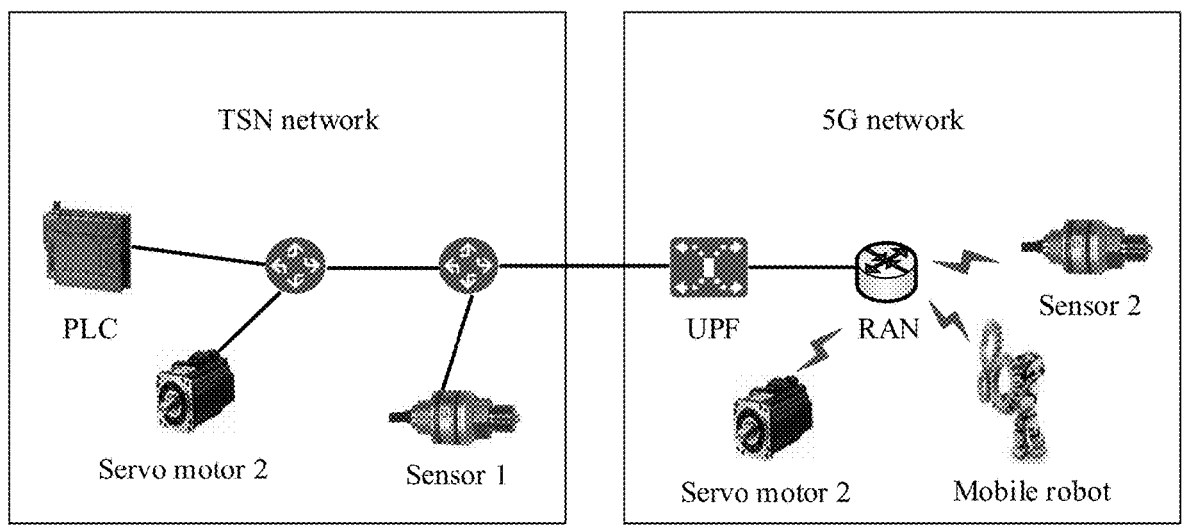
FIG. 1 is an architectural diagram of a communications system according to an embodiment of the application.

The following further describes in detail this application with reference to the accompanying drawings.

The embodiments of this application provide a synchronization method and an apparatus, to meet a time precision requirement of an industrial factory in a scenario in which a mobile network is connected to an Ethernet network (for example, a TSN). The method and the apparatus in this application are based on a same inventive concept. The method and the apparatus have similar problem resolving principles. Therefore, for implementation of the apparatus and the method, mutual reference may be made to each other. Details of repeated parts are not described.

The following explains some terms in this application to facilitate understanding by one of ordinary skilled in the art.

(1) Terminal device: The terminal device is also referred to as user equipment (user equipment, UE), a mobile station (MS), a mobile terminal (MT), or the like, and is a device that provides voice and/or data connectivity for a user. For example, in an industrial factory scenario, the terminal device may be a sensor, a servo motor, a mobile robot, or the like.

(2) User plane network element: The user plane network element may be configured to forward user plane data of the terminal device. The user plane network element is mainly used to route and forward a data packet, and serves as a mobility anchor. In addition, the user plane network element may further serve as an uplink classifier to support routing of a service flow to a data network, or serve as a branch point to support a multi-homed packet data unit (PDU) session, or the like. For example, the user plane network element may be a user plane function (UPF) network element.

(3) First device and second device: The first device and the second device are respectively a master clock node and a node that needs to perform clock synchronization. In a communication process, a clock of the second device needs to be synchronized with a clock of the first device. In an Ethernet network, the first device and the second device are adjacent devices. In a mobile network, there is at least one hop of another device, for example, an access device, between the first device and the second device. For example, the first device is the user plane network element and the second device is the terminal device, or the first device is the terminal device and the second device is the user plane network element.

(4) Access device: The access device provides a wireless access service for the terminal device. The access device is a node in a radio access network, and may also be referred to as a base station, or may also be referred to as a radio access network (RAN) node (or device). Currently, for example, the access device is a gNB, a transmission reception point (TRP), an evolved NodeB (eNB), a radio network controller (RNC), a NodeB (NB), a base station controller (BSC), a base transceiver station (BTS), a home base station (for example, a home evolved NodeB or a home NodeB, HNB), a baseband unit (BBU), or a wireless fidelity (Wi-Fi) access point (AP).

(5) Words such as "first" and "second": In the descriptions of this application, the words such as "first" and "second" are merely used for differentiation and description, and shall not be understood as an indication or implication of relative importance or an indication or implication of an order.

To describe the technical solutions in the embodiments of this application more clearly, the following describes, in detail with reference to the accompanying drawings, the synchronization method and the apparatus that are provided in the embodiments of this application.

FIG. 1 shows an architecture of a possible communications system to which a synchronization method is applicable according to an embodiment of this application. The communications system includes two parts: an Ethernet network and a mobile network. In the communications system, the Ethernet network is an Ethernet network in an industrial network, and the mobile network is applied to the industrial network and is connected to the Ethernet network. In FIG. 1, the Ethernet network is shown as a TSN network, and the mobile network is shown as a 5th generation (5G) mobile communications technology network.

The TSN network includes a programmable logic controller (PLC), another control device, a terminal device, a user plane network element, and the like. The PLC may be a master clock device in the TSN network. For example, as shown in FIG. 1, a servo motor 1 is the another control device, and a sensor 1 is the terminal device in the TSN network.

The 5G network may include a user plane network element, an access device, a terminal device, and the like. The user plane network element is shown as a UPF in FIG. 1. The access device is shown as a radio access network (RAN) node (or device). A sensor 2, a servo motor 2, and a mobile robot are all examples of terminal devices.

It should be noted that the TSN network shown in FIG. 1 is merely used as an example of the Ethernet network, and the 5G network is merely used as an example of the mobile network. The TSN network and the 5G network cannot be used as a limitation on the communications system in this application. The Ethernet network may have a plurality of other examples, and the mobile network may have a plurality of other examples, which are not listed one by one herein.

Figure 2:
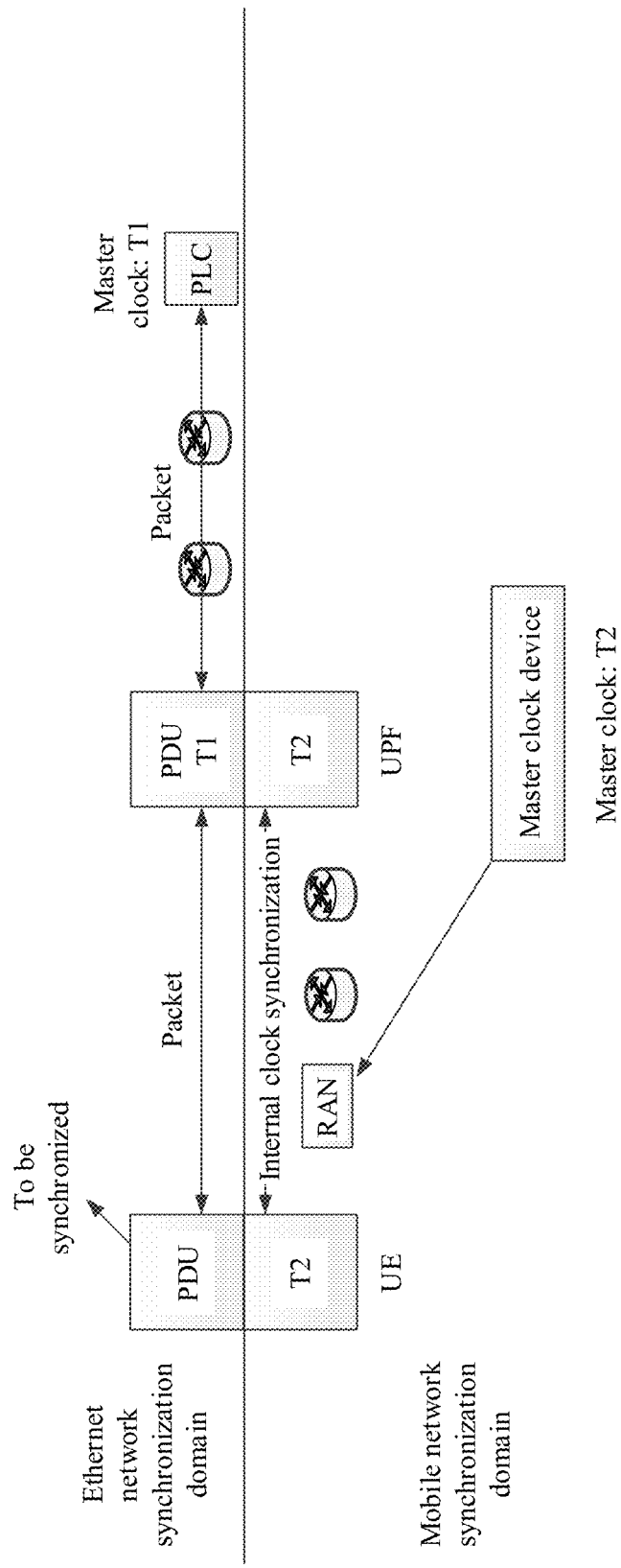
FIG. 2 is a schematic working diagram of a communications system according to an embodiment of the application.

FIG. 2 is a schematic working diagram of a communications system to which a synchronization method is applicable according to an embodiment of this application.

A packet in FIG. 2 may be an Ethernet packet, an Ethernet data packet, or the like, and the packet may be used as a data packet in a PDU session process in a mobile network for transmission.

A master clock device in an Ethernet network is a PLC, and a master clock in the Ethernet network is determined by the PLC. FIG. 2 shows a master clock T1 in an Ethernet network synchronization domain. In the Ethernet network synchronization domain, UE and a UPF are considered as two adjacent nodes. During clock synchronization, when the UPF is used as a master clock node, the UE needs to perform clock synchronization based on master clock information of the UPF.

In a mobile network synchronization domain, a master clock device may be a building integrated timing supply (BITS) system, a time server, a global positioning system (GPS), BeiDou, or the like. A master clock in the mobile network is determined by the master clock device. FIG. 2 shows a master clock T2 in the mobile network synchronization domain. Correspondingly, in the Ethernet network, there is another multi-hop device, for example, a RAN, between the UE and the UPF that are adjacent nodes. However, currently, clock synchronization in the mobile network is implemented. Therefore, clock synchronization in the Ethernet network can be performed based on clock synchronization in the mobile network.

It should be noted that FIG. 2 shows only a case in which the UPF is used as the master clock node, and the UE needs to perform clock synchronization. In an embodiment, in FIG. 2, locations of the UE and the UPF may be exchanged. For example, the UE may be used as the master clock node, and the UPF needs to perform clock synchronization.

It should be noted that the UE in FIG. 2 is merely used as an example of a terminal device, or the UE may be replaced with another terminal device (for example, the mobile robot or the sensor 2 in FIG. 1). The UPF is merely used as an example of a user plane network element, or the UPF may be replaced with another user plane network element. This is not limited in this application.

Figure 3:
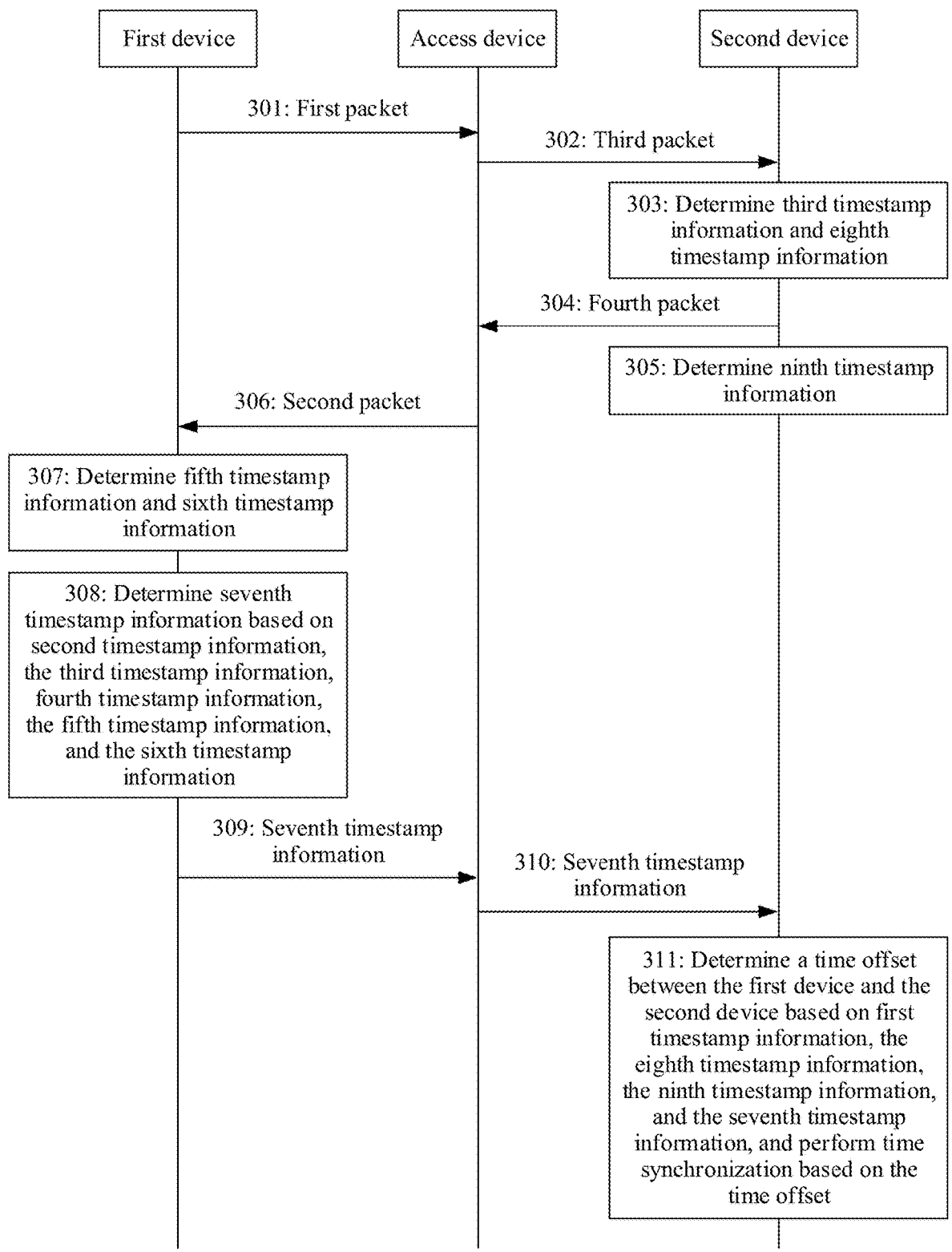
FIG. 3 is a flowchart of a synchronization method according to an embodiment of the application.

An embodiment of this application provides a synchronization method, which is applicable to the communications systems shown in FIG. 1 and FIG. 2. For example, in FIG. 3, a first device is the UPF and a second device is the UE, or the first device is the UE and the second device is the UPF. Referring to FIG. 3, a procedure of the method includes the following operations.

Operation 301: The first device sends a first packet to an access device, where the first packet carries first timestamp information, and determines second timestamp information, where the first timestamp information is a moment that is in an Ethernet network and at which the first device sends the first packet, and the second timestamp information is a moment that is in a mobile network and at which the first device sends the first packet.

In an embodiment, before the first device sends the first packet to the access device, the first device receives a data packet from the Ethernet network (for example, a TSN). If the first device identifies that format (type) information of the data packet is 0x88f7, the first device determines that the data packet is an 802.1AS synchronization data packet.

Then, the first device sends the first packet to the access device, and in this case, initiates a clock synchronization procedure.

Figure 4:
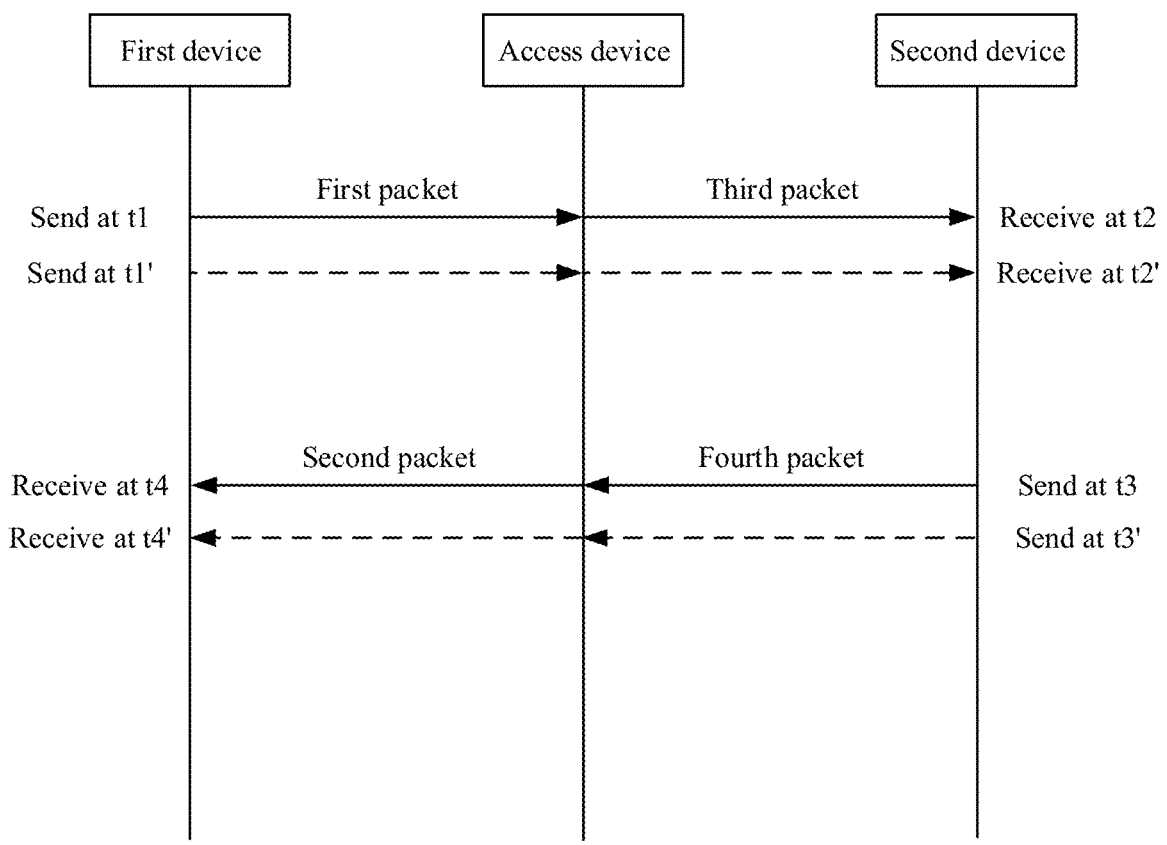
FIG. 4 is a schematic diagram of packet receiving and sending in a synchronization process according to an embodiment of the application.

For example, FIG. 4 is a schematic diagram of packet receiving and sending in a process of performing synchronization between the first device and the second device. In FIG. 4, a solid line indicates a transmission status of a packet in the Ethernet network, and a dashed line indicates a transmission status of a packet in the mobile network. It should be understood that in FIG. 4, a solid line and a dashed line that are parallel in a same direction indicate transmission of a same packet.

For example, in operation 301, the moment corresponding to the first timestamp information is denoted as t1 in FIG. 4, and the second timestamp information is denoted as t1' in FIG. 4.

In an embodiment, after determining the second timestamp information, the first device locally records the second timestamp information, so that the first device subsequently calculates a round-trip transmission delay difference between the first device and the second device.

The first device is a user plane network element and the second device is a terminal device, or the first device is a terminal device and the second device is a user plane network element. In other words, either of the user plane network element and the terminal device may be a master clock node, and the other needs to perform clock synchronization.

Operation 302: The access device sends a third packet to the second device based on the first packet, where the third packet carries the first timestamp information.

When the access device performs operation 302, the method may be: The access device forwards the first packet to the second device. In this case, the third packet is the first packet.

Operation 303: The second device determines third timestamp information and eighth timestamp information, where the third timestamp information is a moment that is in the mobile network and at which the second device receives the third packet, and the eighth timestamp information is a moment that is in the Ethernet network and at which the second device receives the third packet.

For example, in FIG. 4, the moment corresponding to the third timestamp information is denoted as t2', and the eighth timestamp information is denoted as t2.

Operation 304: The second device sends a fourth packet to the access device, where the fourth packet carries the third timestamp information and fourth timestamp information, and the fourth timestamp information is a moment that is in the mobile network and at which the second device sends the fourth packet to the access device.

For example, in FIG. 4, the moment corresponding to the fourth timestamp information is denoted as t3'.

In an embodiment, the fourth packet may further carry a flag, and the flag is used to indicate that the fourth packet carries timestamp information indicating a moment in the mobile network.

In an embodiment, a implementation method in which the fourth packet carries the third timestamp information and the fourth timestamp information may be: The second device uses a second protocol field included in the fourth packet to carry the third timestamp information and the fourth timestamp information. For example, the second protocol field may be an existing protocol field in the fourth packet in a current protocol stack framework. Alternatively, the second protocol field may be a protocol field newly added to the fourth packet in a current protocol stack framework. For example, when the fourth packet further carries a flag, the flag may also be carried in the second protocol field.

Figure 5:
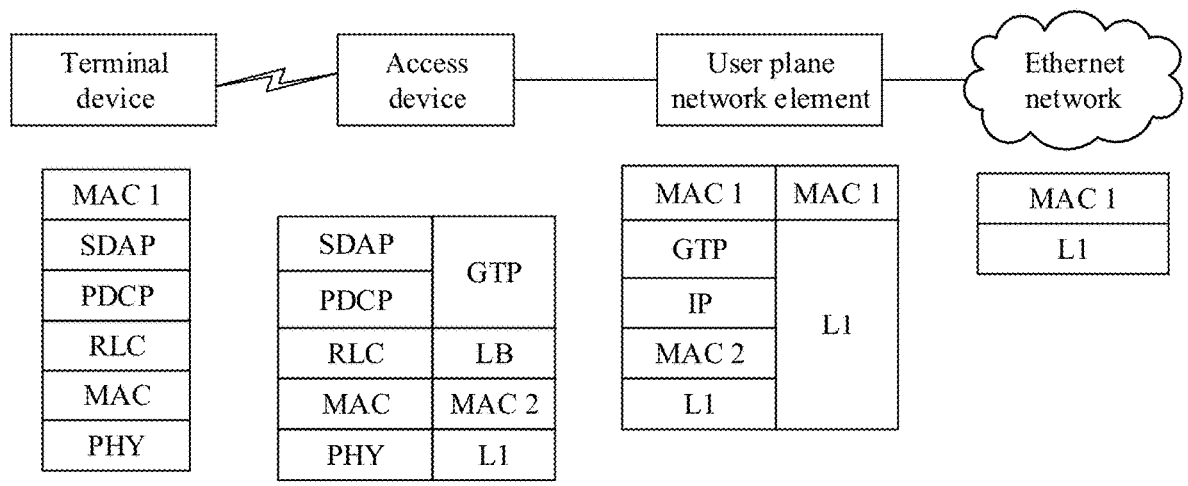
FIG. 5 is a schematic diagram of a protocol stack framework.

For example, FIG. 5 is a schematic diagram of an existing protocol stack framework. The protocol stack framework indicates examples (namely, examples of packet formats) of fields in a packet at different locations (namely, different devices).

The second protocol field is described in detail based on the example in FIG. 5.

In an example implementation, when the second device is the terminal device and the first device is the user plane network element, the second protocol field may have the following two cases:

Case a1: The second protocol field may be a service data protocol (SDAP) field or a packet data convergence protocol (PDCP) field. In this case, the second device encapsulates the third timestamp information and the fourth timestamp information in an SDAP field or a PDCP field in a packet protocol field corresponding to the terminal device shown in FIG. 5, and then sends the fourth packet obtained after the encapsulation to the access device.

Certainly, in addition to the SDAP field or the PDCP field, the second protocol field may be any other field in the packet protocol field corresponding to the terminal device shown in FIG. 5. This is not limited in this application. When the second protocol field is another protocol field, details are not described herein again.

Figure 6:
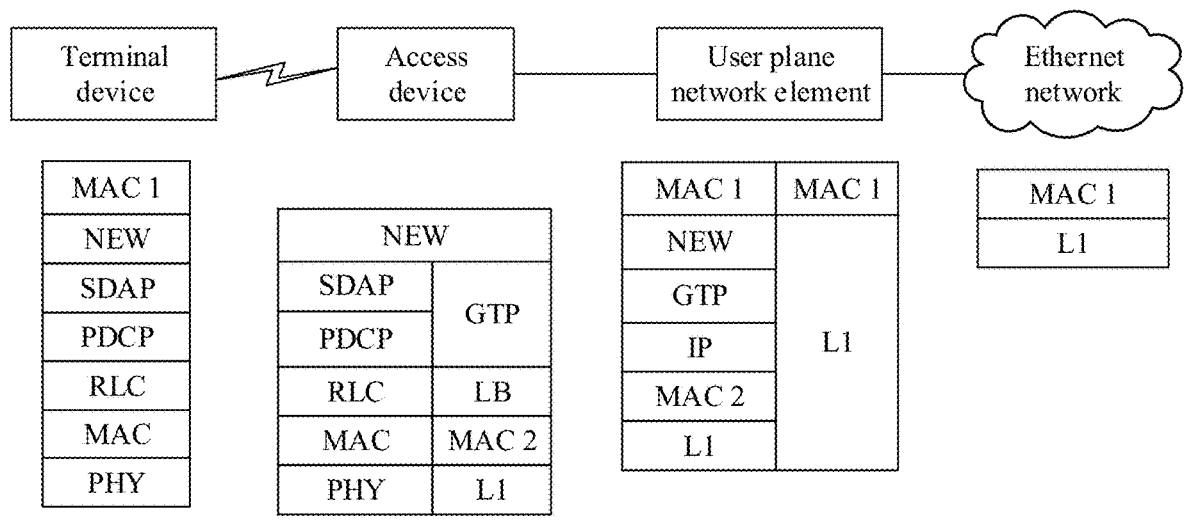
FIG. 6 is a schematic diagram of another protocol stack framework according to an embodiment of the application.

Case a2: The second protocol field may be a newly added protocol field in the protocol stack shown in FIG. 5, and may be denoted as a new protocol (new protocol) field (briefly referred to as a NEW field below). For example, in this case, the second device adds a new protocol field NEW field to the packet protocol field corresponding to the terminal device shown in FIG. 5, for example, as shown in a packet protocol field corresponding to the terminal device in a protocol stack architecture shown in FIG. 6, then encapsulates the third timestamp information and the fourth timestamp information in the NEW field, and sends the fourth packet obtained after the encapsulation to the access device.

It should be noted that the NEW field is merely used as an example. For example, the NEW field may alternatively have any other names with a same function. This is not limited in this application.

In another example implementation, when the second device is the user plane network element and the first device is the terminal device, the second protocol field may have the following two cases:

Case b1: The second protocol field is a general packet radio service tunneling protocol (GTP) field. In this case, the second device encapsulates the third timestamp information and the fourth timestamp information in a GTP field in a packet protocol field corresponding to the user plane network element shown in FIG. 5, and then sends the fourth packet obtained after the encapsulation to the access device.

Certainly, in addition to the GTP field, the second protocol field may be any other field in the packet protocol field corresponding to the user plane network element shown in FIG. 5. This is not limited in this application. When the second protocol field is another field, details are not described herein again.

Case b2: The second protocol field may be a newly added protocol field in the protocol stack shown in FIG. 5, and may be denoted as a new protocol field (briefly referred to as a NEW field below). For example, in this case, the second device adds a new protocol field NEW field to the packet protocol field corresponding to the user plane network element shown in FIG. 5, for example, as shown in a packet protocol field corresponding to the user plane network element in a protocol stack architecture shown in FIG. 6, then encapsulates the third timestamp information and the fourth timestamp information in the NEW field, and sends the fourth packet obtained after the encapsulation to the access device.

It should be noted that the NEW field is merely used as an example. For example, the NEW field may alternatively have any other names with a same function. This is not limited in this application.

Operation 305: The second device determines ninth timestamp information, where the ninth timestamp information is a moment that is in the Ethernet network and at which the second device sends the fourth packet to the access device.

For example, in FIG. 4, the moment corresponding to the ninth timestamp information is denoted as t3.

Operation 306: The access device sends a second packet to the first device, where the second packet carries the third timestamp information and the fourth timestamp information.

For example, a method in which the access device sends the second packet to the first device may be: When detecting that a second protocol field included in the fourth packet carries the third timestamp information and the fourth timestamp information, the access device encapsulates the third timestamp information and the fourth timestamp information in a first protocol field included in the fourth packet to generate the second packet, and sends the second packet to the first device.

For example, for a case of the second protocol field, refer to the related descriptions of the second protocol field in operation 304. Similarly, the first protocol field may also be an existing protocol field, or may be a newly added field in an existing protocol stack framework. There may be a plurality of actual cases of the first protocol field based on actual cases of the first device and the second device and different actual cases of the second protocol field.

In a possible implementation, when the second protocol field meets Case a1 in operation 304, the first protocol field may have the following two cases:

Case c1: The first protocol field may be a GTP field. In this case, when the access device detects that the third timestamp information and the fourth timestamp information are encapsulated in the SDAP field or the PDCP field in the received fourth packet, the access device extracts the third timestamp information and the fourth timestamp information from the SDAP field or the PDCP field, and then encapsulates the third timestamp information and the fourth timestamp information in a GTP field in a packet protocol field corresponding to the access device shown in FIG. 5, to generate the second packet. In this case, the GTP field in the second packet includes the third timestamp information and the fourth timestamp information.

Certainly, in addition to the GTP field, the first protocol field may be any other field in the packet protocol field corresponding to the access device shown in FIG. 5. This is not limited in this application. When the first protocol field is another protocol field, details are not described herein again.

Case c2: The first protocol field may be a newly added protocol field in the protocol stack shown in FIG. 5, and may be denoted as a new protocol field (briefly referred to as a NEW field below). For example, in this case, when the access device detects that the third timestamp information and the fourth timestamp information are encapsulated in the SDAP field or the PDCP field in the received fourth packet, the access device extracts the third timestamp information and the fourth timestamp information from the SDAP field or the PDCP field. Then, the access device adds a new protocol field NEW field to the packet protocol field corresponding to the access device shown in FIG. 5, for example, as shown in a packet protocol field corresponding to the access device in a protocol stack architecture shown in FIG. 6, and then encapsulates the third timestamp information and the fourth timestamp information in the NEW field to obtain the second packet. In this case, the NEW field in the second packet includes the third timestamp information and the fourth timestamp information.

In another possible implementation, when the second protocol field meets Case a2 in operation 304, the first protocol field may have the following two cases:

Case d1: The first protocol field may be a GTP field. In this case, when the access device detects that the third timestamp information and the fourth timestamp information are encapsulated in the NEW field in the received fourth packet, the access device extracts the third timestamp information and the fourth timestamp information from the NEW field, and then encapsulates the third timestamp information and the fourth timestamp information in a GTP field in a packet protocol field corresponding to the access device shown in FIG. 5, to generate the second packet. In this case, the GTP field in the second packet includes the third timestamp information and the fourth timestamp information.

Certainly, in addition to the GTP field, the first protocol field may be any other field in the packet protocol field corresponding to the access device shown in FIG. 5. This is not limited in this application. When the first protocol field is another protocol field, details are not described herein again.

Case d2: The first protocol field may be a newly added protocol field in the protocol stack shown in FIG. 5, and may be denoted as a new protocol field (briefly referred to as a NEW field below). For example, in this case, when the access device detects that the third timestamp information and the fourth timestamp information are encapsulated in the NEW field in the received fourth packet, the access device extracts the third timestamp information and the fourth timestamp information from the NEW field. Then, the access device adds a new protocol field NEW field to the packet protocol field corresponding to the access device shown in FIG. 5, for example, as shown in a packet protocol field corresponding to the access device in a protocol stack architecture shown in FIG. 6, and then encapsulates the third timestamp information and the fourth timestamp information in the NEW field to obtain the second packet. In this case, the NEW field in the second packet includes the third timestamp information and the fourth timestamp information.

In another possible implementation, when the second protocol field meets Case b1 in operation 304, the first protocol field may have the following two cases:

Case e1: The first protocol field may be an SDAP field or a PDCP field. In this case, when the access device detects that the third timestamp information and the fourth timestamp information are encapsulated in the GTP field in the received fourth packet, the access device extracts the third timestamp information and the fourth timestamp information from the GTP field, and then encapsulates the third timestamp information and the fourth timestamp information in an SDAP field or a PDCP field in a packet protocol field corresponding to the access device shown in FIG. 5, to generate the second packet. In this case, the SDAP field or the PDCP field in the second packet includes the third timestamp information and the fourth timestamp information.

Certainly, in addition to the SDAP field or the PDCP field, the first protocol field may be any other field in the packet protocol field corresponding to the access device shown in FIG. 5. This is not limited in this application. When the first protocol field is another protocol field, details are not described herein again.

Case e2: The first protocol field may be a newly added protocol field in the protocol stack shown in FIG. 5, and may be denoted as a new protocol field (briefly referred to as a NEW field below). For example, in this case, when the access device detects that the third timestamp information and the fourth timestamp information are encapsulated in the GTP field in the received fourth packet, the access device extracts the third timestamp information and the fourth timestamp information from the GTP field. Then, the access device adds a new protocol field NEW field to the packet protocol field corresponding to the access device shown in FIG. 5, for example, as shown in a packet protocol field corresponding to the access device in a protocol stack architecture shown in FIG. 6, and then encapsulates the third timestamp information and the fourth timestamp information in the NEW field to obtain the second packet. In this case, the NEW field in the second packet includes the third timestamp information and the fourth timestamp information.

In another possible implementation, when the second protocol field meets Case b2 in operation 304, the first protocol field may have the following two cases:

Case f1: The first protocol field may be an SDAP field or a PDCP field. In this case, when the access device detects that the third timestamp information and the fourth timestamp information are encapsulated in the NEW field in the received fourth packet, the access device extracts the third timestamp information and the fourth timestamp information from the NEW field, and then encapsulates the third timestamp information and the fourth timestamp information in an SDAP field or a PDCP field in a packet protocol field corresponding to the access device shown in FIG. 5, to generate the second packet. In this case, the SDAP field or the PDCP field in the second packet includes the third timestamp information and the fourth timestamp information.

Certainly, in addition to the SDAP field or the PDCP field, the first protocol field may be any other field in the packet protocol field corresponding to the access device shown in FIG. 5. This is not limited in this application. When the first protocol field is another protocol field, details are not described herein again.

Case f2: Same as Case d2, reference may be made to each other. Details are not described herein again.

For example, when the fourth packet carries the flag, in Cases c1, c2, d1, d2, e1, e2, f1 and f2, the access device may perform the foregoing process when detecting that the second protocol field in the fourth packet includes the flag. For example, the access device extracts the flag from the second protocol field, and also encapsulates the flag in the first protocol field.

For example, after the first device receives the second packet, the first device extracts the third timestamp information and the fourth timestamp information that are carried in the first protocol field included in the second packet. For example, based on the various cases of the first protocol field described above, there may be the following three cases:

Case g1: The first device extracts the third timestamp information and the fourth timestamp information from the GTP field. In this case, the first device is the user plane network element, and a packet protocol field corresponding to the first device is a field corresponding to the user plane network element shown in FIG. 5.

Case g2: The first device extracts the third timestamp information and the fourth timestamp information from the SDAP field or the PDCP field. In this case, the first device is the terminal device, and a packet protocol field corresponding to the first device is a field corresponding to the terminal device shown in FIG. 5.

Case g3: The first device extracts the third timestamp information and the fourth timestamp information from the NEW field. In this case, the first device is the terminal device or the user plane network element. When the first device is the terminal device, a packet protocol field corresponding to the first device is a field corresponding to the terminal device shown in FIG. 6. When the first device is the user plane network element, a packet protocol field corresponding to the first device is a field corresponding to the user plane network element shown in FIG. 6.

In an embodiment, when the access device detects that the second protocol field is the NEW field, or when the third timestamp information and the fourth timestamp information are encapsulated in the NEW field, the access device may not process the fourth packet, but directly forwards the fourth packet to the first device. In this case, the fourth packet is the second packet. In this way, after the first device receives the second packet, the first device may directly extract the third timestamp information and the fourth timestamp information from the second protocol field (namely, the NEW field). In this case, the packet protocol field corresponding to the first device is the field corresponding to the user plane network element or the terminal device shown in FIG. 6. In this process, a packet protocol field corresponding to the access device is a field corresponding to the access device shown in FIG. 5.

Operation 307: The first device determines fifth timestamp information and sixth timestamp information, where the fifth timestamp information is a moment that is in the Ethernet network and at which the first device receives the second packet, and the sixth timestamp information is a moment that is in the mobile network and at which the first device receives the second packet.

For example, in FIG. 4, the moment corresponding to the fifth timestamp information is denoted as t4, and the moment corresponding to the sixth timestamp information is denoted as t4'.

Operation 308: The first device determines seventh timestamp information based on the second timestamp information, the third timestamp information, the fourth timestamp information, the fifth timestamp information, and the sixth timestamp information.

In an embodiment, when the first device performs operation 308, a method may be: The first device determines a round-trip transmission delay difference between the first device and the second device based on the second timestamp information (t1'), the third timestamp information (t2'), the fourth timestamp information (t3'), and the sixth timestamp information (t4'). The first device calculates a sum of the moment (t4) corresponding to the fifth timestamp information and the round-trip transmission delay difference, to obtain the seventh timestamp information.

For example, the round-trip transmission delay difference between the first device and the second device may be calculated through clock synchronization between the first device and the second device that is implemented in the mobile network. For example, the round-trip transmission delay difference may be obtained through calculation by using Formula 1 and Formula 2:

$$t2-t1'=delay1+offset1 \quad \text{Formula 1; and}$$

$$t4-t3'=delay2-offset1 \quad \text{Formula 2.}$$

In the foregoing formulas, offset 1 is a time offset between the first device and the second device in the mobile network, delay 1 is a transmission delay from the first device to the second device, and delay 2 is a transmission delay from the second device to the first device.

Due to clock synchronization in the mobile network, a value of offset 1 is 0. Therefore, the round-trip transmission delay difference may be obtained by using Formula 1 and Formula 2, that is, delay 1−delay 2=t2'−t1'−t4'+t3'.

Further, a moment corresponding to the seventh timestamp information is t4+t2'−t1'−t4'+t3'.

Operation 309: The first device sends the seventh timestamp information to the access device.

For example, in the prior art, the first device sends the fifth timestamp information to the access device, so that the access device sends the fifth timestamp information to the second device. In this application, the first device sends the seventh timestamp information to the second device by using an existing method for sending the fifth timestamp information. It may also be understood that the seventh timestamp information is sent to the second device in place of the fifth timestamp information. In this way, when receiving the seventh timestamp information, the second device uses the seventh timestamp information as the fifth timestamp information in the prior art for processing.

Operation 310: The access device sends the seventh timestamp information to the second device.

Operation 311: The second device determines a time offset between the first device and the second device based on the first timestamp information (t1), the eighth timestamp information (t2), the ninth timestamp information (t3), and the seventh timestamp information (t4+t2'−t1'−t4'+t3'), and performs time synchronization based on the time offset.

In an embodiment, as described in operation 309, the second device may determine, based on the seventh timestamp information, the moment that is in the Ethernet network, at which the first device receives the second packet, and that is considered by the second device, and use the seventh timestamp information as the fifth timestamp information.

For example, a time offset, namely, offset 2, between the first device and the second device may satisfy Formula 3:

$$offset2 = \frac{t2 - t1 - (t4 + t2' - t1' - t4' + t3') + t3}{2}. \quad \text{Formula 3}$$

It should be noted that all packets in an embodiment are 802.1AS protocol packets.

In an embodiment, when the timestamp information corresponding to the moment in the mobile network is carried in any one of the GTP field, the SDAP field, the NEW field, and the like in the packet, N bytes may be reserved in a corresponding protocol field to store the timestamp information. For example, N is a positive integer, for example, N is 10. For example, when the protocol field carries both the timestamp information and the flag, M bytes are reserved in the protocol field to store the flag, where M is a positive integer. For example, M is 1.

According to the synchronization method provided in an embodiment of this application, the first device determines the seventh timestamp information by using timestamp information of receiving and sending packets in the mobile network, so that the second device calculates a time offset between the first device and the second device based on the seventh timestamp information and time points of receiving and sending packets in the Ethernet network, to perform time synchronization. In the method, impact of a transmission delay between the first device and the second device can be avoided, so that a time precision requirement of an industrial factory can be met in a scenario in which the mobile network is connected to the Ethernet network.

Figure 7:
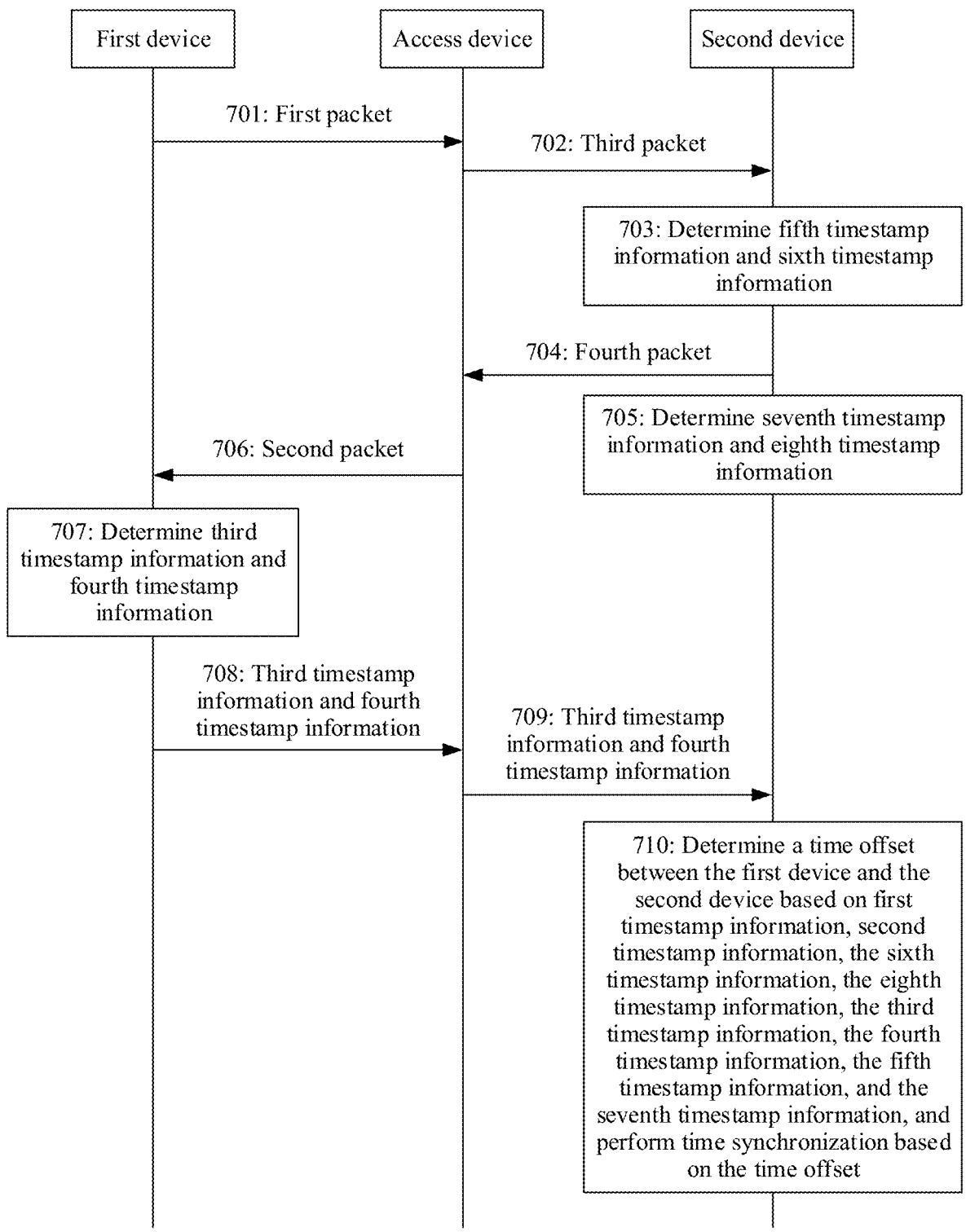
FIG. 7 is a flowchart of another synchronization method according to an embodiment of the application.

An embodiment of this application further provides another synchronization method, which is applicable to the communications systems shown in FIG. 1 and FIG. 2. For example, in FIG. 7, a first device is the UPF and a second device is the UE, or the first device is the UE and the second device is the UPF. Referring to FIG. 7, a procedure of the method may include the following operations.

Operation 701: The first device sends a first packet to an access device, where the first packet carries first timestamp information and second timestamp information, the first timestamp information is a moment that is in an Ethernet network and at which the first device sends the first packet, and the second timestamp information is a moment that is in a mobile network and at which the first device sends the first packet.

A trigger condition for initiating a clock synchronization procedure by the first device is the same as the principle described in operation 301 in the embodiment shown in FIG. 3. For details, reference may be made to each other. The details are not described herein again.

For the schematic diagram of packet receiving and sending in the process of performing synchronization between the first device and the second device that is shown in FIG. 4, also refer to an embodiment. For example, the moment corresponding to the first timestamp information in operation 401 is denoted as t1 in FIG. 4, and the second timestamp information is denoted as t1' in FIG. 4.

The first device is a user plane network element and the second device is a terminal device, or the first device is a terminal device and the second device is a user plane network element. In other words, either of the user plane network element and the terminal device may be a master clock node, and the other needs to perform clock synchronization.

For example, the first packet may further carry a flag, and the flag is used to indicate that the first packet carries timestamp information indicating a moment in the mobile network.

In an embodiment, a implementation method in which the first packet carries the second timestamp information may be: The first device uses a first protocol field included in the first packet to carry the second timestamp information. For example, the first protocol field may be an existing protocol field in the first packet in a current protocol stack framework. Alternatively, the first protocol field may be a protocol field newly added to the first packet in a current protocol stack framework. For example, when the first packet further carries a flag, the flag may also be carried in the first protocol field.

Similarly, the first protocol field is described in detail still based on the example shown in FIG. 5.

In an example implementation, when the first device is the terminal device and the second device is the user plane network element, the first protocol field may have the following two cases:

Case h1: The first protocol field may be an SDAP field or a PDCP field. In this case, the first device encapsulates the second timestamp information in an SDAP field or a PDCP field in a packet protocol field corresponding to the terminal device shown in FIG. 5, and then sends the first packet obtained after the encapsulation to the access device.

Certainly, in addition to the SDAP field or the PDCP field, the first protocol field may be any other field in the packet protocol field corresponding to the terminal device shown in FIG. 5. This is not limited in this application. When the first protocol field is another protocol field, details are not described herein again.

Case h2: The first protocol field may be a newly added protocol field in the protocol stack shown in FIG. 5, and may be denoted as a new protocol field (briefly referred to as a NEW field below). For example, in this case, the first device adds a new protocol field NEW field to the packet protocol field corresponding to the terminal device shown in FIG. 5, for example, as shown in a packet protocol field corresponding to the terminal device in a protocol stack architecture shown in FIG. 6, then encapsulates the second timestamp information in the NEW field, and sends the first packet obtained after the encapsulation to the access device.

It should be noted that the NEW field is merely used as an example. For example, the NEW field may alternatively have any other names with a same function. This is not limited in this application.

In another example implementation, when the first device is the user plane network element and the second device is the terminal device, the first protocol field may have the following two cases:

Case i1: The first protocol field is a GTP field. In this case, the first device encapsulates the second timestamp information in a GTP field in a packet protocol field corresponding to the user plane network element shown in FIG. 5, and then sends the first packet obtained after the encapsulation to the access device.

Certainly, in addition to the GTP field, the first protocol field may be any other field in the packet protocol field corresponding to the user plane network element shown in FIG. 5. This is not limited in this application. When the first protocol field is another field, details are not described herein again.

Case i2: The first protocol field may be a newly added protocol field in the protocol stack shown in FIG. 5, and may be denoted as a new protocol field (briefly referred to as a NEW field below). For example, in this case, the first device adds a new protocol field NEW field to the packet protocol field corresponding to the user plane network element shown in FIG. 5, for example, as shown in a packet protocol field corresponding to the user plane network element in a protocol stack architecture shown in FIG. 6, then encapsulates the second timestamp information in the NEW field, and sends the first packet obtained after the encapsulation to the access device.

It should be noted that the NEW field is merely used as an example. For example, the NEW field may alternatively have any other names with a same function. This is not limited in this application.

Operation 702: The access device sends a third packet to the second device based on the first packet, where the third packet carries the first timestamp information and the second timestamp information.

In an embodiment, a method in which the access device sends the third packet to the second device based on the first packet may be: When the access device detects that a first protocol field included in the first packet includes the second timestamp information, the access device encapsulates the second timestamp information in a second protocol field included in the first packet to generate the third packet, and sends the third packet to the second device. In this case, a second protocol field in the third packet carries the second timestamp information.

For example, for a case of the first protocol field, refer to the related descriptions of the first protocol field in operation 701. Similarly, the second protocol field may also be an existing protocol field, or may be a newly added field in an existing protocol stack framework. There may be a plurality of actual cases of the second protocol field based on actual cases of the first device and the second device and different actual cases of the first protocol field.

In an embodiment, when the first protocol field meets Case h1 in operation 701, the second protocol field may have the following two cases:

Case j1: The second protocol field may be a GTP field. In this case, when the access device detects that the second timestamp information is encapsulated in the SDAP field or the PDCP field in the received first packet, the access device extracts the second timestamp information from the SDAP field or the PDCP field, and then encapsulates the second timestamp information in a GTP field in a packet protocol field corresponding to the access device shown in FIG. 5, to generate the third packet. In this case, the GTP field in the third packet includes the second timestamp information.

Certainly, in addition to the GTP field, the second protocol field may be any other field in the packet protocol field corresponding to the access device shown in FIG. 5. This is not limited in this application. When the second protocol field is another protocol field, details are not described herein again.

Case j2: The second protocol field may be a newly added protocol field in the protocol stack shown in FIG. 5, and may be denoted as a new protocol field (briefly referred to as a NEW field below). For example, in this case, when the access device detects that the second timestamp information is encapsulated in the SDAP field or the PDCP field in the received first packet, the access device extracts the second timestamp information from the SDAP field or the PDCP field. Then, the access device adds a new protocol field NEW field to the packet protocol field corresponding to the access device shown in FIG. 5, for example, as shown in a packet protocol field corresponding to the access device in a protocol stack architecture shown in FIG. 6, and then encapsulates the second timestamp information in the NEW field to obtain the third packet. In this case, the NEW field in the third packet includes the second timestamp information.

In another embodiment, when the first protocol field meets Case h2 in operation 701, the second protocol field may have the following two cases:

Case k1: The second protocol field may be a GTP field. In this case, when the access device detects that the second timestamp information is encapsulated in the NEW field in the received first packet, the access device extracts the second timestamp information from the NEW field, and then encapsulates the second timestamp information in a GTP field in a packet protocol field corresponding to the access device shown in FIG. 5, to generate the third packet. In this case, the GTP field in the third packet includes the second timestamp information.

Certainly, in addition to the GTP field, the second protocol field may be any other field in the packet protocol field corresponding to the access device shown in FIG. 5. This is not limited in this application. When the second protocol field is another protocol field, details are not described herein again.

Case k2: The second protocol field may be a newly added protocol field in the protocol stack shown in FIG. 5, and may be denoted as a new protocol field (briefly referred to as a NEW field below). For example, in this case, when the access device detects that the second timestamp information is encapsulated in the NEW field in the received first packet, the access device extracts the second timestamp information from the NEW field. Then, the access device adds a new protocol field NEW field to the packet protocol field corresponding to the access device shown in FIG. 5, for example, as shown in a packet protocol field corresponding to the access device in a protocol stack architecture shown in FIG. 6, and then encapsulates the second timestamp information in the NEW field to obtain the third packet. In this case, the NEW field in the third packet includes the second timestamp information.

In another embodiment, when the first protocol field meets Case i1 in operation 701, the second protocol field may have the following two cases:

Case l1: The second protocol field may be an SDAP field or a PDCP field. In this case, when the access device detects that the second timestamp information is encapsulated in the GTP field in the received first packet, the access device extracts the second timestamp information from the GTP field, and then encapsulates the second timestamp information in an SDAP field or a PDCP field in a packet protocol field corresponding to the access device shown in FIG. 5, to generate the third packet. In this case, the SDAP field or the PDCP field in the third packet includes the second timestamp information.

Certainly, in addition to the SDAP field or the PDCP field, the second protocol field may be any other field in the packet protocol field corresponding to the access device shown in FIG. 5. This is not limited in this application. When the second protocol field is another protocol field, details are not described herein again.

Case l2: The second protocol field may be a newly added protocol field in the protocol stack shown in FIG. 5, and may be denoted as a new protocol field (briefly referred to as a NEW field below). For example, in this case, when the access device detects that the second timestamp information is encapsulated in the GTP field in the received first packet, the access device extracts the second timestamp information from the GTP field. Then, the access device adds a new protocol field NEW field to the packet protocol field corresponding to the access device shown in FIG. 5, for example, as shown in a packet protocol field corresponding to the access device in a protocol stack architecture shown in FIG. 6, and then encapsulates the second timestamp information in the NEW field to obtain the third packet. In this case, the NEW field in the third packet includes the second timestamp information.

In another embodiment, when the second protocol field meets Case i2 in operation 701, the second protocol field may have the following two cases:

Case m1: The second protocol field may be an SDAP field or a PDCP field. In this case, when the access device detects that the second timestamp information is encapsulated in the NEW field in the received first packet, the access device extracts the second timestamp information from the NEW field, and then encapsulates the second timestamp information in an SDAP field or a PDCP field in a packet protocol field corresponding to the access device shown in FIG. 5, to generate the third packet. In this case, the SDAP field or the PDCP field in the third packet includes the second timestamp information.

Certainly, in addition to the SDAP field or the PDCP field, the second protocol field may be any other field in the packet protocol field corresponding to the access device shown in FIG. 5. This is not limited in this application. When the second protocol field is another protocol field, details are not described herein again.

Case m2: Same as Case k2, reference may be made to each other. Details are not described herein again.

For example, when the first packet carries the flag, in Cases j1, j2, k1, k2, l1, l2, m1, and m2, the access device may perform the foregoing process when detecting that the first protocol field in the first packet includes the flag. For example, the access device may extract the flag from the first protocol field, and also encapsulate the flag in the second protocol field.

For example, after the second device receives the third packet, the second device extracts the second timestamp information carried in the second protocol field included in the third packet. For example, based on the various cases of the second protocol field described above, there may be the following three cases:

Case n1: The second device extracts the second timestamp information from the GTP field. In this case, the second device is the user plane network element, and a packet protocol field corresponding to the second device is a field corresponding to the user plane network element shown in FIG. 5.

Case n2: The second device extracts the second timestamp information from the SDAP field or the PDCP field. In this case, the second device is the terminal device, and a packet protocol field corresponding to the second device is a field corresponding to the terminal device shown in FIG. 5.

Case n3: The second device extracts the second timestamp information from the NEW field. In this case, the second device is the terminal device or the user plane network element. When the second device is the terminal device, a packet protocol field corresponding to the second device is a field corresponding to the terminal device shown in FIG. 6. When the second device is the user plane network element, a packet protocol field corresponding to the second device is a field corresponding to the user plane network element shown in FIG. 6.

In an embodiment, when the access device detects that the first protocol field is the NEW field, or when the second timestamp information is encapsulated in the NEW field, the access device may not process the first packet, but directly forwards the first packet to the second device. In this case, the first packet is the third packet. In this way, after the second device receives the third packet, the second device may directly extract the second timestamp information from the first protocol field (namely, the NEW field). In this case, the packet protocol field corresponding to the second device is the field corresponding to the user plane network element or the terminal device shown in FIG. 6. In this process, a packet protocol field corresponding to the access device is a field corresponding to the access device shown in FIG. 5.

Operation 703: The second device determines fifth timestamp information and sixth timestamp information, where the fifth timestamp information is a moment that is in the Ethernet network and at which the second device receives the third packet, and the sixth timestamp information is a moment that is in the mobile network and at which the second device receives the third packet.

For example, the moment corresponding to the fifth timestamp information may be t2 in FIG. 4, and the moment corresponding to the sixth timestamp information may be t2' in FIG. 4.

Operation 704: The second device sends a fourth packet to the access device.

The fourth packet may not carry any timestamp information, and is merely used as a packet in a synchronization procedure to identify time points of receiving and sending packets. For example, timestamp information in operation 705 is obtained based on the fourth packet.

Operation 705: The second device determines seventh timestamp information and eighth timestamp information, where the seventh timestamp information is a moment that is in the Ethernet network and at which the second device sends the fourth packet to the access device, and the eighth timestamp information is a moment that is in the mobile network and at which the second device sends the fourth packet to the access device.

For example, the moment corresponding to the seventh timestamp information may be t3 in FIG. 4, and the moment corresponding to the eighth timestamp information may be t3' in FIG. 4.

Operation 706: The access device sends a second packet to the first device based on the fourth packet.

When the access device performs operation 706, the method may be: The access device forwards the fourth packet to the first device. In this case, the fourth packet is the second packet.

Operation 707: After receiving the second packet, the first device determines third timestamp information and fourth timestamp information, where the third timestamp information is a moment that is in the Ethernet network and at which the first device receives the second packet, and the fourth timestamp information is a moment that is in the mobile network and at which the first device receives the second packet.

For example, the moment corresponding to the third timestamp information may be t4 in FIG. 4, and the moment corresponding to the fourth timestamp information may be t4' in FIG. 4.

Operation 708: The first device sends the third timestamp information and the fourth timestamp information to the access device.

For example, when the first device performs operation 708, a method may be: The first device sends a fifth packet to the access device, where the fifth packet carries the third timestamp information and the fourth timestamp information.

A case in which the fifth packet carries the fourth timestamp information and a principle of processing the fifth packet by the first device are the same as a case in which the first packet carries the second timestamp in operation 701 and a principle of processing the first packet by the first device. For details, reference may be made to each other. The details are not described herein again.

Operation 709: The access device sends the third timestamp information and the fourth timestamp information to the second device.

For example, a method in which the access device performs operation 709 may be: The access device sends a sixth packet to the second device based on the fifth packet, where the sixth packet carries the third timestamp information and the fourth timestamp information.

A case in which the sixth packet carries the fourth timestamp information and a principle of processing the fifth packet by the access device to generate the sixth packet are the same as a case in which the third packet carries the second timestamp information in operation 702 and a principle of processing the first packet by the access device to generate the third packet. For details, reference may be made to each other. The details are not described herein again.

Operation 710: The second device determines a time offset between the first device and the second device based on the first timestamp information, the second timestamp information, the sixth timestamp information, the eighth timestamp information, the third timestamp information, the fourth timestamp information, the fifth timestamp information, and the seventh timestamp information, and performs time synchronization based on the time offset.

In an embodiment, when the second device performs operation 710, a method may be: The second device determines a round-trip transmission delay difference between the first device and the second device based on the second timestamp information (t1'), the sixth timestamp information (t2'), the eighth timestamp information (t3'), and the fourth timestamp information (t4'). The second device determines a time offset between the first device and the second device based on the first timestamp information (t1), the third timestamp information (t4), the fifth timestamp information (t2), the seventh timestamp information (t3), and the round-trip transmission delay difference.

For example, for a process of calculating the round-trip transmission delay difference, refer to Formula 1 and Formula 2 in the embodiment shown in FIG. 3. Therefore, the round-trip transmission delay difference is obtained through calculation, that is, delay 1−delay 2=t2'−t1'−t4'+t3'. For details, refer to the detailed process in operation 308. The details are not described herein again.

In an embodiment, a method in which the second device determines the time offset between the first device and the second device based on the first timestamp information, the third timestamp information, the fifth timestamp information, the seventh timestamp information, and the round-trip transmission delay difference may be: The second device determines ninth timestamp information, where the ninth timestamp information is a sum of the moment corresponding to the third timestamp information and the round-trip transmission delay difference. The second device determines the time offset between the first device and the second device based on the first timestamp information, the fifth timestamp information, the seventh timestamp information, and the ninth timestamp information.

For example, based on the obtained round-trip transmission delay difference, it can be learned that a moment corresponding to the ninth timestamp information is t4+t2'−t1'−t4'+t3'.

For example, the time offset between the first device and the second device may still satisfy Formula 3 in the embodiment shown in FIG. 3. Details are not described herein again.

It should be noted that all packets in an embodiment are 802.1AS protocol packets.

In an embodiment, when the timestamp information corresponding to the moment in the mobile network is carried in any one of the GTP field, the SDAP field, the NEW field, and the like in the packet, N bytes may be reserved in a corresponding protocol field to store the timestamp information. For example, N is a positive integer, for example, N is 10. For example, when the protocol field carries both the timestamp information and the flag, M bytes are reserved in the protocol field to store the flag, where M is a positive integer. For example, M is 1.

According to the synchronization method provided in an embodiment of this application, the second device calculates the time offset between the first device and the second device by using timestamp information of receiving and sending packets in the mobile network and timestamp information of receiving and sending packets in the Ethernet network, to perform time synchronization. In the method, impact of a transmission delay between the first device and the second device can be avoided, so that a time precision requirement of an industrial factory can be met in a scenario in which the mobile network is connected to the Ethernet network.

Figure 8:
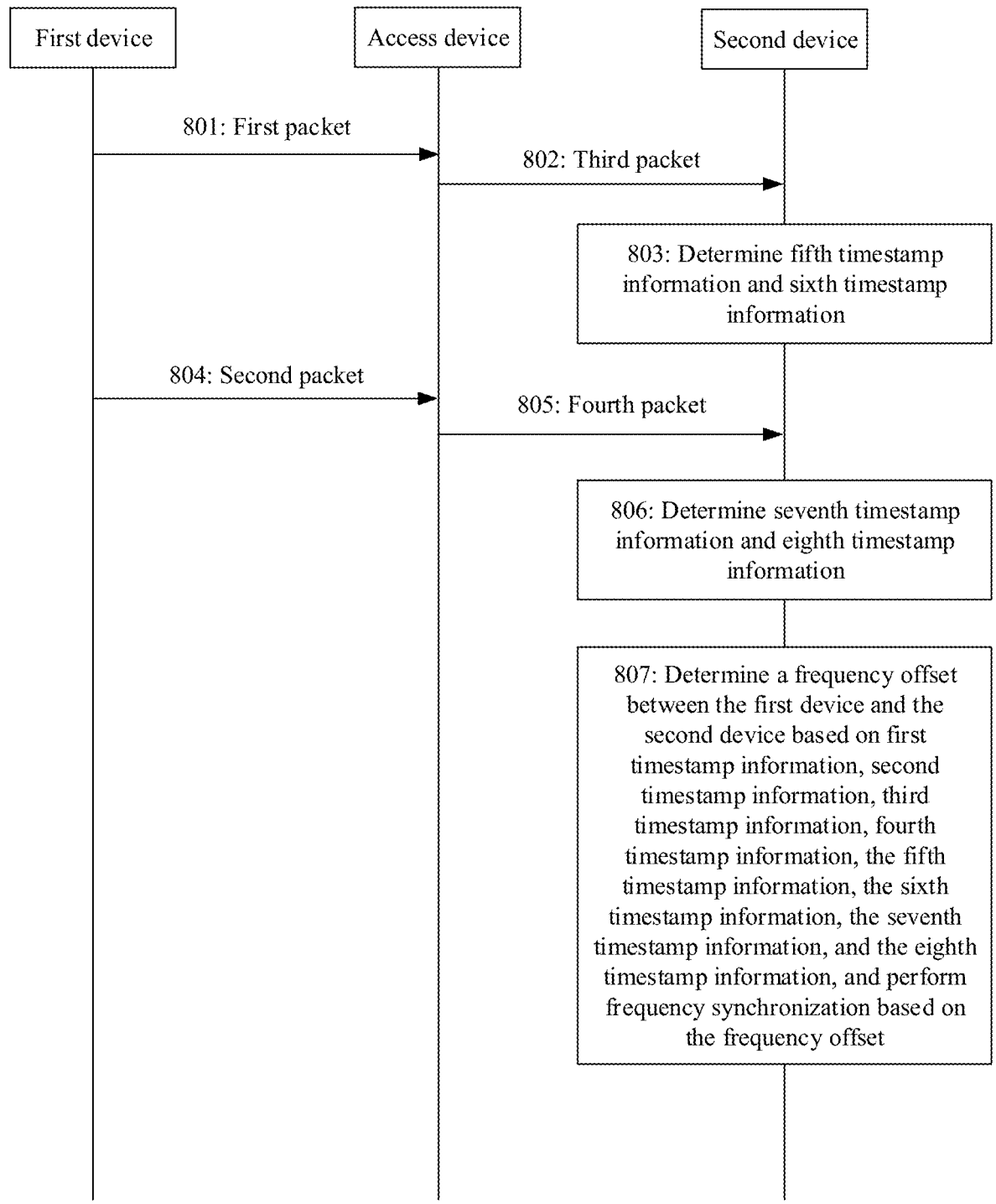
FIG. 8 is a flowchart of another synchronization method according to an embodiment of the application.

An embodiment of this application further provides another synchronization method, which is applicable to the communications systems shown in FIG. 1 and FIG. 2. For example, in FIG. 8, a first device is the UPF and a second device is the UE, or the first device is the UE and the second device is the UPF. Referring to FIG. 8, a procedure of the method may include the following operations.

Operation 801: The first device sends a first packet to an access device, where the first packet carries first timestamp information and second timestamp information, the first timestamp information is a moment that is in an Ethernet network and at which the first device sends the first packet, and the second timestamp information is a moment that is in a mobile network and at which the first device sends the first packet.

In an embodiment, before the first device sends the first packet to the access device, the first device receives a data packet from the Ethernet network (for example, a TSN). After the first device identifies that the data packet is an 802.1AS frequency synchronization data packet, the first device sends the first packet to the access device, and in this case, initiates a clock synchronization procedure (herein referred to as a frequency synchronization procedure).

Figure 9:
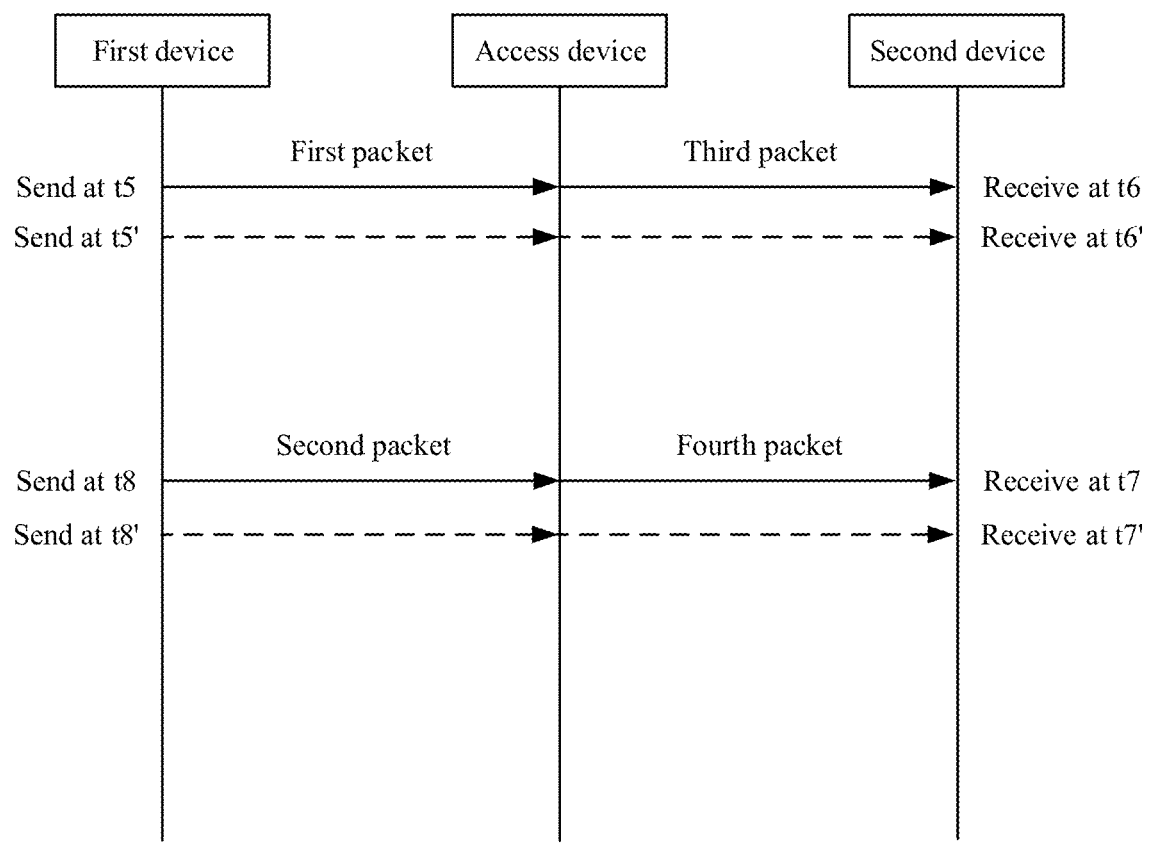
FIG. 9 is another schematic diagram of packet receiving and sending in a synchronization process according to an embodiment of the application.

For example, FIG. 9 is a schematic diagram of packet receiving and sending in a process of performing frequency synchronization between the first device and the second device. In FIG. 9, a solid line indicates a transmission status of a packet in the Ethernet network, and a dashed line indicates a transmission status of a packet in the mobile network. It should be understood that in FIG. 9, a solid line and a dashed line that are parallel in a same direction indicate transmission of a same packet.

For example, in operation 801, the moment corresponding to the first timestamp information is denoted as t5 in FIG. 9, and the second timestamp information is denoted as t5' in FIG. 9.

The first device is a user plane network element and the second device is a terminal device, or the first device is a terminal device and the second device is a user plane network element. In other words, either of the user plane network element and the terminal device may be a master clock node, and the other needs to perform clock synchronization.

For example, the first packet may further carry a flag, and the flag is used to indicate that the first packet carries timestamp information indicating a moment in the mobile network.

In an embodiment, a implementation method in which the first packet carries the second timestamp information may be: The first device uses a first protocol field included in the first packet to carry the second timestamp information. For example, the first protocol field may be an existing protocol field in the first packet in a current protocol stack framework. Alternatively, the first protocol field may be a protocol field newly added to the first packet in a current protocol stack framework. For example, when the first packet further carries a flag, the flag may also be carried in the first protocol field.

For example, the first protocol field may be the same as the first protocol field in operation 701 in the embodiment shown in FIG. 7. For detailed descriptions of the first protocol field, refer to the related descriptions in operation 701. No repeated description is provided herein.

Operation 802: The access device sends a third packet to the second device based on the first packet, where the third packet carries the first timestamp information and the second timestamp information.

In an embodiment, a method in which the access device sends the third packet to the second device based on the first packet may be: When the access device detects that a first protocol field included in the first packet includes the second timestamp information, the access device encapsulates the second timestamp information in a third protocol field included in the first packet to generate the third packet, and sends the third packet to the second device.

For example, the first protocol field is the same as the first protocol field in operation 801. For details, also refer to the related descriptions in operation 701. The third protocol field may also be an existing protocol field, or may be a newly added field in an existing protocol stack framework. For example, an execution principle of sending the third packet by the access device to the second device based on the first packet is the same as the principle of sending the third packet by the access device to the second device based on the first packet in operation 702 in the embodiment shown in FIG. 7. For details, refer to the related principle in operation 702. The third protocol field may be the same as the second protocol field in operation 702. For details, reference may be made to each other. The details are not described herein again.

Operation 803: The second device determines fifth timestamp information and sixth timestamp information, where the fifth timestamp information is a moment that is in the Ethernet network and at which the second device receives the third packet, and the sixth timestamp information is a moment that is in the mobile network and at which the second device receives the third packet.

For example, the moment corresponding to the fifth timestamp information may be t6 in FIG. 9, and the moment corresponding to the sixth timestamp information may be t6' in FIG. 9.

Operation 804: The first device sends a second packet to the access device, where the second packet carries third timestamp information and fourth timestamp information, the third timestamp information is a moment that is in the Ethernet network and at which the first device sends the second packet, and the fourth timestamp information is a moment that is in the mobile network and at which the first device sends the second packet.

For example, the moment corresponding to the third timestamp information may be t8 in FIG. 9, and the moment corresponding to the fourth timestamp information may be t8' in FIG. 9.

For example, a implementation method in which the second packet carries the fourth timestamp information may be: The first device uses a second protocol field included in the second packet to carry the fourth timestamp information. For example, the second protocol field may be an existing protocol field in the second packet in a current protocol stack framework. Alternatively, the second protocol field may be a protocol field newly added to the second packet in a current protocol stack framework. For example, when the second packet further carries a flag, the flag may also be carried in the second protocol field.

For example, the second protocol field may be the same as the first protocol field in operation 701 in the embodiment shown in FIG. 7. For detailed descriptions of the second protocol field, refer to the related descriptions of the first protocol field in operation 701. No repeated description is provided herein.

Operation 805: The access device sends a fourth packet to the second device based on the second packet, where the fourth packet carries the third timestamp information and the fourth timestamp information.

In an embodiment, a method in which the access device sends the fourth packet to the second device based on the second packet may be: When the access device detects that a second protocol field included in the second packet includes the fourth timestamp information, the access device encapsulates the fourth timestamp information in a fourth protocol field in the second packet to generate the fourth packet, and sends the fourth packet to the second device.

For example, the second protocol field is the same as the second protocol field in operation 804. For details, also refer to the related descriptions of the first protocol field in operation 701. The fourth protocol field may also be an existing protocol field, or may be a newly added field in an existing protocol stack framework. For example, an execution principle of sending the fourth packet by the access device to the second device based on the second packet is the same as the principle of sending the third packet by the access device to the second device based on the first packet in operation 702 in the embodiment shown in FIG. 7. For details, refer to the related principle in operation 702. The fourth protocol field may be the same as the second protocol field in operation 702. For details, reference may be made to each other. The details are not described herein again.

Operation 806: The second device determines seventh timestamp information and eighth timestamp information, where the seventh timestamp information is a moment that is in the Ethernet network and at which the second device receives the fourth packet, and the eighth timestamp information is a moment that is in the mobile network and at which the second device receives the fourth packet.

For example, the moment corresponding to the seventh timestamp information may be t7 in FIG. 9, and the moment corresponding to the eighth timestamp information may be t7' in FIG. 9.

Operation 807: The second device determines a frequency offset between the first device and the second device based on the first timestamp information, the second timestamp information, the third timestamp information, the fourth timestamp information, the fifth timestamp information, the sixth timestamp information, the seventh timestamp information, and the eighth timestamp information, and performs frequency synchronization based on the frequency offset.

In an embodiment, a method in which the second device determines the frequency offset between the first device and the second device based on the first timestamp information (t5), the second timestamp information (t5'), the third timestamp information (t8), the fourth timestamp information (t8'), the fifth timestamp information (t6), the sixth timestamp information (t6'), the seventh timestamp information (t7), and the eighth timestamp information (t7') may be: The second device determines a first difference between the moment corresponding to the sixth timestamp information and the moment corresponding to the second timestamp information, and determines a second difference between the moment corresponding to the eighth timestamp information and the moment corresponding to the fourth timestamp information. The second device determines the frequency offset between the first device and the second device based on the first timestamp information, the third timestamp information, the fifth timestamp information, the seventh timestamp information, the first difference, and the second difference. For example, the first difference may be denoted as t6'−t5', and the second difference may be denoted as t7'−t8'.

In an embodiment, a method in which the second device determines the frequency offset between the first device and the second device based on the first timestamp information, the third timestamp information, the fifth timestamp information, the seventh timestamp information, the first difference, and the second difference may be:

The second device determines a value relationship between the first difference and the second difference.

When the second device determines that the second difference is less than the first difference, the second device determines that the frequency offset is a quotient of a first value and a second value, where the first value is a difference between the moment corresponding to the third timestamp information and the moment corresponding to the first timestamp information, the second value is a value obtained by adding a third value to a difference between the moment corresponding to the seventh timestamp information and the moment corresponding to the fifth timestamp information, the third value is a product value of a fourth value and a fifth value, the fourth value is a value obtained by subtracting the second difference from the first difference, and the fifth value is a value obtained by dividing the difference between the moment corresponding to the seventh timestamp information and the moment corresponding to the fifth timestamp by a difference between the moment corresponding to the eighth timestamp information and the moment corresponding to the sixth timestamp.

When the second device determines that the second difference is greater than the first difference, the second device determines that the frequency offset is a quotient of the first value and a sixth value, where the sixth value is a value obtained by subtracting a seventh value from a difference between the moment corresponding to the seventh timestamp information and the moment corresponding to the fifth timestamp information, the seventh value is a product value of an eighth value and the fifth value, and the eighth value is a value obtained by subtracting the first difference from the second difference.

For example, when the first difference is less than the second difference, in this scenario, it may be considered that packets (namely, the second packet and the fourth packet) in a second procedure for performing frequency synchronization arrive at the second device earlier. Therefore, the second device needs to wait for a moment at which delay differences in the mobile network are the same before calculating the frequency offset, in other words, performs the foregoing corresponding operation. For example, the first value may be denoted as t8−t5, the third value may be denoted as [(t6'−t5')−(t7'−t8')]×[(t7−t6)/(t7'−t6')], and the second value may be denoted as t7−t6+[(t6'−t5')−(t7'−t8')]×[(t7−t6)/(t7'−t6')]. For example, the frequency offset rate ratio may satisfy Formula 4:

$$rateratio = \frac{t8 - t5}{t7 - t6 + [(t6't5') - (t7' - t8')] * [(t7 - t6)/(t7' - t6')]}. \quad \text{Formula 4}$$

For example, when the first difference is greater than the second difference, in this scenario, it may be considered that packets (namely, the second packet and the fourth packet) in a second procedure for performing frequency synchronization arrive at the second device late. Therefore, the second device needs to go back to a moment at which delay differences in the mobile network are the same to calculate the frequency offset, in other words, performs the foregoing corresponding operation. For example, the first value may be denoted as t8−t5, the seventh value may be denoted as [(t7'−t8')−(t6'−t5')]×[(t7−t6)/(t7'−t6')], and the sixth value may be denoted as t7−t6−[(t7'−t8')−(t6'−t5')]×[(t7−t6)/(t7'−t6')]. For example, the frequency offset rate ratio may satisfy Formula 5:

$$rateratio = \frac{t8 - t5}{t7 - t6 - [(t7' - t8') - (t6' - t5')] * [(t7 - t6)/(t7' - t6')]}. \quad \text{Formula 5}$$

In an embodiment, when the first difference is equal to the second difference, in this scenario, absolute delay differences in two times of packet receiving and sending in frequency synchronization are the same (that is, delay differences in the mobile network are the same). The frequency offset may be calculated by using Formula 4 or Formula 5. When the first difference is equal to the second difference, a difference between the first difference and the second difference is 0. Therefore, the frequency offset may be directly calculated by using Formula 6:

$$rateratio = \frac{t8 - t5}{t7 - t6}. \quad \text{Formula 6}$$

According to the synchronization method provided in an embodiment of this application, the second device calculates the frequency offset between the first device and the second device by using time points of receiving and sending packets in the mobile network and time points of receiving and sending packets in the Ethernet network during packet transmission initiated by the first device, to perform frequency synchronization. In the method, impact of a transmission delay between the first device and the second device can be avoided, so that a clock precision requirement of an industrial factory can be met in a scenario in which the mobile network is connected to the Ethernet network.

Figure 10:
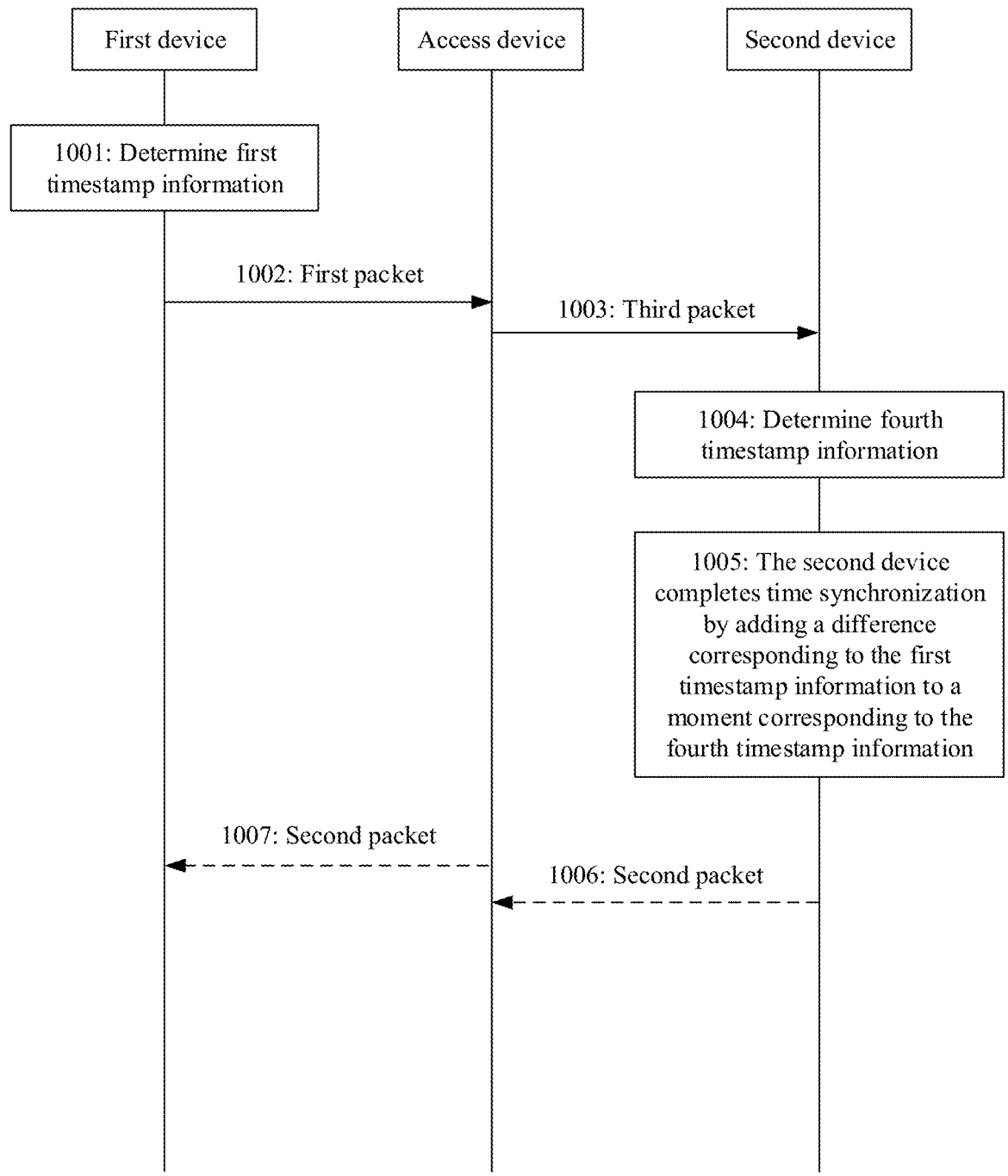
FIG. 10 is a flowchart of another synchronization method according to an embodiment of the application.

An embodiment of this application further provides another synchronization method, which is applicable to the communications systems shown in FIG. 1 and FIG. 2. For example, in FIG. 10, a first device is the UPF and a second device is the UE, or the first device is the UE and the second device is the UPF. Referring to FIG. 10, a procedure of the method may include the following operations.

Operation 1001: The first device determines first timestamp information, where the first timestamp information is a difference between a moment corresponding to second timestamp information and a moment corresponding to third timestamp information, the second timestamp information is master clock information in an Ethernet network, and the third timestamp information is master clock information in a mobile network.

In an embodiment, the first device identifies a data packet from the Ethernet network (for example, a TSN). If the first device identifies that format (type) information of the data packet is 0x88f7, the first device determines that the data packet is an 802.1AS synchronization data packet. Then, the first device performs operation 1001, and in this case, initiates a clock synchronization procedure.

For example, the moment corresponding to the second timestamp information may be denoted as T2, the moment corresponding to the third timestamp information may be denoted as T1, and the first timestamp information is denoted as T1−T2.

In an embodiment, the first device includes two layers of chips. One layer of chip identifies a moment in the mobile network, and the other layer of chip identifies a moment in the Ethernet network. When determining the first timestamp information, the first device may identify the master clock information in the mobile network and the master clock information in the Ethernet network by using the two layers of chips, to determine the difference between the master clock information.

Operation 1002: The first device sends a first packet to an access device, where the first packet carries the first timestamp information.

For example, when sending the first packet to the access device, the first device may use synchronization request (sync request) signaling to carry the first timestamp information.

In an embodiment, a implementation in which the first packet carries the first timestamp information may be: The first device uses a first protocol field included in the first packet to carry the first timestamp information. For example, the first protocol field may be an existing protocol field in the first packet in a current protocol stack framework. Alternatively, the first protocol field may be a protocol field newly added to the first packet in a current protocol stack framework.

For example, the first protocol field may be the same as the first protocol field in operation 701 in the embodiment shown in FIG. 7. For detailed descriptions of the first protocol field, refer to the related descriptions in operation 701. No repeated description is provided herein.

Operation 1003: The access device sends a third packet to the second device based on the first packet, where the third packet carries the first timestamp information.

For example, a method in which the access device sends the third packet to the second device based on the first packet may be: When the access device detects that a first protocol field included in the first packet includes the first timestamp information, the access device encapsulates the first timestamp information in a second protocol field included in the first packet to generate the third packet, and sends the third packet to the second device.

For example, the first protocol field is the same as the first protocol field in operation 1001. For details, also refer to the related descriptions in operation 701. The second protocol field may also be an existing protocol field, or may be a newly added field in an existing protocol stack framework. For example, an execution principle of sending the third packet by the access device to the second device based on the first packet is the same as the principle of sending the third packet by the access device to the second device based on the first packet in operation 702 in the embodiment shown in FIG. 7. For details, refer to the related principle in operation 702. The second protocol field may be the same as the second protocol field in operation 702. For details, reference may be made to each other. The details are not described herein again.

For example, after the second device receives the third packet from the access device, the second device extracts the first timestamp information carried in a second protocol field included in the third packet. For example, for details, refer to Cases n1, n2, and n3 in operation 702. The details are not described herein again.

Operation 1004: The second device determines fourth timestamp information, where the fourth timestamp information is a moment that is in the mobile network and at which the second device receives the third packet.

In a possible example, the moment corresponding to the fourth timestamp information may be denoted as T2'.

Operation 1005: The second device completes time synchronization by adding the difference corresponding to the first timestamp information to the moment corresponding to the fourth timestamp information.

For example, a process in which the second device performs operation 1005 may be: Time synchronization is completed by using T2'+(T1−T2).

Operation 1006: The second device sends a second packet to the access device, where the second packet is used to notify the first device that time synchronization is completed.

Operation 1007: The access device sends the second packet to the first device.

Operation 1006 and operation 1007 are optional, and are shown in dashed lines in FIG. 10. After operation 1006 and operation 1007 are performed, the first device can terminate transmission of a packet after the third packet in an existing synchronization procedure by identifying that time synchronization is completed, thereby reducing resource consumption.

According to the synchronization method provided in an embodiment of this application, the first device determines a difference between the master clock information in the mobile network and the master clock information in the Ethernet network, and sends the difference to the second device, so that the second device directly completes clock synchronization by using the difference between the master clock information. In the method, impact of a transmission delay between the first device and the second device can be avoided, so that a time precision requirement of an industrial factory can be met in a scenario in which the mobile network is connected to the Ethernet network.

Figure 11:
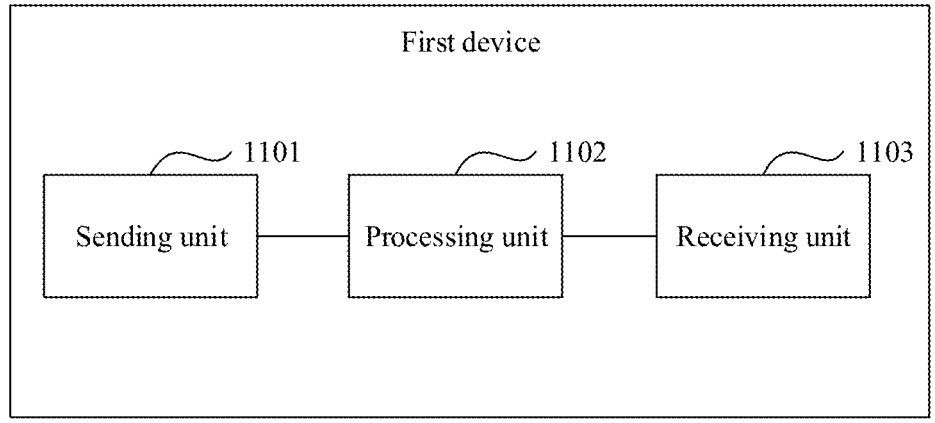
FIG. 11 is a schematic structural diagram of a first device according to an embodiment of the application.

Based on the foregoing embodiments, this application further provides a first device. The first device may be applied to the communications system shown in FIG. 1 or FIG. 2, and is configured to implement the synchronization method provided in the embodiment shown in FIG. 3. FIG. 11 shows a structure of the first device. Referring to FIG. 11, the first device includes a sending unit 1101, a processing unit 1102, and a receiving unit 1103.

The sending unit 1101 is configured to send a first packet to an access device, where the first packet carries first timestamp information, and the first timestamp information is a moment that is in an Ethernet network and at which the first device sends the first packet.

The processing unit 1102 is configured to determine second timestamp information, where the second timestamp information is a moment that is in a mobile network and at which the first device sends the first packet.

The receiving unit 1103 is configured to receive a second packet from the access device, where the second packet carries third timestamp information and fourth timestamp information, the third timestamp information is a moment that is in the mobile network and at which a second device receives a third packet sent by the access device to the second device based on the first packet, the fourth timestamp information is a moment that is in the mobile network and at which the second device sends a fourth packet to the access device, and the second packet is sent by the access device to the first device based on the fourth packet.

The processing unit 1102 is further configured to determine fifth timestamp information and sixth timestamp information, where the fifth timestamp information is a moment that is in the Ethernet network and at which the first device receives the second packet, and the sixth timestamp information is a moment that is in the mobile network and at which the first device receives the second packet.

The processing unit 1102 is further configured to determine seventh timestamp information based on the second timestamp information, the third timestamp information, the fourth timestamp information, the fifth timestamp information, and the sixth timestamp information.

The sending unit 1101 is further configured to forward the seventh timestamp information to the second device by using the access device.

The first device is a user plane network element and the second device is a terminal device, or the first device is a terminal device and the second device is a user plane network element.

In an embodiment, when determining the seventh timestamp information based on the second timestamp information, the third timestamp information, the fourth timestamp information, the fifth timestamp information, and the sixth timestamp information, the processing unit 1102 is configured to:

determine a round-trip transmission delay difference between the first device and the second device based on the second timestamp information, the third timestamp information, the fourth timestamp information, and the sixth timestamp information; and calculate a sum of the moment corresponding to the fifth timestamp information and the round-trip transmission delay difference, to obtain the seventh timestamp information.

In an embodiment, the processing unit 1102 is further configured to: after the receiving unit 1103 receives the second packet from the access device, extract the third timestamp information and the fourth timestamp information that are carried in a first protocol field included in the second packet.

In an embodiment, when the first device is the user plane network element, the first protocol field is a general packet radio service GPRS tunneling protocol GTP field. When the first device is the terminal device, the first protocol field is a service data protocol SDAP field or a data convergence protocol PDCP field.

Figure 12:
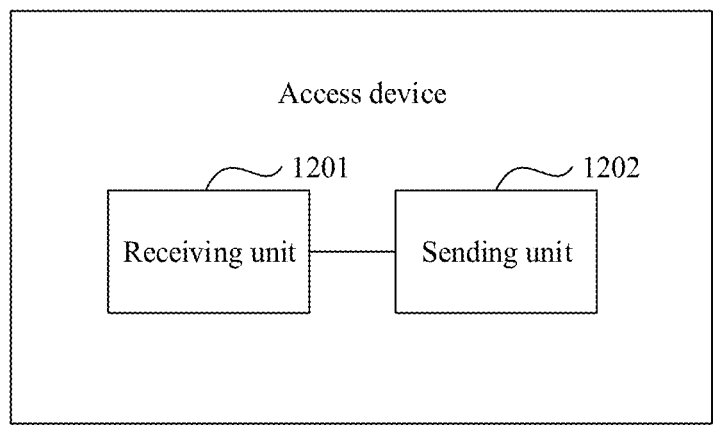
FIG. 12 is a schematic structural diagram of an access device according to an embodiment of the application.

Based on the foregoing embodiments, this application further provides an access device. The access device may be applied to the communications system shown in FIG. 1 or FIG. 2, and is configured to implement the synchronization method provided in the embodiment shown in FIG. 3. Referring to FIG. 12, the access device includes a receiving unit 1201 and a sending unit 1202.

The receiving unit 1201 is configured to receive a first packet from a first device, where the first packet carries first timestamp information, and the first timestamp information is a moment that is in an Ethernet network and at which the first device sends the first packet.

The sending unit 1202 is configured to send a third packet to a second device based on the first packet, where the third packet carries the first timestamp information.

The receiving unit 1201 is further configured to receive a fourth packet from the second device, where the fourth packet carries third timestamp information and fourth timestamp information, the third timestamp information is a moment that is in the mobile network and at which the second device receives the third packet, and the fourth timestamp information is a moment that is in the mobile network and at which the second device sends the fourth packet to the access device.

The sending unit 1202 is further configured to send a second packet to the first device, where the second packet carries the third timestamp information and the fourth timestamp information.

The receiving unit 1201 is further configured to receive seventh timestamp information from the first device.

The sending unit 1202 is further configured to send the seventh timestamp information to the second device.

The first device is a user plane network element and the second device is a terminal device, or the first device is a terminal device and the second device is a user plane network element.

In an embodiment, the access device further includes a processing unit, configured to: when detecting that a second protocol field included in the fourth packet carries the third timestamp information and the fourth timestamp information, encapsulate the third timestamp information and the fourth timestamp information in a first protocol field included in the fourth packet to generate the second packet. When sending the second packet to the first device, the sending unit 1202 is configured to: when the processing unit detects that the second protocol field included in the fourth packet carries the third timestamp information and the fourth timestamp information, after the processing unit encapsulates the third timestamp information and the fourth timestamp information in the first protocol field included in the fourth packet to generate the second packet, send the second packet to the first device.

In an embodiment, when the first device is the user plane network element, the second protocol field is a service data protocol SDAP field or a data convergence protocol PDCP field, and the first protocol field is a general packet radio service GPRS tunneling protocol GTP field.

When the first device is the terminal device, the second protocol field is a GTP field, and the first protocol field is an SDAP field or a PDCP field.

Figure 13:
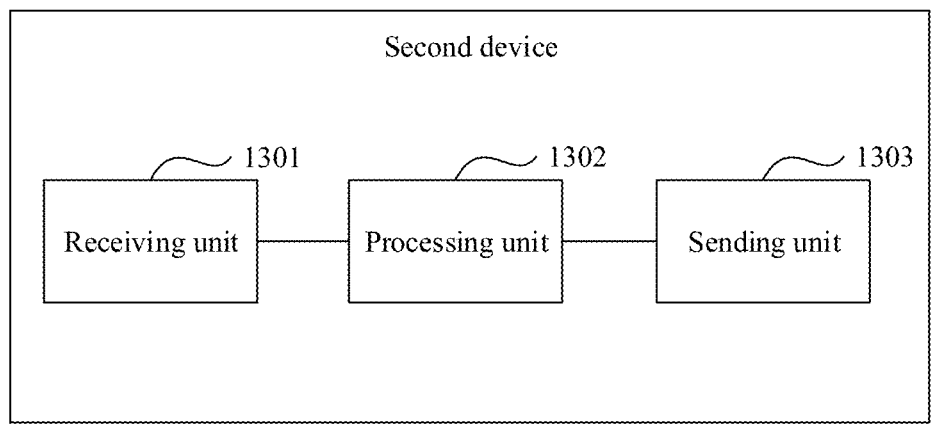
FIG. 13 is a schematic structural diagram of a second device according to an embodiment of the application.

Based on the foregoing embodiments, this application further provides a second device. The second device may be applied to the communications system shown in FIG. 1 or FIG. 2, and is configured to implement the synchronization method provided in the embodiment shown in FIG. 3. Referring to FIG. 13, the second device includes a receiving unit 1301, a processing unit 1302, and a sending unit 1303.

The receiving unit 1301 is configured to receive a third packet from an access device, where the third packet carries first timestamp information, the first timestamp information is a moment that is in an Ethernet network and at which a first device sends a first packet, and the third packet is sent by the access device based on the first packet after the access device receives the first packet from the first device. The first device is a user plane network element and the second device is a terminal device, or the first device is a terminal device and the second device is a user plane network element.

The processing unit 1302 is configured to determine third timestamp information and eighth timestamp information, where the third timestamp information is a moment that is in the mobile network and at which the second device receives the third packet, and the eighth timestamp information is a moment that is in the Ethernet network and at which the second device receives the third packet.

The sending unit 1303 is configured to send a fourth packet to the access device, where the fourth packet carries the third timestamp information and fourth timestamp information, and the fourth timestamp information is a moment that is in the mobile network and at which the second device sends the fourth packet to the access device.

The processing unit 1302 is further configured to determine ninth timestamp information, where the ninth timestamp information is a moment that is in the Ethernet network and at which the second device sends the fourth packet to the access device.

The receiving unit 1301 is further configured to receive seventh timestamp information from the access device.

The processing unit 1302 is further configured to: determine a time offset between the first device and the second device based on the first timestamp information, the eighth timestamp information, the ninth timestamp information, and the seventh timestamp information, and perform time synchronization based on the time offset.

In an embodiment, the processing unit 1302 is further configured to determine, based on the seventh timestamp information, a moment that is in the Ethernet network and at which the first device receives a second packet, where the second packet is sent by the access device to the first device based on the fourth packet.

In an embodiment, when the fourth packet carries the third timestamp information and the fourth timestamp information, the sending unit 1303 is configured to:

use a second protocol field included in the fourth packet to carry the third timestamp information and the fourth timestamp information.

In an embodiment, when the second device is the terminal device, the second protocol field is a service data protocol SDAP field or a data convergence protocol PDCP field.

When the second device is the user plane network element, the second protocol field is a general packet radio service GPRS tunneling protocol GTP field.

Figure 14:
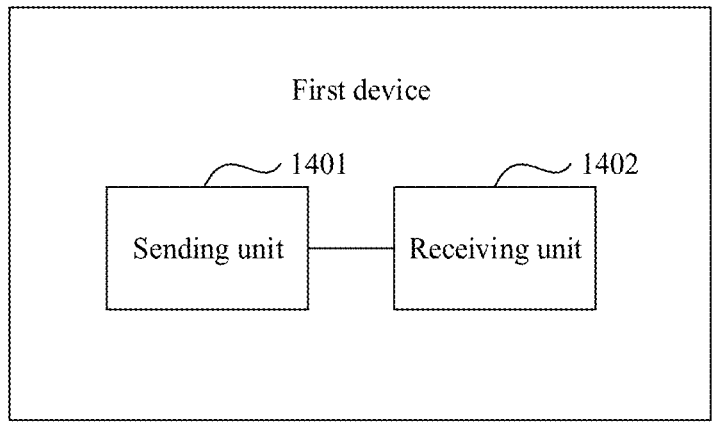
FIG. 14 is a schematic structural diagram of another first device according to an embodiment of the application.

Based on the foregoing embodiments, this application further provides a first device. The first device may be applied to the communications system shown in FIG. 1 or FIG. 2, and is configured to implement the synchronization method provided in the embodiment shown in FIG. 7. Referring to FIG. 14, the first device includes a sending unit 1401 and a receiving unit 1402.

The sending unit 1401 is configured to send a first packet to an access device, where the first packet carries first timestamp information and second timestamp information, the first timestamp information is a moment that is in an Ethernet network and at which the first device sends the first packet, and the second timestamp information is a moment that is in a mobile network and at which the first device sends the first packet.

The receiving unit 1402 is configured to: receive a second packet from the access device, and determine third timestamp information and fourth timestamp information, where the third timestamp information is a moment that is in the Ethernet network and at which the first device receives the second packet, and the fourth timestamp information is a moment that is in the mobile network and at which the first device receives the second packet.

The sending unit 1401 is further configured to send the third timestamp information and the fourth timestamp information to the access device, where the first timestamp information, the second timestamp information, the third timestamp information, and the fourth timestamp information are used for time synchronization.

The first device is a user plane network element and the second device is a terminal device, or the first device is a terminal device and the second device is a user plane network element.

In an embodiment, when the first packet carries the second timestamp information, the sending unit 1401 is configured to use a first protocol field included in the first packet to carry the second timestamp information.

In an embodiment, when the first device is the user plane network element, the first protocol field is a general packet radio service GPRS tunneling protocol GTP field. When the first device is the terminal device, the first protocol field is a service data protocol SDAP field or a data convergence protocol PDCP field.

Based on the foregoing embodiments, this application further provides an access device. The access device may be applied to the communications system shown in FIG. 1 or FIG. 2, and is configured to implement the synchronization method provided in the embodiment shown in FIG. 7. Similarly, referring to FIG. 12, the access device includes a receiving unit 1201 and a sending unit 1202.

The receiving unit 1201 is configured to receive a first packet from a first device, where the first packet carries first timestamp information and second timestamp information, the first timestamp information is a moment that is in an Ethernet network and at which the first device sends the first packet, and the second timestamp information is a moment that is in a mobile network and at which the first device sends the first packet.

The sending unit 1202 is configured to send a third packet to a second device based on the first packet, where the third packet carries the first timestamp information and the second timestamp information.

The receiving unit 1201 is further configured to: receive a fourth packet from the second device, and send a second packet to the first device based on the fourth packet.

The receiving unit 1201 is further configured to receive third timestamp information and fourth timestamp information from the first device, where the third timestamp information is a moment that is in the Ethernet network and at which the first device receives the second packet, and the fourth timestamp information is a moment that is in the mobile network and at which the first device receives the second packet.

The sending unit 1202 is further configured to send the third timestamp information and the fourth timestamp information to the second device, where the first timestamp information, the second timestamp information, the third timestamp information, and the fourth timestamp information are used for time synchronization.

The first device is a user plane network element and the second device is a terminal device, or the first device is a terminal device and the second device is a user plane network element.

In an embodiment, the access device further includes a processing unit, configured to: when detecting that a first protocol field included in the first packet includes the second timestamp information, encapsulate, by the access device, the second timestamp information in a second protocol field included in the first packet to generate the third packet. When sending the third packet to the second device based on the first packet, the sending unit 1202 is configured to: when the processing unit detects that the first protocol field included in the first packet includes the second timestamp information, after the access device encapsulates the second timestamp information in the second protocol field included in the first packet to generate the third packet, send the third packet to the second device.

In an embodiment, when the first device is the user plane network element, and the second device is the terminal device, the first protocol field is a GTP field, and the second protocol field is a SDAP field or a PDCP field. When the first device is the terminal device, and the second device is the user plane network element, the first protocol field is an SDAP field or a PDCP field, and the second protocol field is a GTP field.

Based on the foregoing embodiments, this application further provides a second device. The second device may be applied to the communications system shown in FIG. 1 or FIG. 2, and is configured to implement the synchronization method provided in the embodiment shown in FIG. 7. Similarly, referring to FIG. 13, the second device includes a receiving unit 1301, a processing unit 1302, and a sending unit 1303.

The receiving unit 1301 is configured to receive a third packet from an access device, where the third packet carries first timestamp information and second timestamp information, the first timestamp information is a moment that is in an Ethernet network and at which a first device sends a first packet, the second timestamp information is a moment that is in a mobile network and at which the first device sends the first packet, and the third packet is sent by the access device based on the first packet after the access device receives the first packet from the first device. The first device is a user plane network element and the second device is a terminal device, or the first device is a terminal device and the second device is a user plane network element.

The processing unit 1302 is configured to determine fifth timestamp information and sixth timestamp information, where the fifth timestamp information is a moment that is in the Ethernet network and at which the second device receives the third packet, and the sixth timestamp information is a moment that is in the mobile network and at which the second device receives the third packet.

The sending unit 1303 is configured to: send a fourth packet to the access device, and determine seventh timestamp information and eighth timestamp information, where the seventh timestamp information is a moment that is in the Ethernet network and at which the second device sends the fourth packet to the access device, and the eighth timestamp information is a moment that is in the mobile network and at which the second device sends the fourth packet to the access device.

The receiving unit 1301 is further configured to receive third timestamp information and fourth timestamp information from the access device, where the third timestamp information is a moment that is in the Ethernet network and at which the first device receives a second packet, the fourth timestamp information is a moment that is in the mobile network and at which the first device receives the second packet, and the second packet is sent by the access device to the first device based on the fourth packet.

The processing unit 1302 is further configured to: determine a time offset between the first device and the second device based on the first timestamp information, the second timestamp information, the sixth timestamp information, the eighth timestamp information, the third timestamp information, the fourth timestamp information, the fifth timestamp information, and the seventh timestamp information, and perform time synchronization based on the time offset.

In an embodiment, when determining the time offset between the first device and the second device based on the first timestamp information, the second timestamp information, the sixth timestamp information, the eighth timestamp information, the third timestamp information, the fourth timestamp information, the fifth timestamp information, and the seventh timestamp information, the processing unit 1302 is configured to:

determine a round-trip transmission delay difference between the first device and the second device based on the second timestamp information, the sixth timestamp information, the eighth timestamp information, and the fourth timestamp information; and determine the time offset between the first device and the second device based on the first timestamp information, the third timestamp information, the fifth timestamp information, the seventh timestamp information, and the round-trip transmission delay difference.

In an embodiment, when determining the time offset between the first device and the second device based on the first timestamp information, the third timestamp information, the fifth timestamp information, the seventh timestamp information, and the round-trip transmission delay difference, the processing unit 1302 is configured to:

determine ninth timestamp information, where the ninth timestamp information is a sum of the moment corresponding to the third timestamp information and the round-trip transmission delay difference; and determine the time offset between the first device and the second device based on the first timestamp information, the fifth timestamp information, the seventh timestamp information, and the ninth timestamp information.

In an embodiment, the processing unit 1302 is further configured to: after the receiving unit 1301 receives the third packet from the access device, extract the second timestamp information carried in a second protocol field included in the third packet.

In an embodiment, when the second device is the terminal device, the second protocol field is a SDAP field or a PDCP field. When the second device is the user plane network element, the second protocol field is a GTP field.

Figure 15:
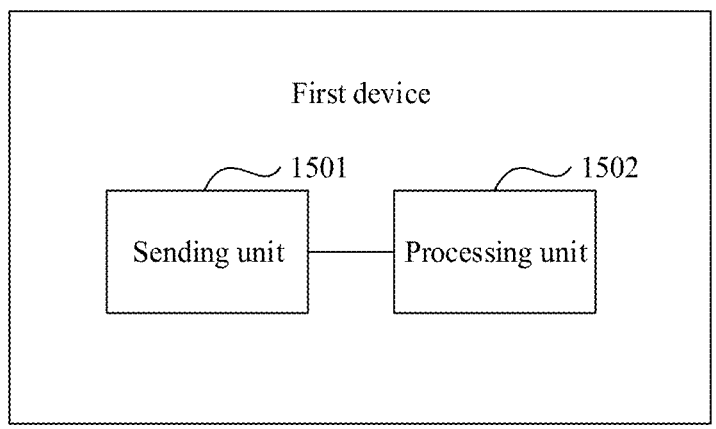
FIG. 15 is a schematic structural diagram of another first device according to an embodiment of the application.

Based on the foregoing embodiments, this application further provides a first device. The first device may be applied to the communications system shown in FIG. 1 or FIG. 2, and is configured to implement the synchronization method provided in the embodiment shown in FIG. 8. Referring to FIG. 15, the first device includes a sending unit 1501 and a processing unit 1502.

The sending unit 1501 is configured to send a first packet to an access device, where the first packet carries first timestamp information and second timestamp information, the first timestamp information is a moment that is in an Ethernet network and at which the first device sends the first packet, and the second timestamp information is a moment that is in a mobile network and at which the first device sends the first packet.

The sending unit 1501 is further configured to send a second packet to the access device, where the second packet carries third timestamp information and fourth timestamp information, the third timestamp information is a moment that is in the Ethernet network and at which the first device sends the second packet, and the fourth timestamp information is a moment that is in the mobile network and at which the first device sends the second packet.

The processing unit 1502 is configured to control the sending unit 1501 to send data.

The first device is a user plane network element and a second device is a terminal device, or the first device is a terminal device and the second device is a user plane network element.

In an embodiment, when the first packet carries the second timestamp information, the sending unit 1501 is configured to use a first protocol field included in the first packet to carry the second timestamp information.

In an embodiment, when the first device is the user plane network element, the first protocol field is a GTP field. When the first device is the terminal device, the first protocol field is a SDAP field or a PDCP field.

In an embodiment, when the second packet carries the fourth timestamp information, the sending unit 1501 is configured to use a second protocol field included in the second packet to carry the fourth timestamp information.

In an embodiment, when the first device is the user plane network element, the second protocol field is a GTP field. When the first device is the terminal device, the second protocol field is a SDAP field or a PDCP field.

Based on the foregoing embodiments, this application further provides an access device. The access device may be applied to the communications system shown in FIG. 1 or FIG. 2, and is configured to implement the synchronization method provided in the embodiment shown in FIG. 8. Similarly, referring to FIG. 12, the access device includes a receiving unit 1201 and a sending unit 1202.

The receiving unit 1201 is configured to receive a first packet from a first device, where the first packet carries first timestamp information and second timestamp information, the first timestamp information is a moment that is in an Ethernet network and at which the first device sends the first packet, and the second timestamp information is a moment that is in a mobile network and at which the first device sends the first packet.

The sending unit 1202 is configured to send a third packet to a second device based on the first packet, where the third packet carries the first timestamp information and the second timestamp information.

The receiving unit 1201 is further configured to receive a second packet from the first device, where the second packet carries third timestamp information and fourth timestamp information, the third timestamp information is a moment that is in the Ethernet network and at which the first device sends the second packet, and the fourth timestamp information is a moment that is in the mobile network and at which the first device sends the second packet.

The sending unit 1202 is further configured to send a fourth packet to the second device based on the second packet, where the fourth packet carries the third timestamp information and the fourth timestamp information.

The first device is a user plane network element and the second device is a terminal device, or the first device is a terminal device and the second device is a user plane network element.

In an embodiment, the access device further includes a processing unit, configured to: when detecting that a first protocol field included in the first packet includes the second timestamp information, encapsulate, by the access device, the second timestamp information in a third protocol field included in the first packet to generate the third packet. When sending the third packet to the second device based on the first packet, the sending unit 1202 is configured to: when the processing unit detects that the first protocol field included in the first packet includes the second timestamp information, after the access device encapsulates the second timestamp information in the third protocol field included in the first packet to generate the third packet, send the third packet to the second device.

In an embodiment, when the first device is the user plane network element, and the second device is the terminal device, the first protocol field is a GTP field, and the third protocol field is a SDAP field or a PDCP field. When the first device is the terminal device, and the second device is the user plane network element, the first protocol field is an SDAP field or a PDCP field, and the third protocol field is a GTP field.

In an embodiment, the access device further includes a processing unit, configured to: when detecting that a second protocol field included in the second packet includes the fourth timestamp information, encapsulate, by the access device, the fourth timestamp information in a fourth protocol field in the second packet to generate the fourth packet. When sending the fourth packet to the second device based on the second packet, the sending unit 1202 is configured to: when the processing unit detects that the second protocol field included in the second packet includes the fourth timestamp information, after the access device encapsulates the fourth timestamp information in the fourth protocol field in the second packet to generate the fourth packet, send the fourth packet to the second device.

In an embodiment, when the first device is the user plane network element, and the second device is the terminal device, the second protocol field is a GTP field, and the fourth protocol field is a SDAP field or a PDCP field. When the first device is the terminal device, and the second device is the user plane network element, the second protocol field is an SDAP field or a PDCP field, and the fourth protocol field is a GTP field.

Figure 16:
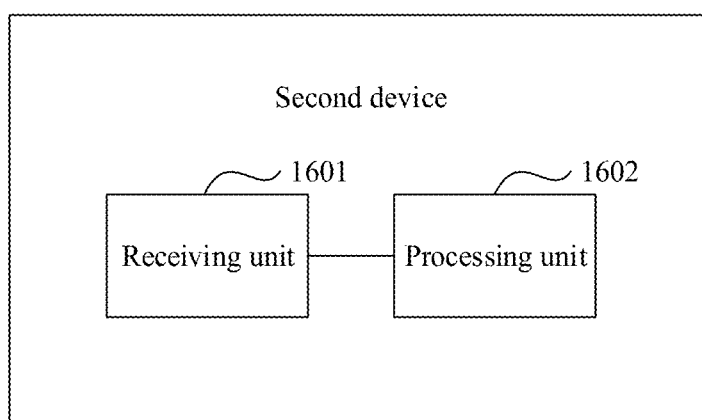
FIG. 16 is a schematic structural diagram of another second device according to an embodiment of the application.

Based on the foregoing embodiments, this application further provides a second device. The second device may be applied to the communications system shown in FIG. 1 or FIG. 2, and is configured to implement the synchronization method provided in the embodiment shown in FIG. 8. Referring to FIG. 16, the second device includes a receiving unit 1601 and a processing unit 1602.

The receiving unit 1601 is configured to receive a third packet from an access device, where the third packet carries first timestamp information and second timestamp information, the first timestamp information is a moment that is in an Ethernet network and at which a first device sends a first packet to the access device, the second timestamp information is a moment that is in a mobile network and at which the first device sends the first packet to the access device, and the third packet is sent by the access device to the second device based on the first packet. The first device is a user plane network element and the second device is a terminal device, or the first device is a terminal device and the second device is a user plane network element.

The processing unit 1602 is configured to determine fifth timestamp information and sixth timestamp information, where the fifth timestamp information is a moment that is in the Ethernet network and at which the second device receives the third packet, and the sixth timestamp information is a moment that is in the mobile network and at which the second device receives the third packet.

The receiving unit 1601 is configured to receive a fourth packet from the access device, where the fourth packet carries third timestamp information and fourth timestamp information, the third timestamp information is a moment that is in the Ethernet network and at which the first device sends a second packet to the access device, the fourth timestamp information is a moment that is in the mobile network and at which the first device sends the second packet to the access device, and the fourth packet is sent by the access device to the second device based on the second packet.

The processing unit 1602 is further configured to determine seventh timestamp information and eighth timestamp information, where the seventh timestamp information is a moment that is in the Ethernet network and at which the second device receives the fourth packet, and the eighth timestamp information is a moment that is in the mobile network and at which the second device receives the fourth packet.

The processing unit 1602 is further configured to: determine a frequency offset between the first device and the second device based on the first timestamp information, the second timestamp information, the third timestamp information, the fourth timestamp information, the fifth timestamp information, the sixth timestamp information, the seventh timestamp information, and the eighth timestamp information, and perform frequency synchronization based on the frequency offset.

In an embodiment, when determining the frequency offset between the first device and the second device based on the first timestamp information, the second timestamp information, the third timestamp information, the fourth timestamp information, the fifth timestamp information, the sixth timestamp information, the seventh timestamp information, and the eighth timestamp information, the processing unit 1602 is configured to:

determine a first difference between the moment corresponding to the sixth timestamp information and the moment corresponding to the second timestamp information, and determine a second difference between the moment corresponding to the eighth timestamp information and the moment corresponding to the fourth timestamp information; and determine the frequency offset between the first device and the second device based on the first timestamp information, the third timestamp information, the fifth timestamp information, the seventh timestamp information, the first difference, and the second difference.

In an embodiment, when determining the frequency offset between the first device and the second device based on the first timestamp information, the third timestamp information, the fifth timestamp information, the seventh timestamp information, the first difference, and the second difference, the processing unit 1602 is configured to:

determine a value relationship between the first difference and the second difference; and when determining that the second difference is less than the first difference, determine that the frequency offset is a quotient of a first value and a second value, where the first value is a difference between the moment corresponding to the third timestamp information and the moment corresponding to the first timestamp information, the second value is a value obtained by adding a third value to a difference between the moment corresponding to the seventh timestamp information and the moment corresponding to the fifth timestamp information, the third value is a product value of a fourth value and a fifth value, the fourth value is a value obtained by subtracting the second difference from the first difference, and the fifth value is a value obtained by dividing the difference between the moment corresponding to the seventh timestamp information and the moment corresponding to the fifth timestamp by a difference between the moment corresponding to the eighth timestamp information and the moment corresponding to the sixth timestamp; or when determining that the second difference is greater than the first difference, determine that the frequency offset is a quotient of the first value and a sixth value, where the sixth value is a value obtained by subtracting a seventh value from a difference between the moment corresponding to the seventh timestamp information and the moment corresponding to the fifth timestamp information, the seventh value is a product value of an eighth value and the fifth value, and the eighth value is a value obtained by subtracting the first difference from the second difference.

Figure 17:
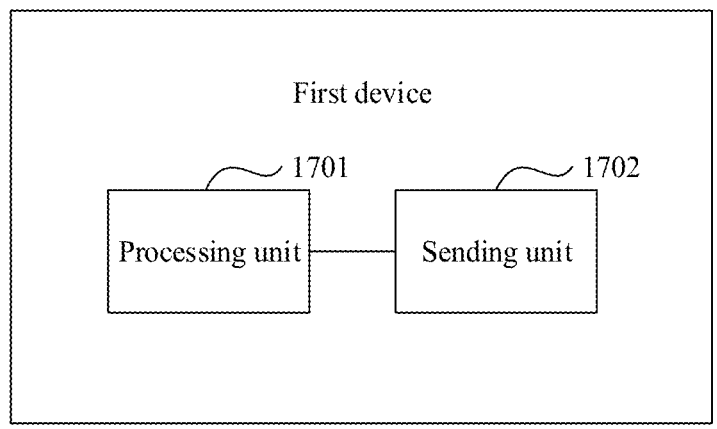
FIG. 17 is a schematic structural diagram of another first device according to an embodiment of the application.

Based on the foregoing embodiments, this application further provides a first device. The first device may be applied to the communications system shown in FIG. 1 or FIG. 2, and is configured to implement the synchronization method provided in the embodiment shown in FIG. 10. Referring to FIG. 17, the first device includes a processing unit 1701 and a sending unit 1702.

The processing unit 1701 is configured to determine first timestamp information, where the first timestamp information is a difference between a moment corresponding to second timestamp information and a moment corresponding to third timestamp information, the second timestamp information is master clock information in an Ethernet network, and the third timestamp information is master clock information in a mobile network.

The sending unit 1702 is configured to send a first packet to an access device, where the first packet carries the first timestamp information.

The first device is a user plane network element and a second device is a terminal device, or the first device is a terminal device and the second device is a user plane network element.

In an embodiment, when the first packet carries the first timestamp information, the sending unit 1702 is configured to use a first protocol field included in the first packet to carry the first timestamp information.

In an embodiment, when the first device is the user plane network element, the first protocol field is a general packet radio service GPRS tunneling protocol GTP field. When the first device is the terminal device, the first protocol field is a service data protocol SDAP field or a data convergence protocol PDCP field.

In an embodiment, the first device further includes a receiving unit, configured to receive a second packet from the access device, where the second packet is used to notify the first device that time synchronization is completed.

Based on the foregoing embodiments, this application further provides an access device. The access device may be applied to the communications system shown in FIG. 1 or FIG. 2, and is configured to implement the synchronization method provided in the embodiment shown in FIG. 10. Similarly, referring to FIG. 12, the access device includes a receiving unit 1201 and a sending unit 1202.

The receiving unit 1201 is configured to receive a first packet from a first device, where the first packet carries first timestamp information, the first timestamp information is a difference between a moment corresponding to second timestamp information and a moment corresponding to third timestamp information, the second timestamp information is master clock information in an Ethernet network, and the third timestamp information is master clock information in a mobile network.

The sending unit 1202 is configured to send a third packet to a second device based on the first packet, where the third packet carries the first timestamp information.

The first device is a user plane network element and the second device is a terminal device, or the first device is a terminal device and the second device is a user plane network element.

In an embodiment, the access device further includes a processing unit, configured to: when detecting that a first protocol field included in the first packet includes the first timestamp information, encapsulate, by the access device, the first timestamp information in a second protocol field included in the first packet to generate the third packet. When sending the third packet to the second device based on the first packet, the sending unit 1202 is configured to: when the processing unit detects that the first protocol field included in the first packet includes the first timestamp information, the access device encapsulates the first timestamp information in the second protocol field included in the first packet to generate the third packet, send the third packet to the second device.

In an embodiment, when the first device is the user plane network element, and the second device is the terminal device, the first protocol field is a general packet radio service GPRS tunneling protocol GTP field, and the second protocol field is a service data protocol SDAP field or a data convergence protocol PDCP field. When the first device is the terminal device, and the second device is the user plane network element, the first protocol field is an SDAP field or a PDCP field, and the second protocol field is a GTP field.

In an embodiment, the receiving unit 1201 is further configured to receive a second packet from the second device, and the sending unit 1202 is further configured to forward the second packet to the first device, where the second packet is used to notify the first device that time synchronization is completed.

Based on the foregoing embodiments, this application further provides a second device. The second device may be applied to the communications system shown in FIG. 1 or FIG. 2, and is configured to implement the synchronization method provided in the embodiment shown in FIG. 10. Referring to FIG. 16, the second device includes a receiving unit 1601 and a processing unit 1602.

The receiving unit 1601 is configured to receive a third packet from an access device, where the third packet carries first timestamp information, the first timestamp information is a difference between a moment corresponding to second timestamp information and a moment corresponding to third timestamp information, and the second timestamp information is master clock information in an Ethernet network, the third timestamp information is master clock information in a mobile network, the third packet is sent by the access device based on a first packet, and the first packet is sent by a first device to the access device. The first device is a user plane network element and the second device is a terminal device, or the first device is a terminal device and the second device is a user plane network element.

The processing unit 1602 is configured to determine fourth timestamp information, where the fourth timestamp information is a moment that is in the mobile network and at which the second device receives the third packet.

The processing unit 1602 is further configured to complete time synchronization by adding the difference corresponding to the first timestamp information to the moment corresponding to the fourth timestamp information.

In an embodiment, the processing unit 1602 is further configured to: after the receiving unit 1601 receives the third packet from the access device, extract the first timestamp information carried in a second protocol field included in the third packet.

In an embodiment, when the second device is the terminal device, the second protocol field is a SDAP field or a PDCP field. When the second device is the user plane network element, the second protocol field is a GTP field.

In an embodiment, the second device further includes a sending unit, configured to send a second packet to the access device, where the second packet is used to notify the first device that time synchronization is completed.

It should be noted that in the embodiments of this application, division into the units is an example and is merely logical function division, and may be other division in an actual implementation. Function units in the embodiments of this application may be integrated into one processing unit, or each of the units may exist alone physically, or two or more units are integrated into one unit. The integrated unit may be implemented in a form of hardware, or may be implemented in a form of a software function unit.

When the integrated unit is implemented in the form of a software function unit and sold or used as an independent product, the integrated unit may be stored in a computer readable storage medium. Based on such an understanding, the technical solutions of this application essentially, or the part contributing to the prior art, or all or some of the technical solutions may be implemented in the form of a computer software product. The computer software product is stored in a storage medium and includes several instructions for instructing a computer device (which may be a personal computer, a server, a network device, or the like) or a processor to perform all or some of the operations of the methods in the embodiments of this application. The foregoing storage medium includes any medium that can store program code, such as a USB flash drive, a removable hard disk, a read-only memory (ROM), a random access memory (RAM), a magnetic disk, or an optical disc.

Figure 18:
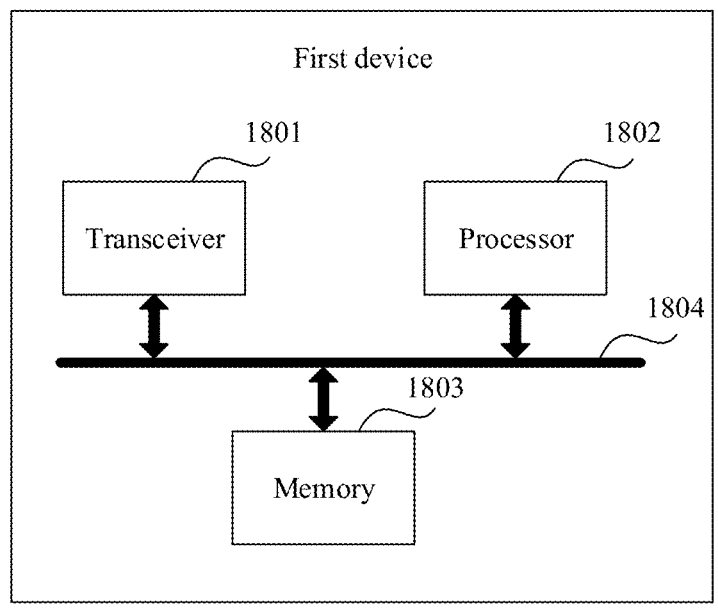
FIG. 18 is a structural diagram of a first device according to an embodiment of the application.

Based on the foregoing embodiments, an embodiment of this application further provides a first device. The first device is applied to the communications system shown in FIG. 1 or FIG. 2, and is configured to implement the synchronization method shown in FIG. 3. Referring to FIG. 18, the first device includes a transceiver 1801, a processor 1802, and a memory 1803.

The processor 1802 may be a central processing unit (CPU), a network processor (NP), a combination of a CPU and an NP, or the like. The processor 1802 may further include a hardware chip. The hardware chip may be an application-specific integrated circuit (ASIC), a programmable logic device (PLD), or a combination thereof. The PLD may be a complex programmable logic device (CPLD), a field-programmable gate array (FPGA), a generic array logic (GAL), or any combination thereof. The processor 1802 may implement the foregoing functions by hardware or certainly by hardware executing corresponding software.

The transceiver 1801, the processor 1802, and the memory 1803 are connected to each other. For example, the transceiver 1801, the processor 1802, and the memory 1803 are connected to each other by using a bus 1804. The bus 1804 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 18, but this does not mean that there is only one bus or only one type of bus.

The transceiver 1801 is configured to: communicate and interact with another device.

The processor 1802 is configured to implement the synchronization method shown in FIG. 3. For details, refer to the related descriptions in the embodiment shown in FIG. 3. The details are not described herein again.

The memory 1803 is configured to store a program and the like. For example, the program may include program code, and the program code includes a computer operation instruction. The memory 1803 may include a RAM, and may further include a non-volatile memory, for example, at least one magnetic disk storage. The processor 1802 performs the application program stored in the memory 1803, to implement the foregoing function, so as to implement the synchronization method shown in FIG. 3.

Figure 19:
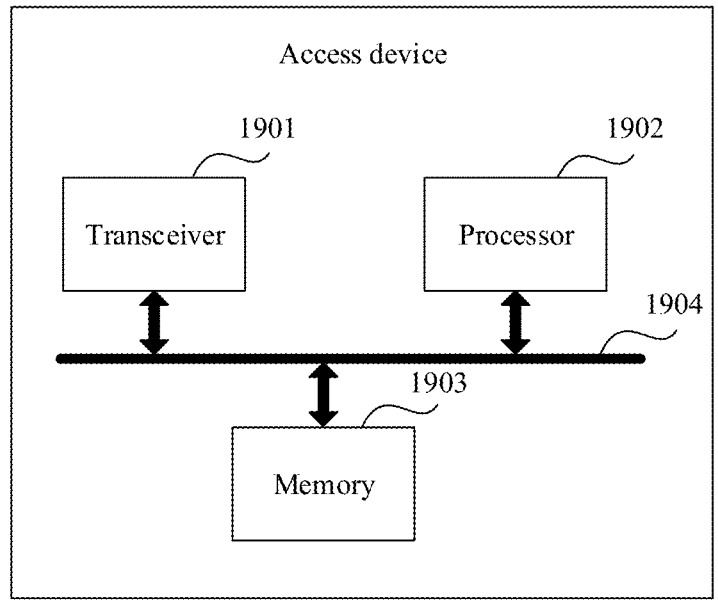
FIG. 19 is a structural diagram of an access device according to an embodiment of the application.

Based on the foregoing embodiments, an embodiment of this application further provides an access device. The access device is applied to the communications system shown in FIG. 1 or FIG. 2, and is configured to implement the synchronization method shown in FIG. 3. Referring to FIG. 19, the access device includes a transceiver 1901, a processor 1902, and a memory 1903.

The processor 1902 may be a CPU, an NP, a combination of a CPU and an NP, or the like. The processor 1902 may further include a hardware chip. The hardware chip may be an ASIC, a PLD, or a combination thereof. The PLD may be a CPLD, an FPGA, a GAL, or any combination thereof. The processor 1902 may implement the foregoing functions by hardware or certainly by hardware executing corresponding software.

The transceiver 1901, the processor 1902, and the memory 1903 are connected to each other. For example, the transceiver 1901, the processor 1902, and the memory 1903 are connected to each other by using a bus 1904. The bus 1904 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 19, but this does not mean that there is only one bus or only one type of bus.

The transceiver 1901 is configured to: communicate and interact with another device.

The processor 1902 is configured to implement the synchronization method shown in FIG. 3. For details, refer to the related descriptions in the embodiment shown in FIG. 3. The details are not described herein again.

The memory 1903 is configured to store a program and the like. For example, the program may include program code, and the program code includes a computer operation instruction. The memory 1903 may include a RAM, and may further include a non-volatile memory, for example, at least one magnetic disk storage. The processor 1902 performs the application program stored in the memory 1903, to implement the foregoing function, so as to implement the synchronization method shown in FIG. 3.

Figure 20:
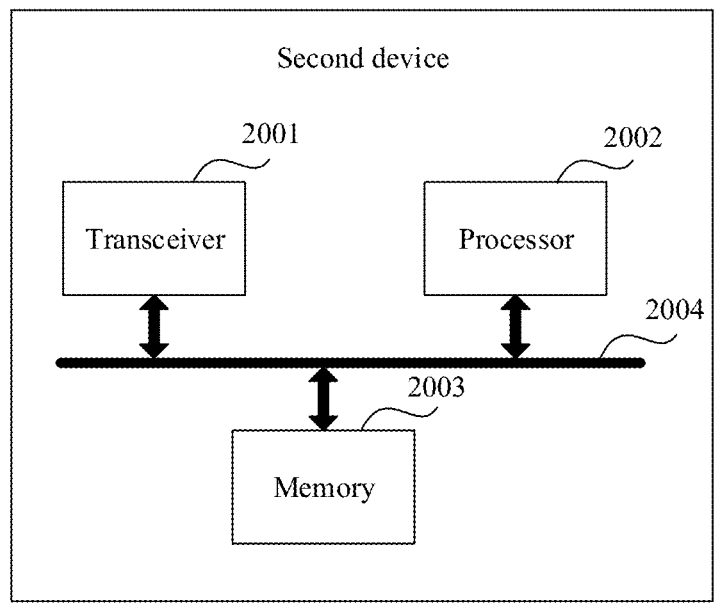
FIG. 20 is a structural diagram of a second device according to an embodiment of the application.

Based on the foregoing embodiments, an embodiment of this application further provides a second device. The second device is applied to the communications system shown in FIG. 1 or FIG. 2, and is configured to implement the synchronization method shown in FIG. 3. Referring to FIG. 20, the second device includes a transceiver 2001, a processor 2002, and a memory 2003.

The processor 2002 may be a CPU, an NP, a combination of a CPU and an NP, or the like. The processor 2002 may further include a hardware chip. The hardware chip may be an ASIC, a PLD, or a combination thereof. The PLD may be a CPLD, an FPGA, a GAL, or any combination thereof. The processor 2002 may implement the foregoing functions by hardware or certainly by hardware executing corresponding software.

The transceiver 2001, the processor 2002, and the memory 2003 are connected to each other. For example, the transceiver 2001, the processor 2002, and the memory 2003 are connected to each other by using a bus 2004. The bus 2004 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 20, but this does not mean that there is only one bus or only one type of bus.

The transceiver 2001 is configured to: communicate and interact with another device.

The processor 2002 is configured to implement the synchronization method shown in FIG. 3. For details, refer to the related descriptions in the embodiment shown in FIG. 3. The details are not described herein again.

The memory 2003 is configured to store a program and the like. For example, the program may include program code, and the program code includes a computer operation instruction. The memory 2003 may include a RAM, and may further include a non-volatile memory, for example, at least one magnetic disk storage. The processor 2002 performs the application program stored in the memory 2003, to implement the foregoing function, so as to implement the synchronization method shown in FIG. 3.

Based on the foregoing embodiments, an embodiment of this application further provides a first device. The first device is applied to the communications system shown in FIG. 1 or FIG. 2, and is configured to implement the synchronization method shown in FIG. 7. Similarly, referring to FIG. 18, the first device includes a transceiver 1801, a processor 1802, and a memory 1803.

The processor 1802 may be a CPU, an NP, a combination of a CPU and an NP, or the like. The processor 1802 may further include a hardware chip. The hardware chip may be an ASIC, a PLD, or a combination thereof. The PLD may be a CPLD, an FPGA, a GAL, or any combination thereof. The processor 1802 may implement the foregoing functions by hardware or certainly by hardware executing corresponding software.

The transceiver 1801, the processor 1802, and the memory 1803 are connected to each other. For example, the transceiver 1801, the processor 1802, and the memory 1803 are connected to each other by using a bus 1804. The bus 1804 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 18, but this does not mean that there is only one bus or only one type of bus.

The transceiver 1801 is configured to: communicate and interact with another device.

The processor 1802 is configured to implement the synchronization method shown in FIG. 7. For details, refer to the related descriptions in the embodiment shown in FIG. 7. The details are not described herein again.

The memory 1803 is configured to store a program and the like. For example, the program may include program code, and the program code includes a computer operation instruction. The memory 1803 may include a RAM, and may further include a non-volatile memory, for example, at least one magnetic disk storage. The processor 1802 performs the application program stored in the memory 1803, to implement the foregoing function, so as to implement the synchronization method shown in FIG. 7.

Based on the foregoing embodiments, an embodiment of this application further provides an access device. The access device is applied to the communications system shown in FIG. 1 or FIG. 2, and is configured to implement the synchronization method shown in FIG. 7. Referring to FIG. 19, the access device includes a transceiver 1901, a processor 1902, and a memory 1903.

The processor 1902 may be a CPU, an NP, a combination of a CPU and an NP, or the like. The processor 1902 may further include a hardware chip. The hardware chip may be an ASIC, a PLD, or a combination thereof. The PLD may be a CPLD, an FPGA, a GAL, or any combination thereof. The processor 1902 may implement the foregoing functions by hardware or certainly by hardware executing corresponding software.

The transceiver 1901, the processor 1902, and the memory 1903 are connected to each other. For example, the transceiver 1901, the processor 1902, and the memory 1903 are connected to each other by using a bus 1904. The bus 1904 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 19, but this does not mean that there is only one bus or only one type of bus.

The transceiver 1901 is configured to: communicate and interact with another device.

The processor 1902 is configured to implement the synchronization method shown in FIG. 7. For details, refer to the related descriptions in the embodiment shown in FIG. 7. The details are not described herein again.

The memory 1903 is configured to store a program and the like. For example, the program may include program code, and the program code includes a computer operation instruction. The memory 1903 may include a RAM, and may further include a non-volatile memory, for example, at least one magnetic disk storage. The processor 1902 performs the application program stored in the memory 1903, to implement the foregoing function, so as to implement the synchronization method shown in FIG. 7.

Based on the foregoing embodiments, an embodiment of this application further provides a second device. The second device is applied to the communications system shown in FIG. 1 or FIG. 2, and is configured to implement the synchronization method shown in FIG. 7. Referring to FIG. 20, the second device includes a transceiver 2001, a processor 2002, and a memory 2003.

The processor 2002 may be a CPU, an NP, a combination of a CPU and an NP, or the like. The processor 2002 may further include a hardware chip. The hardware chip may be an ASIC, a PLD, or a combination thereof. The PLD may be a CPLD, an FPGA, a GAL, or any combination thereof. The processor 2002 may implement the foregoing functions by hardware or certainly by hardware executing corresponding software.

The transceiver 2001, the processor 2002, and the memory 2003 are connected to each other. For example, the transceiver 2001, the processor 2002, and the memory 2003 are connected to each other by using a bus 2004. The bus 2004 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 20, but this does not mean that there is only one bus or only one type of bus.

The transceiver 2001 is configured to: communicate and interact with another device.

The processor 2002 is configured to implement the synchronization method shown in FIG. 7. For details, refer to the related descriptions in the embodiment shown in FIG. 7. The details are not described herein again.

The memory 2003 is configured to store a program and the like. For example, the program may include program code, and the program code includes a computer operation instruction. The memory 2003 may include a RAM, and may further include a non-volatile memory, for example, at least one magnetic disk storage. The processor 2002 performs the application program stored in the memory 2003, to implement the foregoing function, so as to implement the synchronization method shown in FIG. 7.

Based on the foregoing embodiments, an embodiment of this application further provides a first device. The first device is applied to the communications system shown in FIG. 1 or FIG. 2, and is configured to implement the synchronization method shown in FIG. 8. Similarly, referring to FIG. 18, the first device includes a transceiver 1801, a processor 1802, and a memory 1803.

The processor 1802 may be a CPU, an NP, a combination of a CPU and an NP, or the like. The processor 1802 may further include a hardware chip. The hardware chip may be an ASIC, a PLD, or a combination thereof. The PLD may be a CPLD, an FPGA, a GAL, or any combination thereof. The processor 1802 may implement the foregoing functions by hardware or certainly by hardware executing corresponding software.

The transceiver 1801, the processor 1802, and the memory 1803 are connected to each other. For example, the transceiver 1801, the processor 1802, and the memory 1803 are connected to each other by using a bus 1804. The bus 1804 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 18, but this does not mean that there is only one bus or only one type of bus.

The transceiver 1801 is configured to: communicate and interact with another device.

The processor 1802 is configured to implement the synchronization method shown in FIG. 8. For details, refer to the related descriptions in the embodiment shown in FIG. 8. The details are not described herein again.

The memory 1803 is configured to store a program and the like. For example, the program may include program code, and the program code includes a computer operation instruction. The memory 1803 may include a RAM, and may further include a non-volatile memory, for example, at least one magnetic disk storage. The processor 1802 performs the application program stored in the memory 1803, to implement the foregoing function, so as to implement the synchronization method shown in FIG. 8.

Based on the foregoing embodiments, an embodiment of this application further provides an access device. The access device is applied to the communications system shown in FIG. 1 or FIG. 2, and is configured to implement the synchronization method shown in FIG. 8. Referring to FIG. 19, the access device includes a transceiver 1901, a processor 1902, and a memory 1903.

The processor 1902 may be a CPU, an NP, a combination of a CPU and an NP, or the like. The processor 1902 may further include a hardware chip. The hardware chip may be an ASIC, a PLD, or a combination thereof. The PLD may be a CPLD, an FPGA, a GAL, or any combination thereof. The processor 1902 may implement the foregoing functions by hardware or certainly by hardware executing corresponding software.

The transceiver 1901, the processor 1902, and the memory 1903 are connected to each other. For example, the transceiver 1901, the processor 1902, and the memory 1903 are connected to each other by using a bus 1904. The bus 1904 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 19, but this does not mean that there is only one bus or only one type of bus.

The transceiver 1901 is configured to: communicate and interact with another device.

The processor 1902 is configured to implement the synchronization method shown in FIG. 8. For details, refer to the related descriptions in the embodiment shown in FIG. 8. The details are not described herein again.

The memory 1903 is configured to store a program and the like. For example, the program may include program code, and the program code includes a computer operation instruction. The memory 1903 may include a RAM, and may further include a non-volatile memory, for example, at least one magnetic disk storage. The processor 1902 performs the application program stored in the memory 1903, to implement the foregoing function, so as to implement the synchronization method shown in FIG. 8.

Based on the foregoing embodiments, an embodiment of this application further provides a second device. The second device is applied to the communications system shown in FIG. 1 or FIG. 2, and is configured to implement the synchronization method shown in FIG. 8. Referring to FIG. 20, the second device includes a transceiver 2001, a processor 2002, and a memory 2003.

The processor 2002 may be a CPU, an NP, a combination of a CPU and an NP, or the like. The processor 2002 may further include a hardware chip. The hardware chip may be an ASIC, a PLD, or a combination thereof. The PLD may be a CPLD, an FPGA, a GAL, or any combination thereof. The processor 2002 may implement the foregoing functions by hardware or certainly by hardware executing corresponding software.

The transceiver 2001, the processor 2002, and the memory 2003 are connected to each other. For example, the transceiver 2001, the processor 2002, and the memory 2003 are connected to each other by using a bus 2004. The bus 2004 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 20, but this does not mean that there is only one bus or only one type of bus.

The transceiver 2001 is configured to: communicate and interact with another device.

The processor 2002 is configured to implement the synchronization method shown in FIG. 8. For details, refer to the related descriptions in the embodiment shown in FIG. 8. The details are not described herein again.

The memory 2003 is configured to store a program and the like. For example, the program may include program code, and the program code includes a computer operation instruction. The memory 2003 may include a RAM, and may further include a non-volatile memory, for example, at least one magnetic disk storage. The processor 2002 performs the application program stored in the memory 2003, to implement the foregoing function, so as to implement the synchronization method shown in FIG. 8.

Based on the foregoing embodiments, an embodiment of this application further provides a first device. The first device is applied to the communications system shown in FIG. 1 or FIG. 2, and is configured to implement the synchronization method shown in FIG. 10. Similarly, referring to FIG. 18, the first device includes a transceiver 1801, a processor 1802, and a memory 1803.

The processor 1802 may be a CPU, an NP, a combination of a CPU and an NP, or the like. The processor 1802 may further include a hardware chip. The hardware chip may be an ASIC, a PLD, or a combination thereof. The PLD may be a CPLD, an FPGA, a GAL, or any combination thereof. The processor 1802 may implement the foregoing functions by hardware or certainly by hardware executing corresponding software.

The transceiver 1801, the processor 1802, and the memory 1803 are connected to each other. For example, the transceiver 1801, the processor 1802, and the memory 1803 are connected to each other by using a bus 1804. The bus 1804 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 18, but this does not mean that there is only one bus or only one type of bus.

The transceiver 1801 is configured to: communicate and interact with another device.

The processor 1802 is configured to implement the synchronization method shown in FIG. 10. For details, refer to the related descriptions in the embodiment shown in FIG. 10. The details are not described herein again.

The memory 1803 is configured to store a program and the like. For example, the program may include program code, and the program code includes a computer operation instruction. The memory 1803 may include a RAM, and may further include a non-volatile memory, for example, at least one magnetic disk storage. The processor 1802 performs the application program stored in the memory 1803, to implement the foregoing function, so as to implement the synchronization method shown in FIG. 10.

Based on the foregoing embodiments, an embodiment of this application further provides an access device. The access device is applied to the communications system shown in FIG. 1 or FIG. 2, and is configured to implement the synchronization method shown in FIG. 10. Referring to FIG. 19, the access device includes a transceiver 1901, a processor 1902, and a memory 1903.

The processor 1902 may be a CPU, an NP, a combination of a CPU and an NP, or the like. The processor 1902 may further include a hardware chip. The hardware chip may be an ASIC, a PLD, or a combination thereof. The PLD may be a CPLD, an FPGA, a GAL, or any combination thereof. The processor 1902 may implement the foregoing functions by hardware or certainly by hardware executing corresponding software.

The transceiver 1901, the processor 1902, and the memory 1903 are connected to each other. For example, the transceiver 1901, the processor 1902, and the memory 1903 are connected to each other by using a bus 1904. The bus 1904 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 19, but this does not mean that there is only one bus or only one type of bus.

The transceiver 1901 is configured to: communicate and interact with another device.

The processor 1902 is configured to implement the synchronization method shown in FIG. 10. For details, refer to the related descriptions in the embodiment shown in FIG. 10. The details are not described herein again.

The memory 1903 is configured to store a program and the like. For example, the program may include program code, and the program code includes a computer operation instruction. The memory 1903 may include a RAM, and may further include a non-volatile memory, for example, at least one magnetic disk storage. The processor 1902 performs the application program stored in the memory 1903, to implement the foregoing function, so as to implement the synchronization method shown in FIG. 10.

Based on the foregoing embodiments, an embodiment of this application further provides a second device. The second device is applied to the communications system shown in FIG. 1 or FIG. 2, and is configured to implement the synchronization method shown in FIG. 10. Referring to FIG. 20, the second device includes a transceiver 2001, a processor 2002, and a memory 2003.

The processor 2002 may be a CPU, an NP, a combination of a CPU and an NP, or the like. The processor 2002 may further include a hardware chip. The hardware chip may be an ASIC, a PLD, or a combination thereof. The PLD may be a CPLD, an FPGA, a GAL, or any combination thereof. The processor 2002 may implement the foregoing functions by hardware or certainly by hardware executing corresponding software.

The transceiver 2001, the processor 2002, and the memory 2003 are connected to each other. For example, the transceiver 2001, the processor 2002, and the memory 2003 are connected to each other by using a bus 2004. The bus 2004 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 20, but this does not mean that there is only one bus or only one type of bus.

The transceiver 2001 is configured to: communicate and interact with another device.

The processor 2002 is configured to implement the synchronization method shown in FIG. 10. For details, refer to the related descriptions in the embodiment shown in FIG. 10. The details are not described herein again.

The memory 2003 is configured to store a program and the like. For example, the program may include program code, and the program code includes a computer operation instruction. The memory 2003 may include a RAM, and may further include a non-volatile memory, for example, at least one magnetic disk storage. The processor 2002 performs the application program stored in the memory 2003, to implement the foregoing function, so as to implement the synchronization method shown in FIG. 10.

Figure 21:
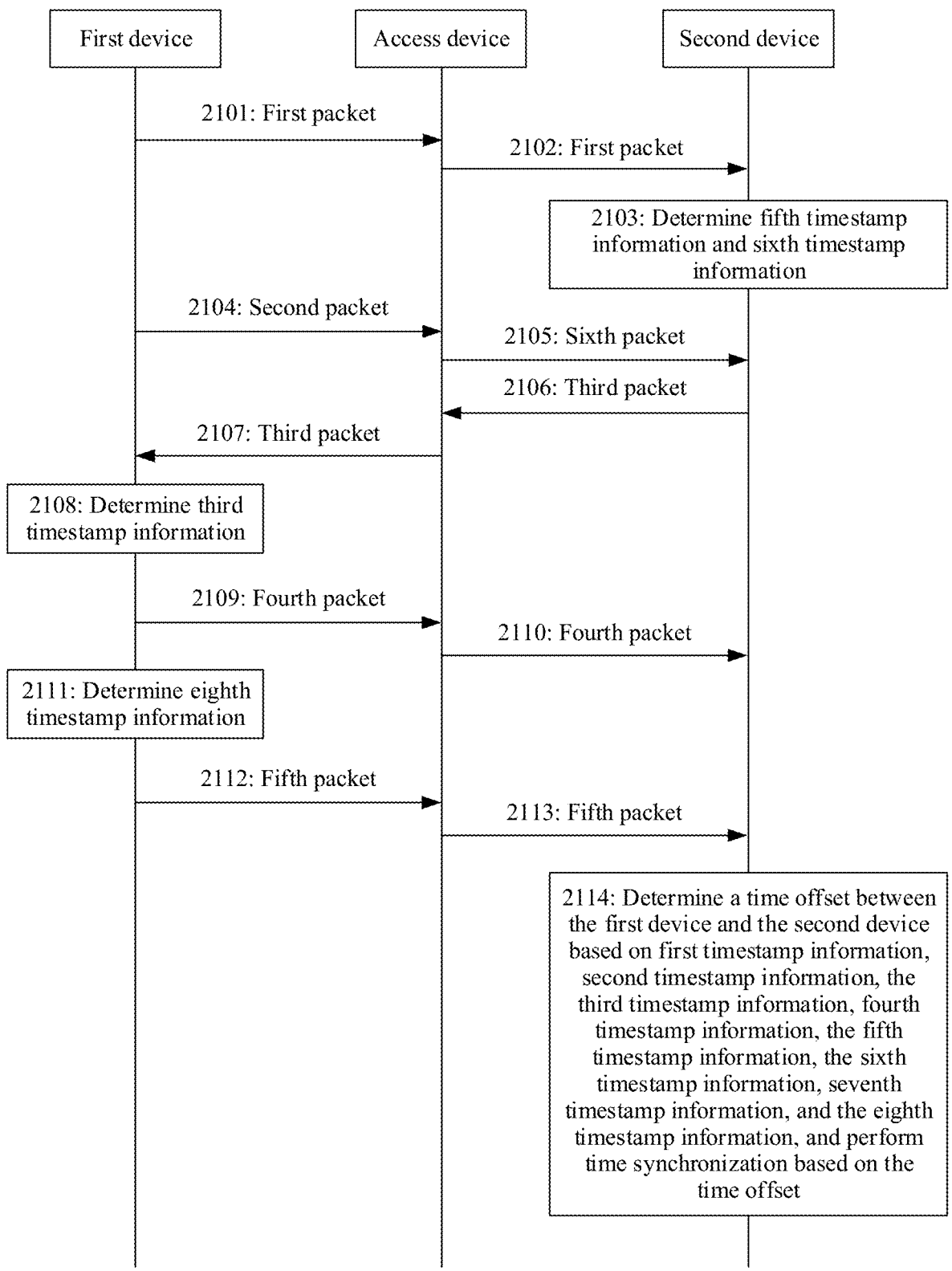
FIG. 21 is a flowchart of another synchronization method according to an embodiment of the application.

An embodiment of this application further provides another synchronization method, which is also applicable to the communications systems shown in FIG. 1 and FIG. 2. For example, in FIG. 21, a first device is the UPF and a second device is the UE, or the first device is the UE and the second device is the UPF. Referring to FIG. 21, a procedure of the method includes the following operations.

Operation 2101: The first device sends a first packet to an access device, and determines first timestamp information and second timestamp information, where the first timestamp information is a moment that is in an Ethernet network and at which the first device sends the first packet, and the second timestamp information is a moment that is in a mobile network and at which the first device sends the first packet.

A trigger condition for initiating a clock synchronization procedure by the first device is the same as the principle described in operation 301 in the embodiment shown in FIG. 3. For details, reference may be made to each other. The details are not described herein again.

Figure 22:
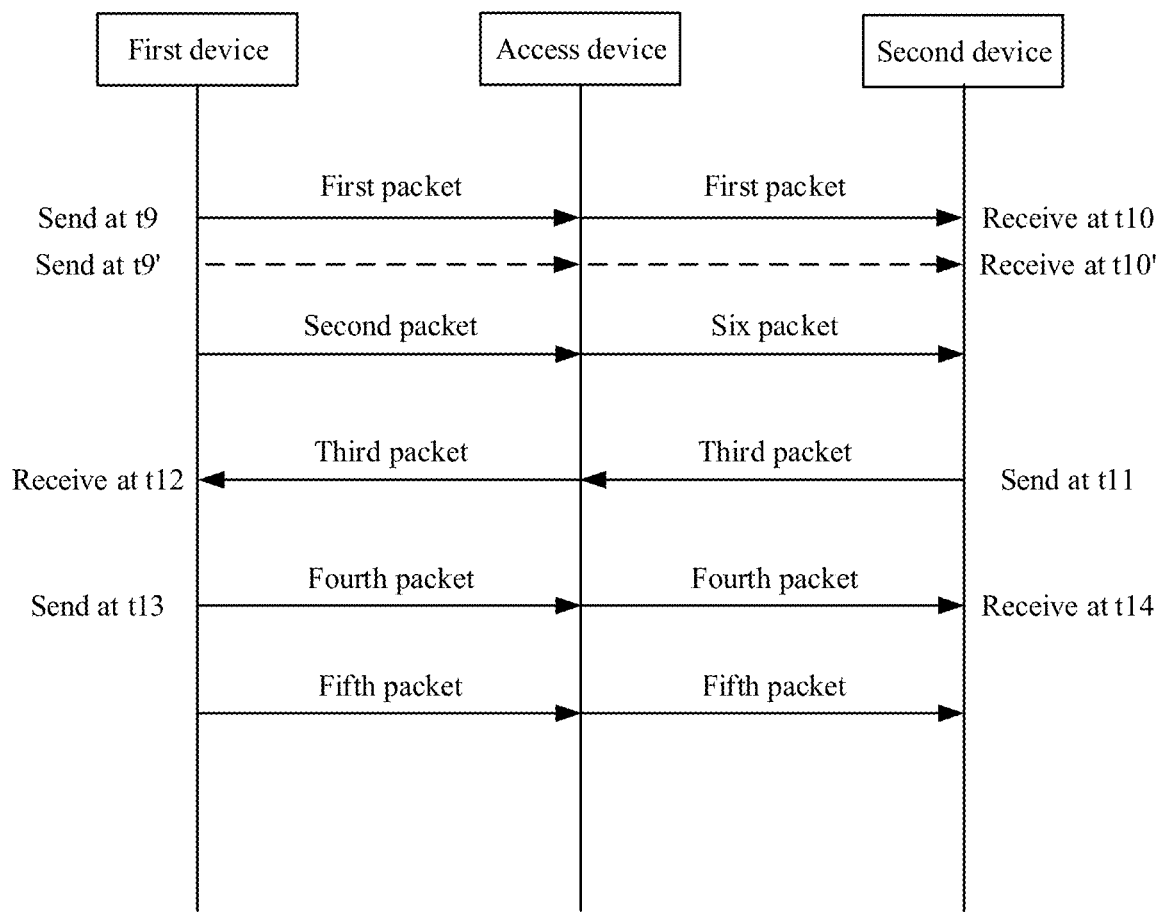
FIG. 22 is another schematic diagram of packet receiving and sending in a synchronization process according to an embodiment of the application.

For example, FIG. 22 is a schematic diagram of packet receiving and sending in a process of performing synchronization between the first device and the second device. In FIG. 22, a solid line indicates a transmission status of a packet in the Ethernet network, and a dashed line indicates a transmission status of a packet in the mobile network. It should be understood that in FIG. 22, a solid line and a dashed line that are parallel in a same direction indicate transmission of a same packet.

For example, in operation 2101, the moment corresponding to the first timestamp information is denoted as t9 in FIG. 22, and the moment corresponding to the second timestamp information is denoted as t9' in FIG. 22.

The first device is a user plane network element and the second device is a terminal device, or the first device is a terminal device and the second device is a user plane network element. In other words, either of the user plane network element and the terminal device may be a master clock node, and the other needs to perform clock synchronization.

Operation 2102: The access device forwards the first packet to the second device.

Operation 2103: The second device determines fifth timestamp information and sixth timestamp information, where the fifth timestamp information is a moment that is in the Ethernet network and at which the second device receives the first packet, and the sixth timestamp information is a moment that is in the mobile network and at which the second device receives the first packet.

For example, in FIG. 22, the moment corresponding to the fifth timestamp information is denoted as t10, and the moment corresponding to the sixth timestamp information is denoted as t10'.

Operation 2104: The first device sends a second packet to the access device, where the second packet carries the first timestamp information and the second timestamp information.

For example, the second packet may further carry a flag, and the flag is used to indicate that the second packet carries timestamp information indicating a moment in the mobile network.

In an embodiment, a implementation in which the second packet carries the second timestamp information may be: The first device uses a first protocol field included in the second packet to carry the second timestamp information. For example, the first protocol field may be an existing protocol field in the second packet in a current protocol stack framework. Alternatively, the first protocol field may be a protocol field newly added to the second packet in a current protocol stack framework. For example, when the second packet further carries a flag, the flag may also be carried in the first protocol field.

For example, the first protocol field may be the same as the first protocol field in operation 701 in the embodiment shown in FIG. 7. For detailed descriptions of the first protocol field, refer to the related descriptions of the first protocol field in operation 701. No repeated description is provided herein.

Operation 2105: The access device sends a sixth packet to the second device based on the second packet, where the sixth packet carries the first timestamp information and the second timestamp information.

In an embodiment, a method in which the access device sends the sixth packet to the second device based on the second packet may be: When detecting that a first protocol field included in the second packet carries the second timestamp information, the access device encapsulates the second timestamp information in a second protocol field in the second packet to generate the sixth packet, and sends the sixth packet to the second device. In this case, a second protocol field in the sixth packet carries the second timestamp information.

For example, the first protocol field is the same as the first protocol field in operation 2104. For details, also refer to the related descriptions in operation 701. The second protocol field may also be an existing protocol field, or may be a newly added field in an existing protocol stack framework. For example, an execution principle of sending the sixth packet by the access device to the second device based on the second packet is the same as the principle of sending the third packet by the access device to the second device based on the first packet in operation 702 in the embodiment shown in FIG. 7. For details, refer to the related principle in operation 702. The second protocol field may be the same as the second protocol field in operation 702. For details, reference may be made to each other. The details are not described herein again.

In an embodiment, after receiving the sixth packet from the access device, the second device extracts the second timestamp information carried in the second protocol field included in the sixth packet. For example, for a method, refer to Cases n1, n2, and n3 in operation 702. Details are not described herein again.

Operation 2106: The second device sends a third packet to the access device, and determines seventh timestamp information, where the seventh timestamp information is a moment that is in the Ethernet network and at which the second device sends the third packet.

For example, in FIG. 22, the moment corresponding to the seventh timestamp information is denoted as t11.

Operation 2107: The access device forwards the third packet to the first device.

Operation 2108: The first device determines third timestamp information, where the third timestamp information is a moment that is in the Ethernet network and at which the first device receives the third packet.

For example, in FIG. 22, the moment corresponding to the third timestamp information is denoted as t12.

Operation 2109: The first device sends a fourth packet to the access device, and determines fourth timestamp information, where the fourth timestamp information is a moment that is in the Ethernet network and at which the first device sends the fourth packet, and the fourth packet carries the third timestamp information.

For example, in FIG. 22, the moment corresponding to the fourth timestamp information is denoted as t13.

Operation 2110: The access device forwards the fourth packet to the second device.

Operation 2111: The second device determines eighth timestamp information, where the eighth timestamp information is a moment that is in the Ethernet network and at which the second device receives the fourth packet.

For example, in FIG. 22, the moment corresponding to the eighth timestamp information is denoted as t14.

Operation 2112: The first device sends a fifth packet to the access device, where the fifth packet carries the fourth timestamp information.

Operation 2113: The access device forwards the fifth packet to the second device.

Operation 2114: The second device determines a time offset between the first device and the second device based on the first timestamp information, the second timestamp information, the third timestamp information, the fourth timestamp information, the fifth timestamp information, the sixth timestamp information, the seventh timestamp information, and the eighth timestamp information, and performs time synchronization based on the time offset.

In an embodiment, a method in which the second device performs operation 2114 may be:

The second device determines ninth timestamp information based on the second timestamp information (t9'), the third timestamp information (t12), the sixth timestamp information (t10'), the seventh timestamp information (t11), and the eighth timestamp information (t14).

The second device deletes the fourth timestamp information (t13), and determines, based on the ninth timestamp information, the moment that is in the Ethernet network and at which the first device sends the fourth packet to the access device.

The second device determines the time offset between the first device and the second device based on the first timestamp information (t9), the third timestamp information (t12), the fifth timestamp information (t10), the seventh timestamp information (t11), the eighth timestamp information (t14), and the ninth timestamp information.

For example, a time offset, namely, offset 3, between a master and a slaver (referred to as the first device and the second device herein) in an existing fixed network (the Ethernet network) may satisfy Formula 7:

$$\text{offset3} = t10 - t9 - \frac{t12 - t11 + t14}{2} + \frac{t}{2}. \qquad \text{Formula 7}$$

Herein, t is the moment that is in the Ethernet network and at which the first device sends the fourth packet to the access device, and t is t13 in the existing fixed network.

In this application, the time offset between the first device and the second device in a scenario in which the mobile network is connected to the Ethernet network may be calculated through clock synchronization between the first device and the second device that is implemented in the mobile network. For example, the time offset may be obtained through calculation by using Formula 8 and Formula 9:

$$t10-t9=\text{offset4}+\text{delay3} \qquad \text{Formula 8; and}$$

$$t10'-t9'=\text{offset5}+\text{delay3} \qquad \text{Formula 9.}$$

Formula 8 indicates a time relationship in the Ethernet network, and offset 4 is a time offset between the first device and the second device in the Ethernet network. Formula 9 indicates a time relationship in the mobile network, offset 5 is a time offset between the first device and the second device in the mobile network, and delay 3 is a transmission delay from the first device to the second device.

Due to clock synchronization in the mobile network, a value of offset 5 is 0. Therefore, it can be learned that delay 3=t10'−t9', and it can be further learned that offset 4=t10−t9−t10'+t9'. Then, assuming that offset 3=offset 4, the following may be obtained:

$$t10 - t9 - t10' + t9' = t10 - t9 - \frac{t12 - t11 + t14}{2} + \frac{t}{2}$$

Therefore, it can be learned through arrangement that t=t12−t11+t14−2(t10'−t9'). In this case, obtained t is the ninth timestamp information. In other words, a moment corresponding to the ninth timestamp information is t12−t11+t14−2(t10'−t9').

After obtaining the ninth timestamp information, the second device uses the ninth timestamp information as the fourth timestamp information (t13) in the prior art for processing. For example, the second device may obtain a time offset between the first device and the second device. The time offset may satisfy Formula 10:

$$\text{offset6} = \qquad \text{Formula 10}$$
$$t10 - t9 - \frac{t12 - t11 + t14}{2} + \frac{t12 - t11 + t14 - 2(t10' - t9')}{2}.$$

It may be considered that Formula 10 is obtained after the second device substitutes the ninth timestamp information into Formula 7 to replace t. In other words, Formula 10 is obtained after the second device uses the ninth timestamp information as existing t13 for processing.

According to the synchronization method provided in an embodiment of this application, impact of a transmission delay between the first device and the second device can be avoided, so that a time precision requirement of an industrial factory can be met in a scenario in which the mobile network is connected to the Ethernet network.

Figure 23:
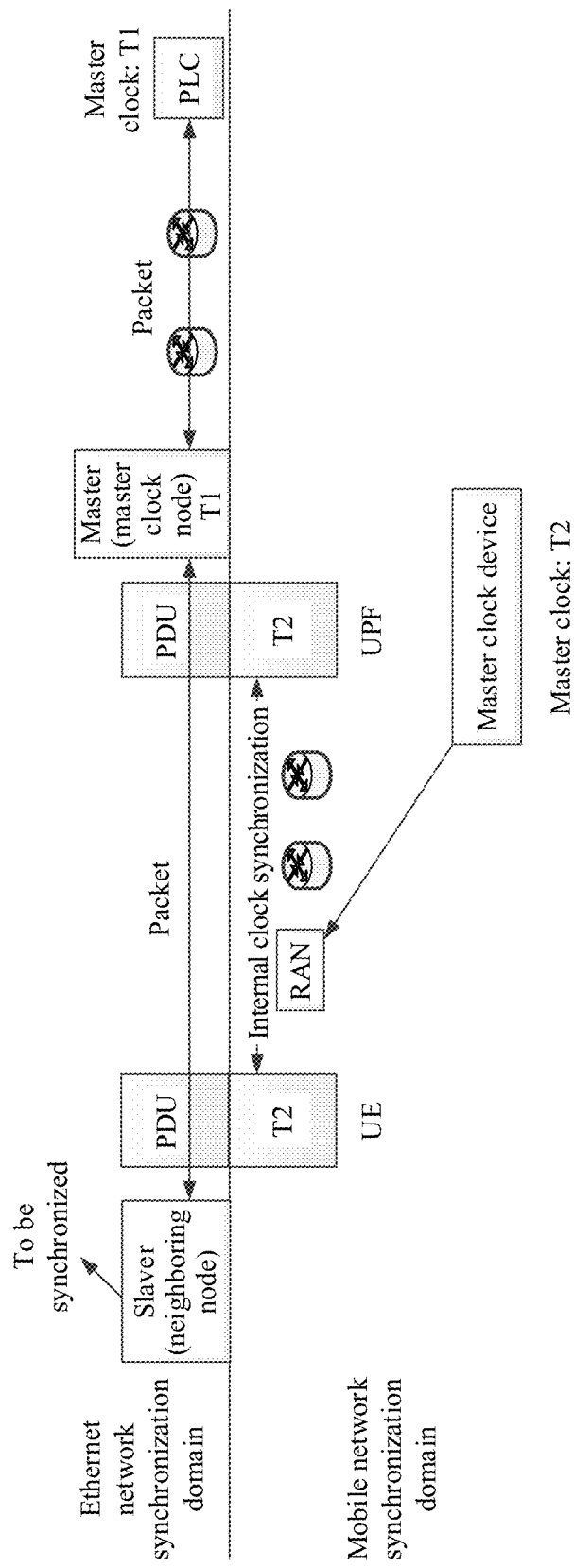
FIG. 23 is a schematic working diagram of another communications system according to an embodiment of the application.

FIG. 23 is a schematic working diagram of another communications system to which a synchronization method is applicable according to an embodiment of this application. A packet in FIG. 23 may be the same as the packet in FIG. 2. For detailed descriptions, refer to the related descriptions in FIG. 2.

A master clock device in an Ethernet network is a PLC, and a master clock in the Ethernet network is determined by the PLC. FIG. 23 shows a master clock T1 in an Ethernet network synchronization domain. In the Ethernet network synchronization domain, UE and a UPF are considered as two adjacent nodes, and the UE and the UPF are a master and a slaver, namely, devices in a transmission path. During clock synchronization, the slaver needs to perform clock synchronization based on master clock information of the master.

In a mobile network synchronization domain, for a master clock device, refer to the related descriptions in FIG. 2. A master clock in the mobile network is determined by the master clock device. FIG. 23 shows a master clock T2 in the mobile network synchronization domain. Correspondingly, in the Ethernet network, there is another multi-hop device, for example, a RAN, between the UE and the UPF that are adjacent nodes. However, currently, clock synchronization in the mobile network is implemented. Therefore, clock synchronization in the Ethernet network can be performed based on clock synchronization in the mobile network.

It should be noted that the UE in FIG. 23 is merely used as an example of a terminal device, or the UE may be replaced with another terminal device (for example, the mobile robot or the sensor 2 in FIG. 1). The UPF is merely used as an example of a user plane network element, or the UPF may be replaced with another user plane network element. This is not limited in this application.

Figure 24:
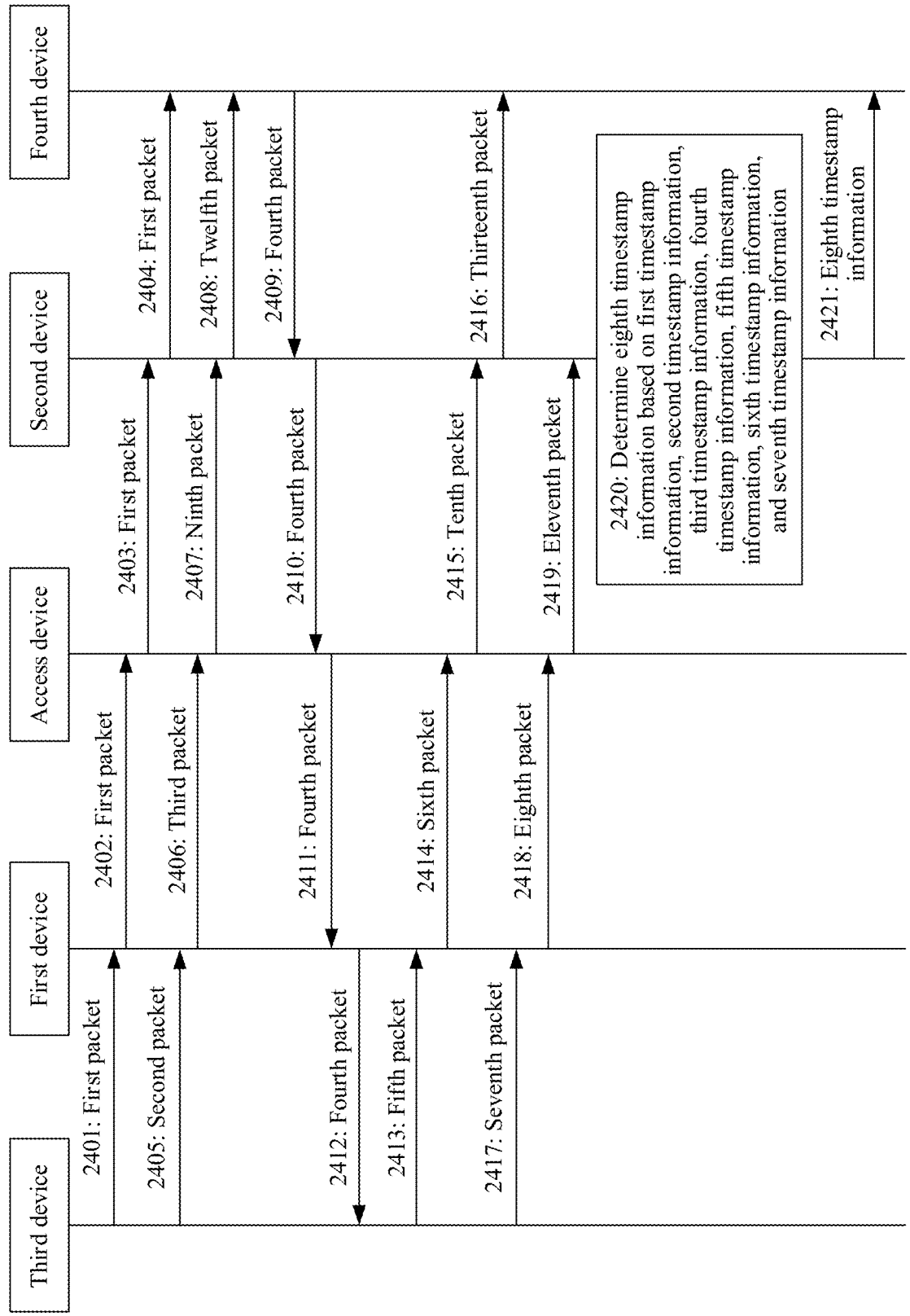
FIG. 24 is a flowchart of another synchronization method according to an embodiment of the application.

An embodiment of this application further provides another synchronization method, which is applicable to the communications systems shown in FIG. 1 and FIG. 23. For example, in FIG. 24, a first device is the UPF and a second device is the UE, or the first device is the UE and the second device is the UPF. The third device is a master, and the fourth device is a slaver. Referring to FIG. 24, a procedure of the method includes the following operations.

Operation 2401: The first device receives a first packet from the third device, and determines first timestamp information, where the first timestamp information is a moment that is in a mobile network and at which the first device receives the first packet.

Figure 25:
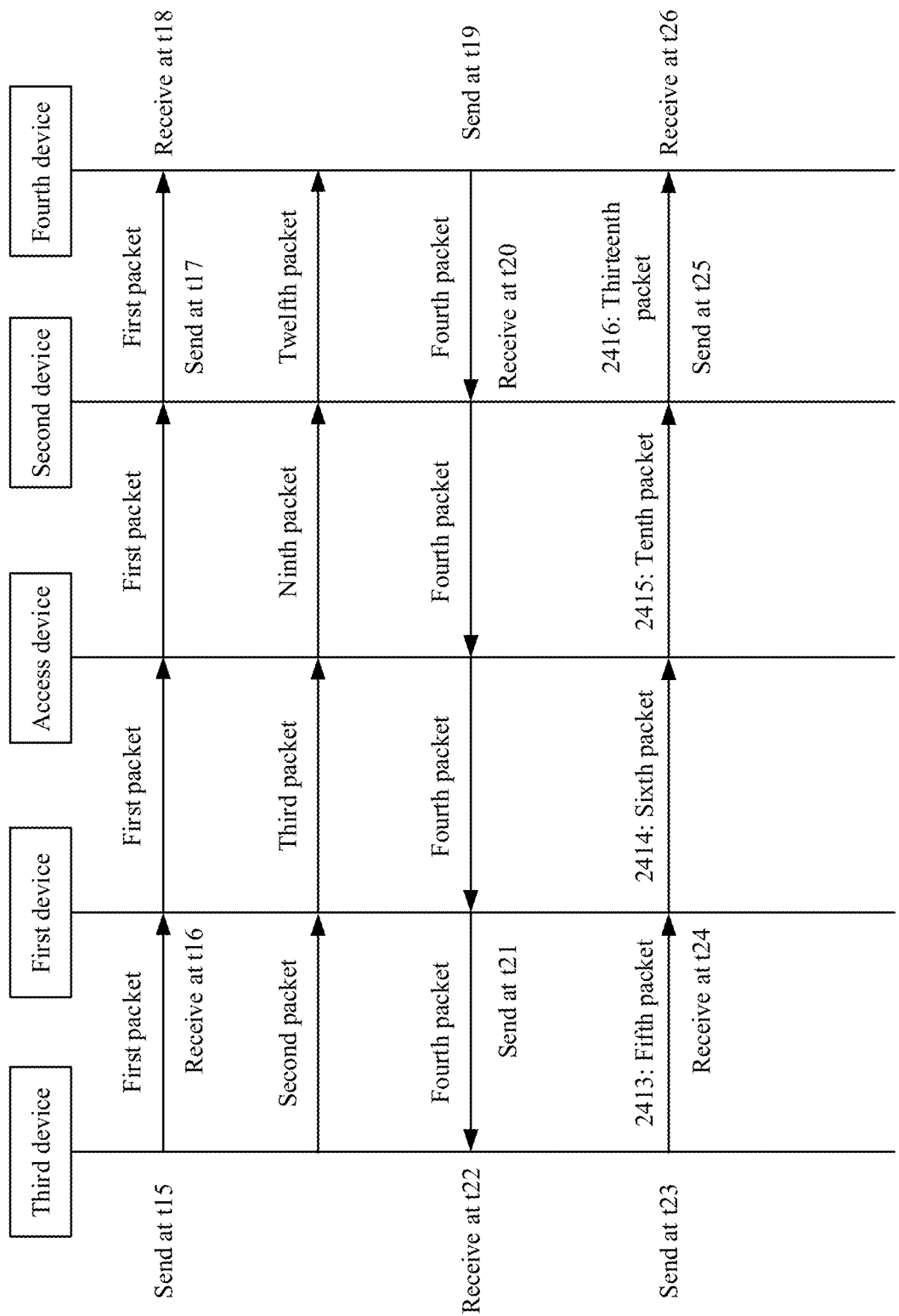
FIG. 25 is another schematic diagram of packet receiving and sending in a synchronization process according to an embodiment of the application.

For example, FIG. 25 is a schematic diagram of packet receiving and sending in a process of performing synchronization between the third device and the fourth device.

For example, the moment corresponding to the first timestamp information is denoted as t16 in FIG. 25.

The third device initiates a clock synchronization procedure. A trigger condition for initiating the clock synchronization procedure by the third device is the same as the principle described in operation 301 in the embodiment shown in FIG. 3. For details, reference may be made to each other. The details are not described herein again.

Operation 2402: The first device sends the first packet to an access device.

Operation 2403: The access device forwards the first packet to the second device.

The first device is a user plane network element and the second device is a terminal device, or the first device is a terminal device and the second device is a user plane network element.

Operation 2404: The second device sends the first packet to the fourth device, and determines fifth timestamp information, where the fifth timestamp information is a moment that is in the mobile network and at which the second device sends the first packet to the fourth device.

For example, the moment corresponding to the fifth timestamp information may be denoted as t17 in FIG. 25.

Then, the fourth device determines a moment that is in an Ethernet network and at which the fourth device receives the first packet sent by the second device, for example, t18 shown in FIG. 25.

Operation 2405: The first device receives a second packet from the third device.

The second packet carries a moment at which the third device sends the first packet, for example, t15 shown in FIG. 25.

Operation 2406: The first device sends a third packet to the access device based on the second packet, where the third packet carries the first timestamp information, and the third packet further carries t15.

For example, the third packet may further carry a flag, and the flag is used to indicate that the third packet carries timestamp information indicating a moment in the mobile network.

In an embodiment, a implementation in which the third packet carries the first timestamp information may be: The first device uses a first protocol field included in the third packet to carry the first timestamp information. For example, the first protocol field may be an existing protocol field in the third packet in a current protocol stack framework. Alternatively, the first protocol field may be a protocol field newly added to the third packet in a current protocol stack framework. For example, when the third packet further carries a flag, the flag may also be carried in the first protocol field.

In an embodiment, the third packet may be generated by the first device by encapsulating the first timestamp information in a first protocol field in the second packet.

For example, the first protocol field may be the same as the first protocol field in operation 701 in the embodiment shown in FIG. 7. For detailed descriptions of the first protocol field, refer to the related descriptions of the first protocol field in operation 701. No repeated description is provided herein.

Operation 2407: The access device sends a ninth packet to the second device based on the third packet, where the ninth packet carries the first timestamp information.

For example, the ninth packet further carries t15.

In an embodiment, a method in which the access device sends the ninth packet to the second device based on the third packet may be: When detecting that a first protocol field included in the third packet carries the first timestamp information, the access device encapsulates the first timestamp information in a fourth protocol field in the third packet to generate the ninth packet, and sends the ninth packet to the second device. In this case, a fourth protocol field in the ninth packet carries the first timestamp information.

For example, the first protocol field is the same as the first protocol field in operation 2406. For details, also refer to the related descriptions in operation 701. The fourth protocol field may also be an existing protocol field, or may be a newly added field in an existing protocol stack framework. For example, an execution principle of sending the ninth packet by the access device to the second device based on the third packet is the same as the principle of sending the third packet by the access device to the second device based on the first packet in operation 702 in the embodiment shown in FIG. 7. For details, refer to the related principle in operation 702. The fourth protocol field may be the same as the second protocol field in operation 702. For details, reference may be made to each other. The details are not described herein again.

In an embodiment, after receiving the ninth packet from the access device, the second device extracts the first timestamp information carried in the fourth protocol field included in the ninth packet. For example, for a method, refer to Cases n1, n2, and n3 in operation 702. Details are not described herein again.

Operation 2408: The second device sends a twelfth packet to the fourth device based on the ninth packet.

In an implementation, when the second device performs operation 2408, a method may be: The second device deletes the first timestamp information from the fourth protocol field in the ninth packet to generate the twelfth packet. In this case, the twelfth packet carries only t15.

Operation 2409: The second device receives a fourth packet from the fourth device, and determines sixth timestamp information, where the sixth timestamp information is a moment that is in the mobile network and at which the second device receives the fourth packet.

The fourth device records a moment that is in the Ethernet network and at which the fourth device sends the fourth packet, for example, t19 in FIG. 25.

For example, the moment corresponding to the sixth timestamp information is denoted as t20 in FIG. 25.

Operation 2410: The second device sends the fourth packet to the access device.

Operation 2411: The access device sends the fourth packet to the first device.

Operation 2412: The first device sends the fourth packet to the third device, and determines second timestamp information, where the second timestamp information is a moment that is in the mobile network and at which the first device sends the fourth packet to the third device.

For example, the moment corresponding to the second timestamp information is denoted as t21 in FIG. 25.

The third device records a moment that is in the Ethernet network and at which the third device receives the fourth packet, for example, t22 shown in FIG. 25.

Operation 2413: The first device receives a fifth packet from the third device, and determines third timestamp information, where the third timestamp information is a moment that is in the mobile network and at which the first device receives the fifth packet.

The third device records a moment that is in the Ethernet network and at which the third device sends the fifth packet, for example, t23 in FIG. 25.

For example, the moment corresponding to the third timestamp information may be denoted as t24 in FIG. 25.

Operation 2414: The first device sends a sixth packet to the access device based on the fifth packet, where the sixth packet carries the second timestamp information.

The sixth packet further carries t22.

For example, the sixth packet may further carry a flag, and the flag is used to indicate that the sixth packet carries timestamp information indicating a moment in the mobile network.

In an embodiment, a implementation in which the sixth packet carries the second timestamp information may be: The first device uses a second protocol field included in the sixth packet to carry the second timestamp information. For example, the second protocol field may be an existing protocol field in the sixth packet in a current protocol stack framework. Alternatively, the second protocol field may be a protocol field newly added to the sixth packet in a current protocol stack framework. For example, when the sixth packet further carries a flag, the flag may also be carried in the second protocol field.

In an embodiment, the sixth packet may be generated by the first device by encapsulating the second timestamp information in a second protocol field in the fifth packet.

For example, the second protocol field may be the same as the first protocol field in operation 701 in the embodiment shown in FIG. 7. For detailed descriptions of the second protocol field, refer to the related descriptions of the first protocol field in operation 701. No repeated description is provided herein.

Operation 2415: The access device sends a tenth packet to the second device based on the sixth packet, where the tenth packet carries the second timestamp information.

The tenth packet further carries t22.

In an embodiment, a method in which the access device sends the tenth packet to the second device based on the sixth packet may be: when detecting that a second protocol field included in the sixth packet carries the second timestamp information, the access device encapsulates the second timestamp information in a fifth protocol field in the sixth packet to generate the tenth packet, and sends the tenth packet to the second device. In this case, a fifth protocol field in the tenth packet carries the second timestamp information.

For example, the second protocol field is the same as the second protocol field in operation 2414. For details, also refer to the related descriptions in operation 701. The fifth protocol field may also be an existing protocol field, or may be a newly added field in an existing protocol stack framework. For example, an execution principle of sending the tenth packet by the access device to the second device based on the sixth packet is the same as the principle of sending the third packet by the access device to the second device based on the first packet in operation 702 in the embodiment shown in FIG. 7. For details, refer to the related principle in operation 702. The fifth protocol field may be the same as the second protocol field in operation 702. For details, reference may be made to each other. The details are not described herein again.

In an embodiment, after receiving the tenth packet from the access device, the second device extracts the second timestamp information carried in the fifth protocol field included in the tenth packet. For example, for a method, refer to Cases n1, n2, and n3 in operation 702. Details are not described herein again.

Operation 2416: The second device sends a thirteenth packet to the fourth device, and determines seventh timestamp information, where the seventh timestamp information is a moment that is in the mobile network and at which the second device sends the thirteenth packet to the fourth device.

The thirteenth packet is generated after the second device deletes the second timestamp information from the fifth protocol field in the tenth packet. In this case, the thirteenth packet carries t22.

For example, the moment corresponding to the seventh timestamp information may be denoted as t25 in FIG. 25.

In an embodiment, the fourth device records a moment that is in the Ethernet network and at which the fourth device receives the thirteenth packet, for example, t26 in FIG. 25.

Operation 2417: The first device receives a seventh packet from the third device, where the seventh packet carries fourth timestamp information, and the fourth timestamp information is a moment that is in the Ethernet network and at which the third device sends the fifth packet to the first device.

For example, the moment corresponding to the fourth timestamp information is t23 in FIG. 25.

Operation 2418: The first device sends an eighth packet to the access device, where the eighth packet carries the third timestamp information and the fourth timestamp information.

For example, the eighth packet may further carry a flag, and the flag is used to indicate that the eighth packet carries timestamp information indicating a moment in the mobile network.

In an embodiment, a method in which the eighth packet carries the third timestamp information may be: The first device uses a third protocol field included in the eighth packet to carry the third timestamp information. For example, the third protocol field may be an existing protocol field in the eighth packet in a current protocol stack framework. Alternatively, the third protocol field may be a protocol field newly added to the eighth packet in a current protocol stack framework. For example, when the eighth packet further carries a flag, the flag may also be carried in the third protocol field.

In an embodiment, the eighth packet may be generated by the first device by encapsulating the third timestamp information in a third protocol field in the seventh packet.

For example, the third protocol field may be the same as the first protocol field in operation 701 in the embodiment shown in FIG. 7. For detailed descriptions of the third protocol field, refer to the related descriptions of the first protocol field in operation 701. No repeated description is provided herein.

Operation 2419: The access device sends an eleventh packet to the second device based on the eighth packet, where the eleventh packet carries the third timestamp information and the fourth timestamp information.

In an embodiment, a method in which the access device sends the eleventh packet to the second device based on the eighth packet may be: When detecting that a third protocol field included in the eighth packet carries the third timestamp information, the access device encapsulates the third timestamp information in a sixth protocol field in the eighth packet to generate the eleventh packet, and sends the eleventh packet to the second device. In this case, a sixth protocol field in the eleventh packet carries the second timestamp information.

For example, the third protocol field is the same as the third protocol field in operation 2418. For details, also refer to the related descriptions in operation 701. The sixth protocol field may also be an existing protocol field, or may be a newly added field in an existing protocol stack framework. For example, an execution principle of sending the eleventh packet by the access device to the second device based on the eighth packet is the same as the principle of sending the third packet by the access device to the second device based on the first packet in operation 702 in the embodiment shown in FIG. 7. For details, refer to the related principle in operation 702. The sixth protocol field may be the same as the second protocol field in operation 702. For details, reference may be made to each other. The details are not described herein again.

In an embodiment, after receiving the eleventh packet from the access device, the second device extracts the third timestamp information carried in the sixth protocol field included in the eleventh packet. For example, for a method, refer to Cases n1, n2, and n3 in operation 702. Details are not described herein again.

Operation 2420: The second device determines eighth timestamp information based on the first timestamp information (t16), the second timestamp information (t21), the third timestamp information (t24), the fourth timestamp information, the fifth timestamp information (t17), the sixth timestamp information (t20), and the seventh timestamp information (t25).

For example, a time offset, namely, offset 7, between the master and the slaver (referred to as the third device and the fourth device herein) in an existing fixed network (the Ethernet network) may satisfy Formula 11:

$$\text{offset7} = t18 - t15 - \frac{t22 - t19 + t26}{2} + \frac{t'}{2}. \qquad \text{Formula 11}$$

Herein, t' is the moment that is in the Ethernet network and at which the third device sends the fifth packet to the access device, and t' is t23 in the existing fixed network.

For example, a time relationship in the Ethernet network represents that cases in Formula 12 to Formula 14 may exist:

$$t18-t15 = \text{offset8} + \text{delay4} + \Delta t1 + \Delta t2 \qquad \text{Formula 12;}$$

$$t22-t19 = -\text{offset8} + \text{delay5} + \Delta t1 + \Delta t2 \qquad \text{Formula 13; and}$$

$$t26-t23 = \text{offset8} + \text{delay6} + \Delta t1 + \Delta t2 \qquad \text{Formula 14.}$$

Herein, offset 8 is a time offset between the third device and the fourth device in the Ethernet network, delay 4 is a transmission delay from the first device to the second device, delay 5 is a transmission delay from the second device to the first device, delay 6 is a transmission delay from the first device to the second device, $\Delta t1$ is transmission duration between the third device and the first device (or transmission duration between the second device and the fourth device), and $\Delta t2$ is transmission duration between the second device and the fourth device (or transmission duration between the third device and the first device).

A time relationship in the mobile network represents that cases in Formula 15 to Formula 17 may exist:

$$t17-t16 = \text{offset9} + \text{delay4} \qquad \text{Formula 15;}$$

$$t21-t20 = -\text{offset9} + \text{delay5} \qquad \text{Formula 16; and}$$

$$t25-t24 = \text{offset9} + \text{delay6} \qquad \text{Formula 17.}$$

Herein, offset 9 is a time offset between the first device and the second device in the mobile network.

Due to clock synchronization in the mobile network, a value of offset 9 is 0. Therefore, it can be learned that delay 4=t17−t16.

It can be learned through arrangement by using Formula 13, Formula 14, Formula 16, and Formula 17 that $\Delta t1+\Delta t2=$ [t22−t19+t26−t23−(t21−t20+t25−t24)]/2.

The following may be obtained by substituting delay 4 and a result of $\Delta t1+\Delta t2$ into Formula 12.

$$\text{offset8} = t18 - t15 - \frac{t22 - t19 + t26}{2} + \frac{t23}{2} + \frac{t21 - t20 + t25 - t24}{2} + t16 - t17.$$

Assuming that offset 8=offset 7, the following may be obtained:

$$t18 - t15 - \frac{t22 - t19 + t26}{2} + \frac{t23}{2} + \frac{t21 - t20 + t25 - t24}{2} + t16 - t17 =$$
$$t18 - t15 - \frac{t22 - t19 + t26}{2} + \frac{t'}{2}.$$

Then, it can be learned through arrangement that t=2(t16−t17)+t23+t21−t20+t25−t24. In this case, obtained t' is the eighth timestamp information. In other words, a moment corresponding to the eighth timestamp information is 2(t16−t17)+t23+t21−t20+t25−t24.

Operation 2421: The second device sends the eighth timestamp information to the fourth device, so that the fourth device performs time synchronization based on the eighth timestamp information.

In the prior art, the second device sends t23 to the fourth device. In this application, the second device sends the eighth timestamp information to the fourth device by using an existing method for sending t23. It may also be understood that the eighth timestamp information is sent to the fourth device in place of t23. In this way, when receiving the eighth timestamp information, the fourth device uses the eighth timestamp information as t23 in the prior art for processing.

In an embodiment, after receiving the eighth timestamp information, the fourth device obtains a time offset between the third device and the fourth device based on t18, t15, t22, t19, t26, and the eighth timestamp information (2(t16−t17)+t23+t21−t20+t25−t24). The time offset may satisfy Formula 18:

$$\text{offset10} = t18 - t15 - \frac{t22 - t19 + t26}{2} + \frac{2(t16 - t17) + t23 + t21 - t20 + t25 - t24}{2}. \quad \text{Formula 18}$$

It may be considered that Formula 18 is obtained after the fourth device substitutes the eighth timestamp information into Formula 11 to replace t'. In other words, Formula 18 is obtained after the fourth device uses the eighth timestamp information as existing t23 for processing.

Based on the foregoing result, the fourth device may perform time synchronization based on offset 10.

According to the synchronization method provided in an embodiment of this application, impact of a transmission delay between the first device and the second device can be avoided, so that a time precision requirement of an industrial factory can be met in a scenario in which the mobile network is connected to the Ethernet network.

Figure 26:
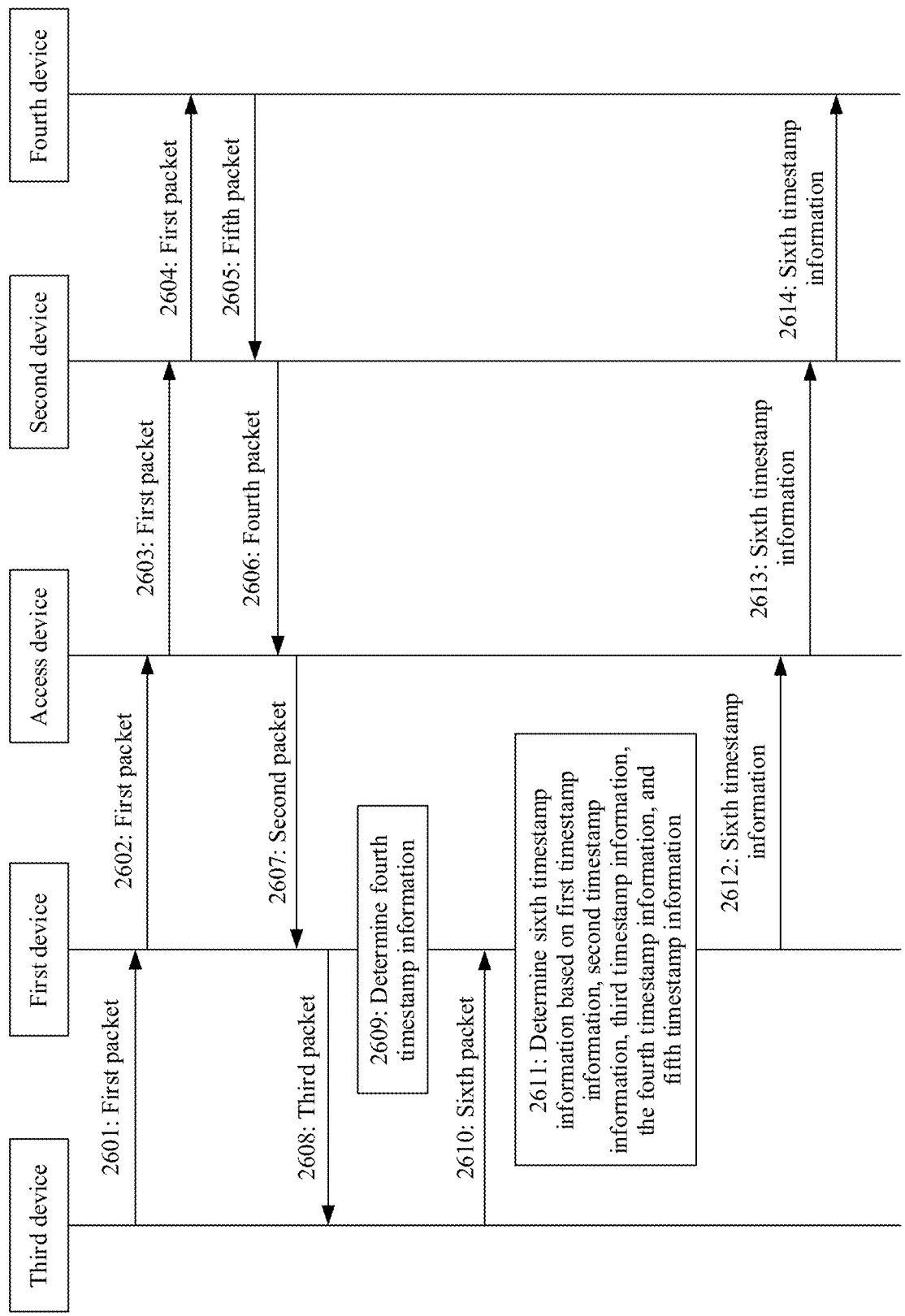
FIG. 26 is a flowchart of another synchronization method according to an embodiment of the application.

An embodiment of this application further provides another synchronization method, which is applicable to the communications systems shown in FIG. 1 and FIG. 23. For example, in FIG. 26, a first device is the UPF and a second device is the UE, or the first device is the UE and the second device is the UPF. The third device is a master, and the fourth device is a slaver. Referring to FIG. 26, a procedure of the method includes the following operations.

Operation 2601: The first device receives a first packet from the third device, and determines first timestamp information, where the first timestamp information is a moment that is in a mobile network and at which the first device receives the first packet.

Figure 27:
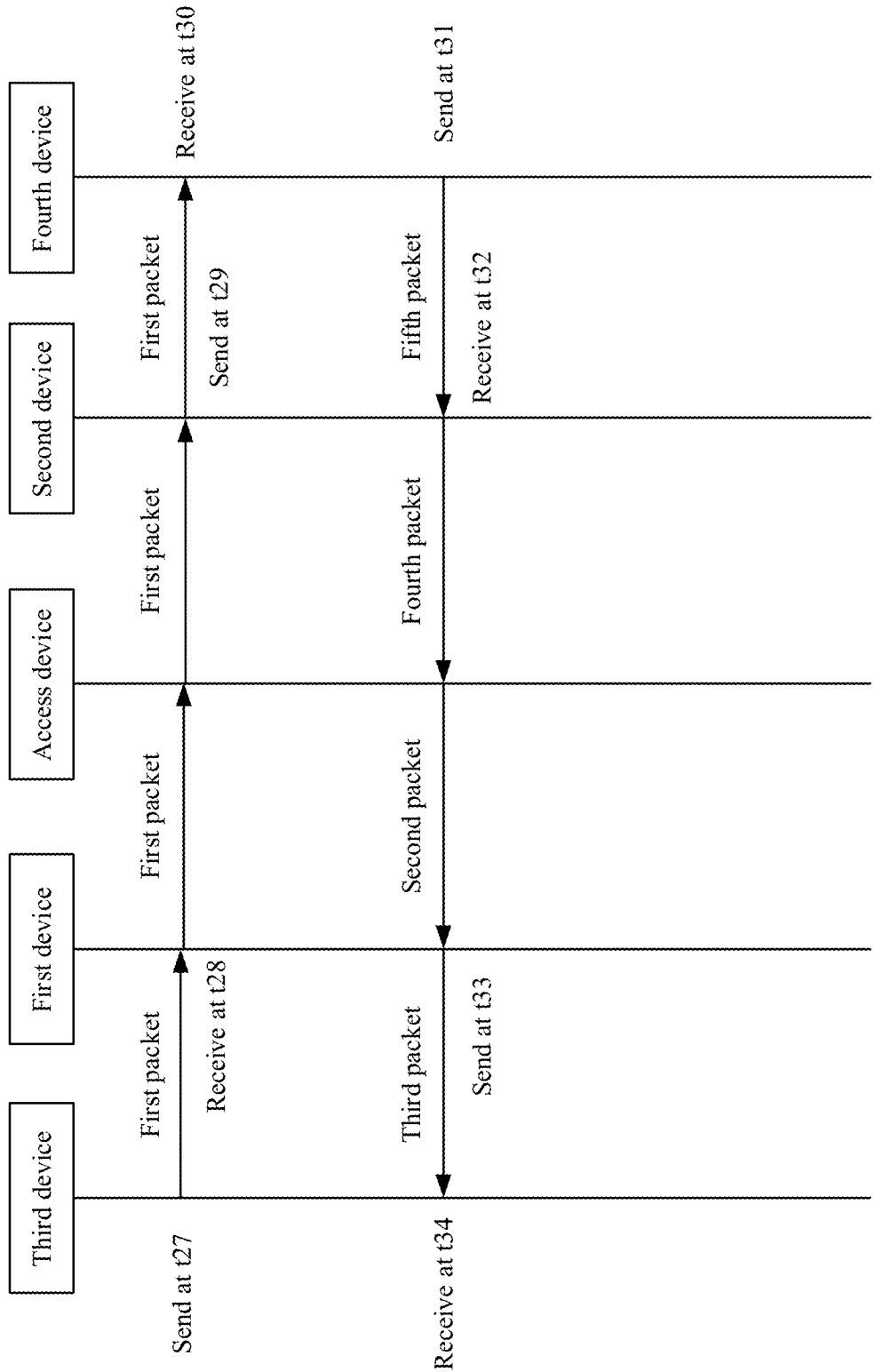
FIG. 27 is another schematic diagram of packet receiving and sending in a synchronization process according to an embodiment of the application.

For example, FIG. 27 is a schematic diagram of packet receiving and sending in a process of performing synchronization between the third device and the fourth device.

For example, the moment corresponding to the first timestamp information may be t28 shown in FIG. 27.

In an embodiment, the first packet carries a moment that is in an Ethernet network and at which the third device sends the first packet, for example, t27 shown in FIG. 27.

The third device initiates a clock synchronization procedure. A trigger condition for initiating the clock synchronization procedure by the third device is the same as the principle described in operation 301 in the embodiment shown in FIG. 3. For details, reference may be made to each other. The details are not described herein again.

Operation 2602: The first device sends the first packet to the access device.

Operation 2603: The access device sends the first packet to the second device.

The first device is a user plane network element and the second device is a terminal device, or the first device is a terminal device and the second device is a user plane network element.

Operation 2604: The second device sends the first packet to the fourth device, and determines second timestamp information, where the second timestamp information is a moment that is in the mobile network and at which the second device sends the first packet.

For example, the moment corresponding to the second timestamp information may be t29 in FIG. 27.

After receiving the first packet, the fourth device records a moment that is in the Ethernet network and at which the fourth device receives the first packet, for example, t30 in FIG. 27.

Operation 2605: The second device receives a fifth packet from the fourth device, and determines third timestamp information, where the third timestamp information is a moment that is in the mobile network and at which the second device receives the fifth packet.

For example, the moment corresponding to the third timestamp information may be denoted as t32 in FIG. 27.

The fourth device may record a moment that is in the Ethernet network and at which the fourth device sends the fifth packet, for example, t31 shown in FIG. 27.

Operation 2606: The second device sends a fourth packet to the access device, where the fourth packet carries the second timestamp information and the third timestamp information.

For example, the fourth packet may further carry a flag, and the flag is used to indicate that the fourth packet carries timestamp information indicating a moment in the mobile network.

In an embodiment, a method in which the fourth packet carries the second timestamp information and the third timestamp information may be: The second device uses a second protocol field included in the fourth packet to carry the second timestamp information and the third timestamp information. For example, the second protocol field may be an existing protocol field in the fourth packet in a current protocol stack framework. Alternatively, the second protocol field may be a protocol field newly added to the fourth packet in a current protocol stack framework. For example, when the fourth packet further carries a flag, the flag may also be carried in the second protocol field.

In an embodiment, the fourth packet may be generated by the second device by encapsulating the second timestamp information and the third timestamp information in a second protocol field in the fifth packet.

For example, the second protocol field may be the same as the second protocol field in operation 304 in the embodiment shown in FIG. 3. For detailed descriptions of the second protocol field, refer to the related descriptions of the second protocol field in operation 304. No repeated description is provided herein.

Operation 2607: The access device sends a second packet to the first device, where the second packet carries the second timestamp information and the third timestamp information.

In an embodiment, a method in which the access device sends the second packet to the first device may be: When detecting that a second protocol field included in the fourth packet carries the second timestamp information and the third timestamp information, the access device encapsulates the second timestamp information and the third timestamp information in a first protocol field included in the fourth packet to generate the second packet, and sends the second packet to the first device.

For example, the second protocol field is the same as the second protocol field in operation 2606. For details, also refer to the related descriptions in operation 304. The first protocol field may also be an existing protocol field, or may be a newly added field in an existing protocol stack framework. For example, an execution principle of sending the second packet by the access device to the first device is the same as the principle of sending the second packet by the access device to the first device in operation 306 in the embodiment shown in FIG. 3. For details, refer to the related principle in operation 306. The first protocol field may be the same as the first protocol field in operation 306. For details, reference may be made to each other. The details are not described herein again.

In an embodiment, after receiving the second packet from the access device, the first device extracts the second timestamp information and the third timestamp information that are carried in a first protocol field included in the second packet. For example, for a method, refer to Cases g1, g2, and g3 in operation 306. Details are not described herein again.

Operation 2608: The first device sends a third packet to the third device.

In an implementation, when the first device performs operation 2608, a method may be: The first device deletes the second timestamp information and the third timestamp information from the first protocol field in the second packet to generate the third packet, and sends the third packet.

The third device may record a moment that is in the Ethernet network and at which the third device receives the third packet, for example, t34 in FIG. 27.

Operation 2609: The first device determines fourth timestamp information, where the fourth timestamp information is a moment that is in the mobile network and at which the first device sends the third packet.

For example, the moment corresponding to the fourth timestamp information may be denoted as t33 in FIG. 27.

Operation 2610: The first device receives a sixth packet from the third device, where the sixth packet carries fifth timestamp information, and the fifth timestamp information is a moment that is in the Ethernet network and at which the third device receives the third packet sent by the first device.

The moment corresponding to the fifth timestamp information is t34 in FIG. 27.

Operation 2611: The first device determines sixth timestamp information based on the first timestamp information, the second timestamp information, the third timestamp information, the fourth timestamp information, and the fifth timestamp information.

In an embodiment, a method in which the first device performs operation 2611 may be: The first device determines a round-trip transmission delay difference between the first device and the second device based on the first timestamp information (t28), the second timestamp information (t29), the third timestamp information (t32), and the fourth timestamp information (t33). Then, the first device calculates a sum of the moment (t34) corresponding to the fifth timestamp information and the round-trip transmission delay difference, to obtain the sixth timestamp information.

For example, the round-trip transmission delay difference between the first device and the second device may be calculated through clock synchronization between the first device and the second device that is implemented in the mobile network. For example, the round-trip transmission delay difference may be obtained through calculation by using Formula 19 and Formula 20:

$$t29-t28=delay7+offset10 \quad \text{Formula 19; and}$$

$$t33-t32=delay8-offset10 \quad \text{Formula 20.}$$

In the foregoing formulas, offset 10 is a time offset between the first device and the second device in the mobile network, delay 7 is a transmission delay from the first device to the second device, and delay 8 is a transmission delay from the second device to the first device.

Due to clock synchronization in the mobile network, a value of offset 10 is 0. Therefore, the round-trip transmission delay difference may be obtained by using Formula 19 and Formula 20, that is, delay 7−delay 8=t29−t28−t33+t32.

Further, a moment corresponding to the sixth timestamp information is t34+t29−t28−t33+t32.

Operation 2612: The first device sends the sixth timestamp information to the access device.

For example, in the prior art, the first device sends the fifth timestamp information to the access device, so that the access device sends the fifth timestamp information to the second device, and transmits the fifth timestamp information to the fourth device. In this application, the first device transmits the sixth timestamp information to the fourth device by using an existing method for sending the fifth timestamp information. It may also be understood that the sixth timestamp information is sent to the fourth device in place of the fifth timestamp information. In this way, when receiving the sixth timestamp information, the fourth device uses the sixth timestamp information as the fifth timestamp information in the prior art for processing.

In an embodiment, when the first device performs operation 2612, the first device may replace the fifth timestamp information in the sixth packet with the sixth timestamp information to generate a seventh packet, and send the seventh packet to the access device, where the seventh packet carries the sixth timestamp information, and finally, the seventh packet is sent to the fourth device.

Operation 2613: The access device sends the sixth timestamp information to the second device.

Operation 2614: The second device sends the sixth timestamp information to the fourth device, so that the fourth device performs time synchronization based on the sixth timestamp information.

In an embodiment, the fourth device may determine a time offset between the third device and the fourth device based on t27, t30, t31, and the sixth timestamp information (t34+t29−t28−t33+t32), and perform time synchronization based on the time offset.

In an embodiment, as described in operation 2612, the fourth device may determine, based on the sixth timestamp information, the moment that is in the Ethernet network, at which the third device receives the third packet, and that is considered by the fourth device, and use the sixth timestamp information as the fifth timestamp information.

For example, a time offset, namely, offset 11, between the third device and the fourth device may satisfy Formula 21:

$$\text{offset}11 = \frac{t30 - t27 - (t34 + t29 - t28 - t33 + t32) + t31}{2}. \quad \text{Formula 21}$$

According to the synchronization method provided in an embodiment of this application, impact of a transmission delay between the first device and the second device can be avoided, so that a time precision requirement of an industrial factory can be met in a scenario in which the mobile network is connected to the Ethernet network.

Figure 28:
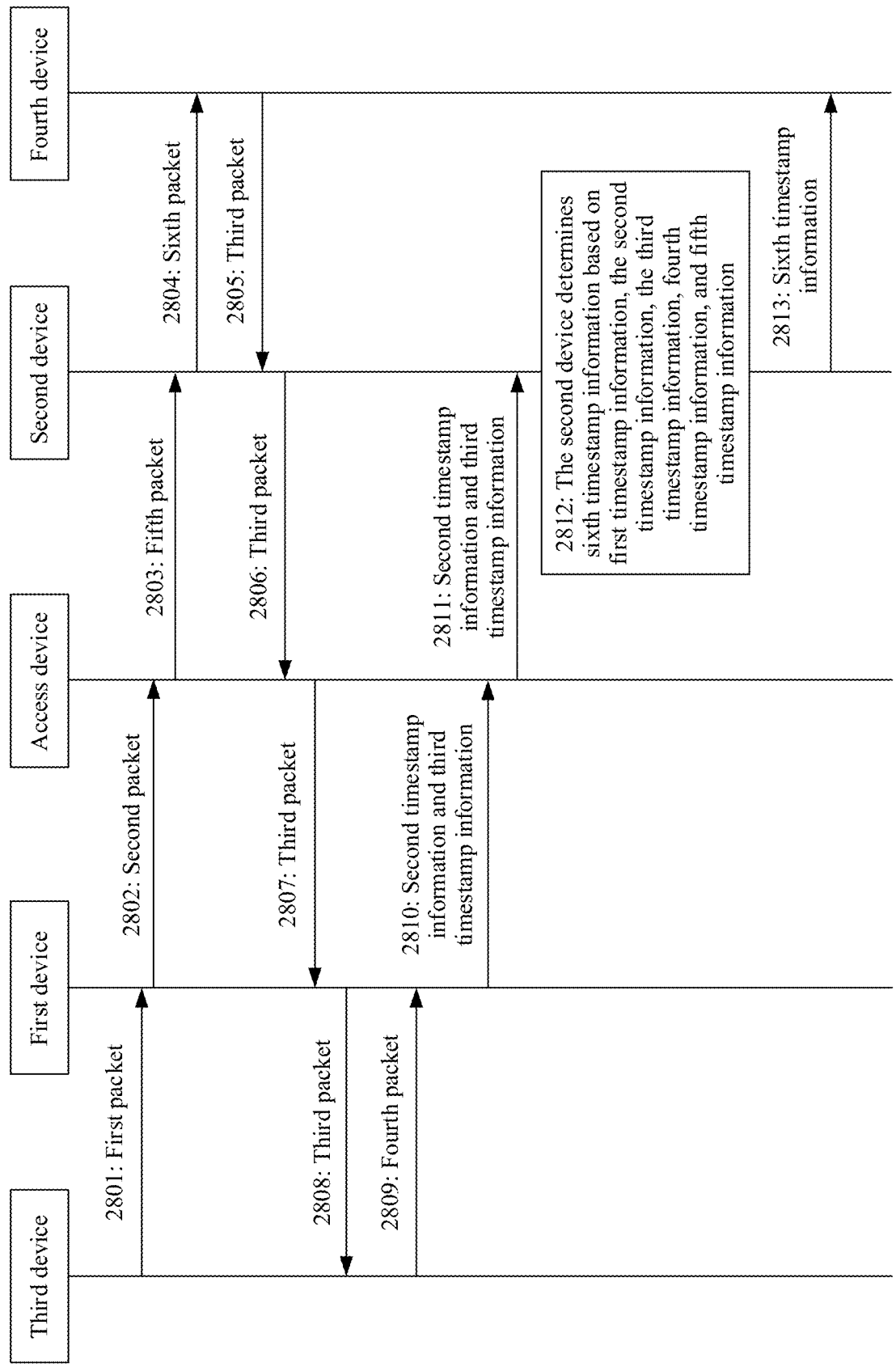
FIG. 28 is a flowchart of another synchronization method according to an embodiment of the application.

An embodiment of this application further provides another synchronization method, which is applicable to the communications systems shown in FIG. 1 and FIG. 23. For example, in FIG. 28, a first device is the UPF and a second device is the UE, or the first device is the UE and the second device is the UPF. The third device is a master, and the fourth device is a slaver. Referring to FIG. 28, a procedure of the method includes the following operations.

Operation 2801: The first device receives a first packet from the third device, and determines first timestamp information, where the first timestamp information is a moment that is in a mobile network and at which the first device receives the first packet.

A trigger condition for initiating a clock synchronization procedure by the third device is the same as the principle described in operation 301 in the embodiment shown in FIG. 3. For details, reference may be made to each other. The details are not described herein again.

Figure 29:
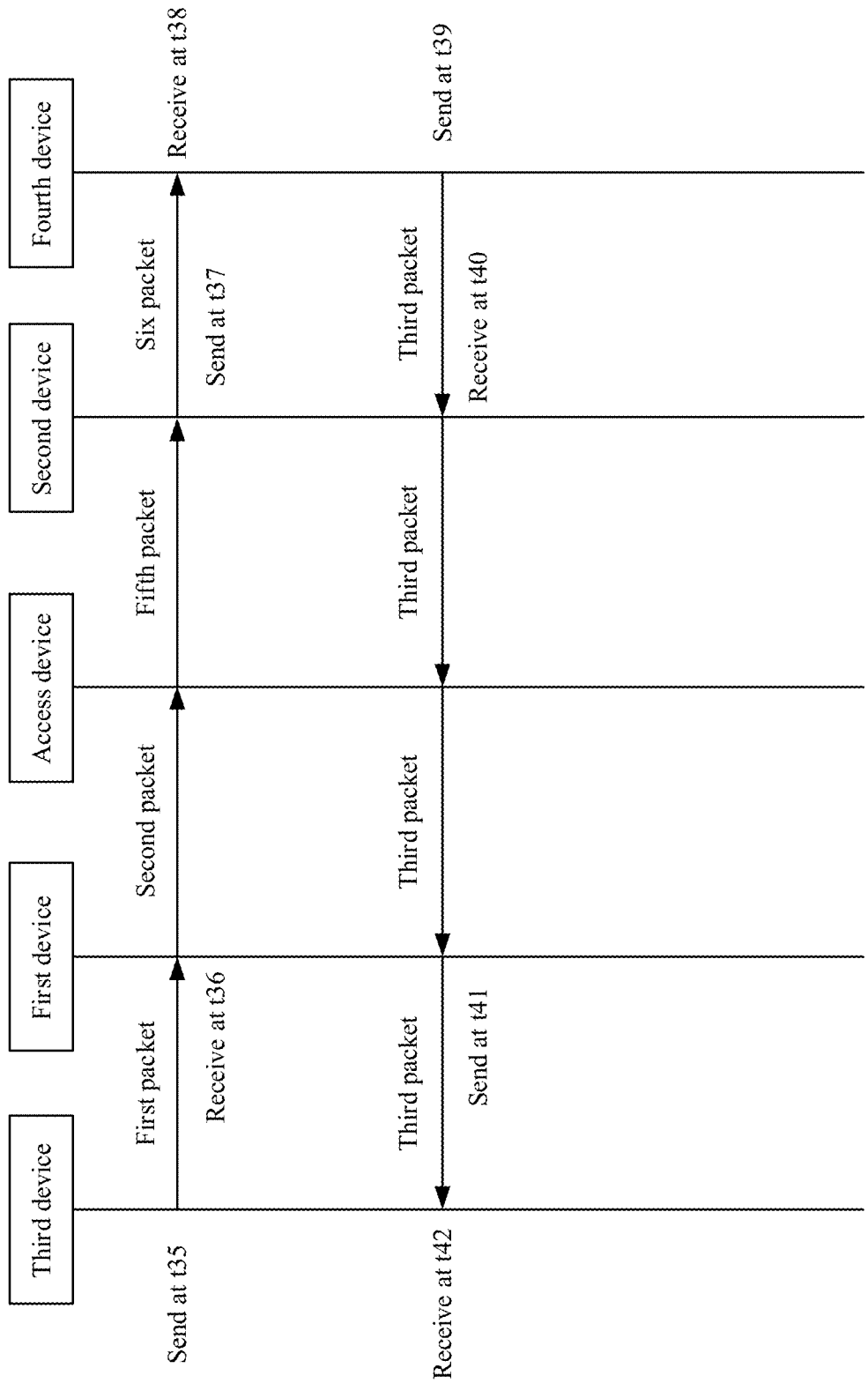
FIG. 29 is another schematic diagram of packet receiving and sending in a synchronization process according to an embodiment of the application.

For example, FIG. 29 is a schematic diagram of packet receiving and sending in a process of performing synchronization between the third device and the fourth device.

For example, the first timestamp information may be denoted as t36 in FIG. 29.

In an embodiment, the first packet carries a moment that is in an Ethernet network and at which the third device sends the first packet, for example, t35 shown in FIG. 29.

Operation 2802: The first device sends a second packet to an access device based on the first packet, where the second packet carries the first timestamp information.

In an embodiment, a method in which the second packet carries the first timestamp information may be: The first device uses a first protocol field included in the second packet to carry the first timestamp information. For example, the first protocol field may be an existing protocol field in the second packet in a current protocol stack framework. Alternatively, the first protocol field may be a protocol field newly added to the second packet in a current protocol stack framework. For example, when the second packet further carries a flag, the flag may also be carried in the first protocol field.

In an embodiment, the second packet may be generated by the first device by encapsulating the first timestamp information in a third protocol field in the first packet.

For example, the first protocol field may be the same as the first protocol field in operation 701 in the embodiment shown in FIG. 7. For detailed descriptions of the first protocol field, refer to the related descriptions of the first protocol field in operation 701. No repeated description is provided herein.

In an embodiment, the second packet further carries t35.

Operation 2803: The access device sends a fifth packet to the second device based on the second packet, where the fifth packet carries the first timestamp information.

The first device is a user plane network element and the second device is a terminal device, or the first device is a terminal device and the second device is a user plane network element.

In an embodiment, a method in which the access device sends the fifth packet to the second device based on the second packet may be: When the access device detects that a first protocol field included in the second packet includes the first timestamp information, the access device encapsulates the first timestamp information in a second protocol field included in the second packet to generate the fifth packet, and sends the fifth packet to the second device. In this case, a second protocol field in the fifth packet carries the first timestamp information.

For example, the first protocol field is the same as the first protocol field in operation 2802. For details, also refer to the related descriptions in operation 701. The second protocol field may also be an existing protocol field, or may be a newly added field in an existing protocol stack framework. For example, an execution principle of sending the fifth packet by the access device to the second device based on the second packet is the same as the principle of sending the third packet by the access device to the second device based on the first packet in operation 702 in the embodiment shown in FIG. 7. For details, refer to the related principle in operation 702. The second protocol field may be the same as the second protocol field in operation 702. For details, reference may be made to each other. The details are not described herein again.

In an embodiment, after receiving the fifth packet from the access device, the second device extracts the first timestamp information carried in the second protocol field included in the fifth packet. For example, for a method, refer to Cases n1, n2, and n3 in operation 702. Details are not described herein again.

The fifth packet further carries t35.

Operation 2804: The second device sends a sixth packet to the fourth device, and determines fourth timestamp information, where the fourth timestamp information is a moment that is in the mobile network and at which the second device sends the sixth packet.

For example, the fourth timestamp information may be denoted as t37 in FIG. 29.

The sixth packet may be generated after the second device deletes the first timestamp information from the second protocol field in the fifth packet. In this case, the sixth packet carries t35.

In an embodiment, the fourth device records a moment that is in the Ethernet network and at which the fourth device receives the sixth packet, for example, t38 in FIG. 29.

Operation 2805: The second device receives a third packet from the fourth device, and determines fifth timestamp information, where the fifth timestamp information is a moment that is in the mobile network and at which the second device receives the third packet.

For example, the fifth timestamp information may be denoted as t40 in FIG. 29.

In an embodiment, the fourth device records a moment that is in the Ethernet network and at which the fourth device sends the third packet, for example, t39 in FIG. 29.

Operation 2806: The second device sends the third packet to the access device.

Operation 2807. The access device sends the third packet to the first device.

Operation 2808: The first device sends the third packet to the third device, and determines second timestamp information, where the second timestamp information is a moment that is in the mobile network and at which the first device sends the third packet.

For example, the moment corresponding to the second timestamp information may be denoted as t41 in FIG. 29.

In an embodiment, the third device records a moment that is in the Ethernet network and at which the third device receives the third packet, for example, t42 shown in FIG. 29.

Operation 2809: The first device receives a fourth packet from the third device, where the fourth packet carries third timestamp information, and the third timestamp information is a moment that is in the Ethernet network and at which the third device receives the third packet sent by the first device.

The moment corresponding to the third timestamp information is t42.

Operation 2810: The first device sends the second timestamp information and the third timestamp information to the access device.

Operation 2811. The access device sends the second timestamp information and the third timestamp information to the second device.

Operation 2812: The second device determines sixth timestamp information based on the first timestamp information, the second timestamp information, the third timestamp information, the fourth timestamp information, and the fifth timestamp information.

In an embodiment, a method in which the second device performs operation 2812 may be: The second device determines a round-trip transmission delay difference between the first device and the second device based on the first timestamp information (t36), the second timestamp information (t41), the fourth timestamp information (t37), and the fifth timestamp information (t40). The second device calculates a sum of the moment corresponding to the third timestamp information and the round-trip transmission delay difference, to obtain the sixth timestamp information.

For example, the round-trip transmission delay difference between the first device and the second device may be calculated through clock synchronization between the first device and the second device that is implemented in the mobile network. For example, the round-trip transmission delay difference may be obtained through calculation by using Formula 22 and Formula 23:

$$t37 - t36 = delay9 + offset12 \quad \text{Formula 22; and}$$

$$t41 - t40 = delay10 - offset12 \quad \text{Formula 23.}$$

In the foregoing formulas, offset 12 is a time offset between the first device and the second device in the mobile network, delay 9 is a transmission delay from the first device to the second device, and delay 10 is a transmission delay from the second device to the first device.

Due to clock synchronization in the mobile network, a value of offset 12 is 0. Therefore, the round-trip transmission delay difference may be obtained by using Formula 22 and Formula 23, that is, delay 9−delay 10=t37−t36−t41+t40.

Further, a moment corresponding to the sixth timestamp information is t42+t37−t36−t41+t40.

Operation 2813: The second device sends the sixth timestamp information to the fourth device, so that the fourth device performs time synchronization based on the sixth timestamp information.

For example, in the prior art, the second device sends the fourth timestamp information to the fourth device. In this application, the second device sends the sixth timestamp information to the fourth device by using an existing method for sending the fourth timestamp information. It may also be understood that the sixth timestamp information is sent to the fourth device in place of the fourth timestamp information. In this way, when receiving the sixth timestamp information, the fourth device uses the sixth timestamp information as the fourth timestamp information in the prior art for processing.

In an embodiment, the fourth device may determine a time offset between the third device and the fourth device based on t35, t38, t39, and the sixth timestamp information (t42+t37−t36−t41+t40), and perform time synchronization based on the time offset.

In an embodiment, the fourth device may determine, based on the sixth timestamp information, the moment that is in the Ethernet network, at which the third device receives the third packet, and that is considered by the fourth device, and use the sixth timestamp information as the fourth timestamp information.

For example, a time offset, namely, offset 13, between the third device and the fourth device may satisfy Formula 24:

$$offset13 = \frac{t38 - t35 - (t42 + t37 - t36 - t41 + t40) + t39}{2}. \quad \text{Formula 24}$$

According to the synchronization method provided in this embodiment of this application, impact of a transmission delay between the first device and the second device can be avoided, so that a time precision requirement of an industrial factory can be met in a scenario in which the mobile network is connected to the Ethernet network.

Based on the foregoing embodiments, this application further provides a first device. The first device may be applied to the communications system shown in FIG. 1 or FIG. 2, and is configured to implement the synchronization method provided in the embodiment shown in FIG. 21. For a structure of the first device, also refer to FIG. 11. The first device may include a receiving unit 1103, a processing unit 1102, and a sending unit 1101.

The receiving unit 1103 is configured to receive a first packet from a third device. The processing unit 1102 is configured to determine first timestamp information, where the first timestamp information is a moment that is in a mobile network and at which the first device receives the first packet. The sending unit 1101 is configured to send the first packet to a second device by using an access device. The receiving unit 1103 is further configured to receive a second packet from the third device. The sending unit 1101 is further configured to send a third packet to the access device based on the second packet, where the third packet carries the first timestamp information. The receiving unit 1103 is further configured to receive a fourth packet from the access device. The sending unit 1101 is further configured to send the fourth packet to the third device. The processing unit 1102 is further configured to determine second timestamp information, where the second timestamp information is a moment that is in the mobile network and at which the first device sends the fourth packet to the third device. The receiving unit 1103 is further configured to receive a fifth packet from the third device. The processing unit 1102 is further configured to determine third timestamp information, where the third timestamp information is a moment that is in the mobile network and at which the first device receives the fifth packet. The sending unit 1101 is further configured to send a sixth packet to the access device based on the fifth packet, where the sixth packet carries the second timestamp information. The receiving unit 1103 is further configured to receive a seventh packet from the third device, where the seventh packet carries fourth timestamp information, and the fourth timestamp information is a moment that is in an Ethernet network and at which the third device sends the fifth packet to the first device. The sending unit 1101 is further configured to send an eighth packet to the access device, where the eighth packet carries the third timestamp information and the fourth timestamp information. The first device is a user plane network element and the second device is a terminal device, or the first device is a terminal device and the second device is a user plane network element.

In addition, another operation or function of the first device in the method in the embodiment shown in FIG. 21 may be further implemented based on the receiving unit 1103, the processing unit 1102, and the sending unit 1101 in the first device. For details, refer to the foregoing embodiments. The details are not described herein again.

Based on the foregoing embodiments, this application further provides an access device. The access device may be applied to the communications system shown in FIG. 1 or FIG. 2, and is configured to implement the synchronization method provided in the embodiment shown in FIG. 21. For a structure of the access device, also refer to FIG. 12. The access device may include a receiving unit 1201 and a sending unit 1202.

The receiving unit 1201 is configured to receive a first packet from the first device. The sending unit 1202 is configured to forward the first packet to a second device. The receiving unit 1201 is further configured to receive a third packet from the first device, where the third packet carries first timestamp information, and the first timestamp information is a moment that is in a mobile network and at which the first device receives the first packet from a third device. The sending unit 1202 is further configured to send a ninth packet to the second device based on the third packet, where the ninth packet carries the first timestamp information. The receiving unit 1201 is further configured to receive a fourth packet from the second device. The sending unit 1202 is further configured to send the fourth packet to the first device. The receiving unit 1201 is further configured to receive a sixth packet from the first device, where the sixth packet is sent by the first device to the access device based on a fifth packet after the first device receives the fifth packet from the third device, the sixth packet carries second timestamp information, and the second timestamp information is a moment that is in the mobile network and at which the first device sends the fourth packet to the third device after receiving the fourth packet from the access device. The sending unit 1202 is further configured to send a tenth packet to the second device based on the sixth packet, where the tenth packet carries the second timestamp information. The receiving unit 1201 is further configured to receive an eighth packet from the first device, where the eighth packet carries third timestamp information and fourth timestamp information, the third timestamp information is a moment that is in the mobile network and at which the first device receives the fifth packet from the third device, and the fourth timestamp information is a moment that is in an Ethernet network and at which the third device sends the fifth packet to the first device. The sending unit 1202 is further configured to send an eleventh packet to the second device based on the eighth packet, where the eleventh packet carries the third timestamp information and the fourth timestamp information. The first device is a user plane network element and the second device is a terminal device, or the first device is a terminal device and the second device is a user plane network element.

For example, the access device may further include a processing unit, configured to detect timestamp information in a protocol field in a packet. For an operation, refer to an operation of the access device in the embodiment shown in FIG. 21. Details are not described herein again.

In addition, another operation or function of the access device in the method in the embodiment shown in FIG. 21 may be further implemented based on the receiving unit 1201 and the sending unit 1202, or the processing unit in the access device. For details, refer to the foregoing embodiments. The details are not described herein again.

Based on the foregoing embodiments, this application further provides a second device. The second device may be applied to the communications system shown in FIG. 1 or FIG. 2, and is configured to implement the synchronization method provided in the embodiment shown in FIG. 21. For a structure of the second device, also refer to FIG. 13. The second device may include a receiving unit 1301, a processing unit 1302, and a sending unit 1303.

The receiving unit 1301 is configured to receive a first packet from an access device. The sending unit 1303 is configured to send the first packet to a fourth device. The processing unit 1302 is configured to determine fifth timestamp information, where the fifth timestamp information is a moment that is in a mobile network and at which the second device sends the first packet to the fourth device. The receiving unit 1301 is further configured to receive a ninth packet from the access device, where the ninth packet carries first timestamp information, and the first timestamp information is a moment that is in the mobile network and at which the first device receives the first packet from a third device. The sending unit 1303 is further configured to send a twelfth packet to the fourth device based on the ninth packet. The receiving unit 1301 is further configured to receive a fourth packet from the fourth device. The processing unit 1302 is further configured to determine sixth timestamp information, where the sixth timestamp information is a moment that is in the mobile network and at which the second device receives the fourth packet. The sending unit 1303 is further configured to send the fourth packet to the access device. The receiving unit 1301 is further configured to receive a tenth packet from the access device, where the tenth packet carries second timestamp information, and the second timestamp information is a moment that is in the mobile network and at which the first device sends the fourth packet to the third device after the access device sends the fourth packet to the first device. The sending unit 1303 is further configured to send a thirteenth packet to the fourth device. The processing unit 1302 is further configured to determine seventh timestamp information, where the seventh timestamp information is a moment that is in the mobile network and at which the second device sends the thirteenth packet to the fourth device. The receiving unit 1301 is further configured to receive an eleventh packet from the access device, where the eleventh packet carries third timestamp information and fourth timestamp information, the third timestamp information is a moment that is in the mobile network and at which the first device receives the fifth packet from the third device, and the fourth timestamp information is a moment that is in an Ethernet network and at which the third device sends the fifth packet to the first device. The processing unit 1302 is further configured to determine eighth timestamp information based on the first timestamp information, the second timestamp information, the third timestamp information, the fourth timestamp information, the fifth timestamp information, the sixth timestamp information, and the seventh timestamp information. The sending unit 1303 is further configured to send the eighth timestamp information to the fourth device, so that the fourth device performs time synchronization based on the eighth timestamp information. The first device is a user plane network element and the second device is a terminal device, or the first device is a terminal device and the second device is a user plane network element.

In addition, another operation or function of the second device in the method in the embodiment shown in FIG. 21 may be further implemented based on the receiving unit 1301, the processing unit 1302, and the sending unit 1303 in the second device. For details, refer to the foregoing embodiments. The details are not described herein again.

Based on the foregoing embodiments, this application further provides a first device. The first device may be applied to the communications system shown in FIG. 1 or FIG. 23, and is configured to implement the synchronization method provided in the embodiment shown in FIG. 24. For a structure of the first device, also refer to FIG. 11. The first device may include a sending unit 1101, a processing unit 1102, and a receiving unit 1103.

The sending unit 1101 is configured to send a first packet to an access device. The processing unit 1102 is configured to determine first timestamp information and second timestamp information, where the first timestamp information is a moment that is in an Ethernet network and at which the first device sends the first packet, and the second timestamp information is a moment that is in a mobile network and at which the first device sends the first packet. The sending unit 1101 is further configured to send a second packet to the access device, where the second packet carries the first timestamp information and the second timestamp information. The receiving unit 1103 is configured to receive a third packet from the access device. The processing unit 1102 is further configured to determine third timestamp information, where the third timestamp information is a moment that is in the Ethernet network and at which the first device receives the third packet. The sending unit 1101 is further configured to send a fourth packet to the access device, where the fourth packet carries the third timestamp information. The processing unit 1102 is further configured to determine fourth timestamp information, where the fourth timestamp information is a moment that is in the Ethernet network and at which the first device sends the fourth packet. The sending unit 1101 is further configured to send a fifth packet to the access device, where the fifth packet carries the fourth timestamp information. The first device is a user plane network element and the second device is a terminal device, or the first device is a terminal device and the second device is a user plane network element.

In addition, another operation or function of the first device in the method in the embodiment shown in FIG. 24 may be further implemented based on the receiving unit 1103, the processing unit 1102, and the sending unit 1101 in the first device. For details, refer to the foregoing embodiments. The details are not described herein again.

Based on the foregoing embodiments, this application further provides an access device. The access device may be applied to the communications system shown in FIG. 1 or FIG. 23, and is configured to implement the synchronization method provided in the embodiment shown in FIG. 24. For a structure of the access device, also refer to FIG. 12. The access device may include a receiving unit 1201 and a sending unit 1202.

The receiving unit 1201 is configured to receive a first packet from a first device. The sending unit 1202 is configured to forward the first packet to a second device. The receiving unit 1201 is further configured to receive a second packet from the first device, where the second packet carries first timestamp information and second timestamp information, the first timestamp information is a moment that is in an Ethernet network and at which the first device sends the first packet to the access device, and the second timestamp information is a moment that is in a mobile network and at which the first device sends the first packet to the access device. The sending unit 1202 is further configured to send a sixth packet to the second device based on the second packet, where the sixth packet carries the first timestamp information and the second timestamp information. The receiving unit 1201 is further configured to receive a third packet from the second device. The sending unit 1202 is further configured to forward the third packet to the first device. The receiving unit 1201 is further configured to receive a fourth packet from the first device, where the fourth packet carries third timestamp information, and the third timestamp information is a moment that is in the Ethernet network and at which the first device receives the third packet sent by the access device. The sending unit 1202 is further configured to forward the fourth packet to the second device. The receiving unit 1201 is further configured to receive a fifth packet from the first device, where the fifth packet carries fourth timestamp information, and the fourth timestamp information is a moment that is in the Ethernet network and at which the first device sends the fourth packet to the access device. The sending unit 1202 is further configured to forward the fifth packet to the second device. The first device is a user plane network element and the second device is a terminal device, or the first device is a terminal device and the second device is a user plane network element.

For example, the access device may further include a processing unit, configured to detect timestamp information in a protocol field in a packet. For an operation, refer to an operation of the access device in the embodiment shown in FIG. 24. Details are not described herein again.

In addition, another operation or function of the access device in the method in the embodiment shown in FIG. 24 may be further implemented based on the receiving unit 1201 and the sending unit 1202, or the processing unit in the access device. For details, refer to the foregoing embodiments. The details are not described herein again.

Based on the foregoing embodiments, this application further provides a second device. The second device may be applied to the communications system shown in FIG. 1 or FIG. 23, and is configured to implement the synchronization method provided in the embodiment shown in FIG. 24. For a structure of the second device, also refer to FIG. 13. The second device may include a receiving unit 1301, a processing unit 1302, and a sending unit 1303.

The receiving unit 1301 is configured to receive a first packet from an access device. The processing unit 1302 is configured to determine fifth timestamp information and sixth timestamp information, where the fifth timestamp information is a moment that is in an Ethernet network and at which the second device receives the first packet, and the sixth timestamp information is a moment that is in a mobile network and at which the second device receives the first packet. The receiving unit 1301 is further configured to receive a sixth packet from the access device, where the sixth packet carries first timestamp information and the second timestamp information, the first timestamp information is a moment that is in the Ethernet network and at which the first device sends the first packet to the access device, and the second timestamp information is a moment that is in the mobile network and at which the first device sends the first packet to the access device. The sending unit 1303 is configured to send a third packet to the access device. The processing unit 1302 is further configured to determine seventh timestamp information, where the seventh timestamp information is a moment that is in the Ethernet network and at which the second device sends the third packet. The receiving unit 1301 is further configured to receive a fourth packet from the access device, where the fourth packet carries third timestamp information, and the third timestamp information is a moment that is in the Ethernet network and at which the first device receives the third packet after the access device receives the third packet from the second device and forwards the third packet to the first device. The processing unit 1302 is further configured to determine eighth timestamp information, where the eighth timestamp information is a moment that is in the Ethernet network and at which the second device receives the fourth packet. The receiving unit 1301 is further configured to receive a fifth packet from the access device, where the fifth packet carries fourth timestamp information, and the fourth timestamp information is a moment that is in the Ethernet network and at which the first device sends the fourth packet to the access device. The processing unit 1302 is further configured to: determine a time offset between the first device and the second device based on the first timestamp information, the second timestamp information, the third timestamp information, the fourth timestamp information, the fifth timestamp information, the sixth timestamp information, the seventh timestamp information, and the eighth timestamp information, and perform time synchronization based on the time offset. The first device is a user plane network element and the second device is a terminal device, or the first device is a terminal device and the second device is a user plane network element.

In addition, another operation or function of the second device in the method in the embodiment shown in FIG. 24 may be further implemented based on the receiving unit 1301, the processing unit 1302, and the sending unit 1303 in the second device. For details, refer to the foregoing embodiments. The details are not described herein again.

Based on the foregoing embodiments, this application further provides a first device. The first device may be applied to the communications system shown in FIG. 1 or FIG. 23, and is configured to implement the synchronization method provided in the embodiment shown in FIG. 26. For a structure of the first device, also refer to FIG. 11. The first device may include a sending unit 1101, a processing unit 1102, and a receiving unit 1103.

The receiving unit 1103 is configured to receive a first packet from a third device. The sending unit 1101 is configured to send the first packet to a second device by using an access device. The processing unit 1102 is configured to determine first timestamp information, where the first timestamp information is a moment that is in a mobile network and at which the first device receives the first packet. The receiving unit 1103 is further configured to receive a second packet from the access device, where the second packet carries second timestamp information and third timestamp information, the second timestamp information is a moment that is in the mobile network and at which the second device sends the first packet to a fourth device after receiving the first packet, and the third timestamp information is a moment that is in the mobile network and at which the second device receives a fifth packet from the fourth device. The sending unit 1101 is further configured to send a third packet to the third device. The processing unit 1102 is further configured to determine fourth timestamp information, where the fourth timestamp information is a moment that is in the mobile network and at which the first device sends the third packet. The receiving unit 1103 is further configured to receive a sixth packet from the third device, where the sixth packet carries fifth timestamp information, and the fifth timestamp information is a moment that is in an Ethernet network and at which the third device receives the third packet sent by the first device. The processing unit 1102 is further configured to determine sixth timestamp information based on the first timestamp information, the second timestamp information, the third timestamp information, the fourth timestamp information, and the fifth timestamp information. The sending unit 1101 is further configured to forward the sixth timestamp information to the second device by using the access device. The first device is a user plane network element and the second device is a terminal device, or the first device is a terminal device and the second device is a user plane network element.

In addition, another operation or function of the first device in the method in the embodiment shown in FIG. 26 may be further implemented based on the receiving unit 1103, the processing unit 1102, and the sending unit 1101 in the first device. For details, refer to the foregoing embodiments. The details are not described herein again.

Based on the foregoing embodiments, this application further provides an access device. The access device may be applied to the communications system shown in FIG. 1 or FIG. 23, and is configured to implement the synchronization method provided in the embodiment shown in FIG. 26. For a structure of the access device, also refer to FIG. 12. The access device may include a receiving unit 1201 and a sending unit 1202.

The receiving unit 1201 is configured to receive a first packet from the first device. The sending unit 1202 is configured to send the first packet to a second device. The receiving unit 1201 is further configured to receive a fourth packet from the second device, where the fourth packet carries second timestamp information and third timestamp information, the second timestamp information is a moment that is in the mobile network and at which the second device sends the first packet to a fourth device after receiving the first packet, the fourth packet is sent by the second device to the access device based on a fifth packet after the second device receives the fifth packet from the fourth device, and the third timestamp information is a moment that is in the mobile network and at which the second device receives the fifth packet. The sending unit 1202 is further configured to send a second packet to the first device, where the second packet carries the second timestamp information and the third timestamp information. The receiving unit 1201 is further configured to receive sixth timestamp information from the first device. The sending unit 1202 is further configured to send the sixth timestamp information to the second device. The first device is a user plane network element and the second device is a terminal device, or the first device is a terminal device and the second device is a user plane network element.

For example, the access device may further include a processing unit, configured to detect timestamp information in a protocol field in a packet. For an operation, refer to an operation of the access device in the embodiment shown in FIG. 26. Details are not described herein again.

In addition, another operation or function of the access device in the method in the embodiment shown in FIG. 26 may be further implemented based on the receiving unit 1201 and the sending unit 1202, or the processing unit in the access device. For details, refer to the foregoing embodiments. The details are not described herein again.

Based on the foregoing embodiments, this application further provides a second device. The second device may be applied to the communications system shown in FIG. 1 or FIG. 23, and is configured to implement the synchronization method provided in the embodiment shown in FIG. 26. For a structure of the second device, also refer to FIG. 13. The second device may include a receiving unit 1301, a processing unit 1302, and a sending unit 1303.

The receiving unit 1301 is configured to receive a first packet from an access device. The sending unit 1303 is configured to send the first packet to a fourth device. The processing unit 1302 is configured to determine second timestamp information, where the second timestamp information is a moment that is in a mobile network and at which the second device sends the first packet. The receiving unit 1301 is further configured to receive a fifth packet from the fourth device. The processing unit 1302 is further configured to determine third timestamp information, where the third timestamp information is a moment that is in the mobile network and at which the second device receives the fifth packet. The sending unit 1303 is further configured to send a fourth packet to the access device, where the fourth packet carries the second timestamp information and the third timestamp information. The receiving unit 1301 is further configured to receive sixth timestamp information from the access device. The sending unit 1303 is further configured to send the sixth timestamp information to the fourth device, so that the fourth device performs time synchronization based on the sixth timestamp information. The first device is a user plane network element and the second device is a terminal device, or the first device is a terminal device and the second device is a user plane network element.

In addition, another operation or function of the second device in the method in the embodiment shown in FIG. 26 may be further implemented based on the receiving unit 1301, the processing unit 1302, and the sending unit 1303 in the second device. For details, refer to the foregoing embodiments. The details are not described herein again.

Based on the foregoing embodiments, this application further provides a first device. The first device may be applied to the communications system shown in FIG. 1 or FIG. 23, and is configured to implement the synchronization method provided in the embodiment shown in FIG. 28. For a structure of the first device, also refer to FIG. 11. The first device may include a sending unit 1101, a processing unit 1102, and a receiving unit 1103.

The receiving unit 1103 is configured to receive a first packet from a third device. The processing unit 1102 is configured to determine first timestamp information, where the first timestamp information is a moment that is in a mobile network and at which the first device receives the first packet. The sending unit 1101 is configured to send a second packet to an access device based on the first packet, where the second packet carries the first timestamp information. The receiving unit 1103 is further configured to receive a third packet from the access device. The sending unit 1101 is further configured to send the third packet to the third device. The processing unit 1102 is configured to determine second timestamp information, where the second timestamp information is a moment that is in the mobile network and at which the first device sends the third packet. The receiving unit 1103 is further configured to receive a fourth packet from the third device, where the fourth packet carries third timestamp information, and the third timestamp information is a moment that is in an Ethernet network and at which the third device receives the third packet sent by the first device. The sending unit 1101 is further configured to send the second timestamp information and the third timestamp information to the access device. The first device is a user plane network element and the second device is a terminal device, or the first device is a terminal device and the second device is a user plane network element.

In addition, another operation or function of the first device in the method in the embodiment shown in FIG. 28 may be further implemented based on the receiving unit 1103, the processing unit 1102, and the sending unit 1101 in the first device. For details, refer to the foregoing embodiments. The details are not described herein again.

Based on the foregoing embodiments, this application further provides an access device. The access device may be applied to the communications system shown in FIG. 1 or FIG. 23, and is configured to implement the synchronization method provided in the embodiment shown in FIG. 28. For a structure of the access device, also refer to FIG. 12. The access device may include a receiving unit 1201 and a sending unit 1202.

The receiving unit 1201 is configured to receive a second packet from the first device, where the second packet carries first timestamp information, the second packet is sent by the first device to the access device after the first device receives a first packet from a third device, and the first timestamp information is a moment that is in a mobile network and at which the first device receives the first packet. The sending unit 1202 is configured to send a fifth packet to a second device based on the second packet, where the fifth packet carries the first timestamp information.

The receiving unit 1201 is further configured to receive a third packet from the second device. The sending unit 1202 is further configured to send the third packet to the first device. The receiving unit 1201 is further configured to receive second timestamp information and third timestamp information from the first device, where the second timestamp information is a moment that is in the mobile network and at which the first device sends the third packet to the third device after receiving the third packet, and the third timestamp information is a moment that is in an Ethernet network and at which the third device receives the third packet sent by the first device. The sending unit 1202 is further configured to send the second timestamp information and the third timestamp information to the second device. The first device is a user plane network element and the second device is a terminal device, or the first device is a terminal device and the second device is a user plane network element.

For example, the access device may further include a processing unit, configured to detect timestamp information in a protocol field in a packet. For an operation, refer to an operation of the access device in the embodiment shown in FIG. 28. Details are not described herein again.

In addition, another operation or function of the access device in the method in the embodiment shown in FIG. 28 may be further implemented based on the receiving unit 1201 and the sending unit 1202, or the processing unit in the access device. For details, refer to the foregoing embodiments. The details are not described herein again.

Based on the foregoing embodiments, this application further provides a second device. The second device may be applied to the communications system shown in FIG. 1 or FIG. 23, and is configured to implement the synchronization method provided in the embodiment shown in FIG. 28. For a structure of the second device, also refer to FIG. 13. The second device may include a receiving unit 1301, a processing unit 1302, and a sending unit 1303.

The receiving unit 1301 is configured to receive a fifth packet from an access device, where the fifth packet carries first timestamp information, and the first timestamp information is a moment that is in a mobile network and at which a first device receives a first packet from a third device. The sending unit 1303 is configured to send a sixth packet to a fourth device. The processing unit 1302 is configured to determine fourth timestamp information, where the fourth timestamp information is a moment that is in the mobile network and at which the second device sends the sixth packet. The receiving unit 1301 is further configured to receive a third packet from the fourth device. The processing unit 1302 is further configured to determine fifth timestamp information, where the fifth timestamp information is a moment that is in the mobile network and at which the second device receives the third packet. The sending unit 1303 is further configured to send the third packet to the access device. The receiving unit 1301 is further configured to receive second timestamp information and third timestamp information from the access device, where the second timestamp information is a moment that is in the mobile network and at which the first device sends the third packet to the third device after the access device receives the third packet and sends the third packet to the first device, and the third timestamp information is a moment that is in an Ethernet network and at which the third device receives the third packet sent by the first device. The processing unit 1302 is further configured to determine sixth timestamp information based on the first timestamp information, the second timestamp information, the third timestamp information, the fourth timestamp information, and the fifth timestamp information. The sending unit 1303 is further configured to send the sixth timestamp information to the fourth device, so that the fourth device performs time synchronization based on the sixth timestamp information. The first device is a user plane network element and the second device is a terminal device, or the first device is a terminal device and the second device is a user plane network element.

In addition, another operation or function of the second device in the method in the embodiment shown in FIG. 28 may be further implemented based on the receiving unit 1301, the processing unit 1302, and the sending unit 1303 in the second device. For details, refer to the foregoing embodiments. The details are not described herein again.

Based on the foregoing embodiments, an embodiment of this application further provides a first device. The first device is applied to the communications system shown in FIG. 1 or FIG. 2, and is configured to implement the synchronization method shown in FIG. 21. Similarly, referring to FIG. 18, the first device includes a transceiver 1801, a processor 1802, and a memory 1803.

The processor 1802 may be a CPU, an NP, a combination of a CPU and an NP, or the like. The processor 1802 may further include a hardware chip. The hardware chip may be an ASIC, a PLD, or a combination thereof. The PLD may be a CPLD, an FPGA, a GAL, or any combination thereof. The processor 1802 may implement the foregoing functions by hardware or certainly by hardware executing corresponding software.

The transceiver 1801, the processor 1802, and the memory 1803 are connected to each other. For example, the transceiver 1801, the processor 1802, and the memory 1803 are connected to each other by using a bus 1804. The bus 1804 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 18, but this does not mean that there is only one bus or only one type of bus.

The transceiver 1801 is configured to: communicate and interact with another device.

The processor 1802 is configured to implement the synchronization method shown in FIG. 21. For details, refer to the related descriptions in the embodiment shown in FIG. 21. The details are not described herein again.

The memory 1803 is configured to store a program and the like. For example, the program may include program code, and the program code includes a computer operation instruction. The memory 1803 may include a RAM, and may further include a non-volatile memory, for example, at least one magnetic disk storage. The processor 1802 performs the application program stored in the memory 1803, to implement the foregoing function, so as to implement the synchronization method shown in FIG. 21.

Based on the foregoing embodiments, an embodiment of this application further provides an access device. The access device is applied to the communications system shown in FIG. 1 or FIG. 2, and is configured to implement the synchronization method shown in FIG. 21. Referring to FIG. 19, the access device includes a transceiver 1901, a processor 1902, and a memory 1903.

The processor 1902 may be a CPU, an NP, a combination of a CPU and an NP, or the like. The processor 1902 may further include a hardware chip. The hardware chip may be an ASIC, a PLD, or a combination thereof. The PLD may be a CPLD, an FPGA, a GAL, or any combination thereof. The processor 1902 may implement the foregoing functions by hardware or certainly by hardware executing corresponding software.

The transceiver 1901, the processor 1902, and the memory 1903 are connected to each other. For example, the transceiver 1901, the processor 1902, and the memory 1903 are connected to each other by using a bus 1904. The bus 1904 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 19, but this does not mean that there is only one bus or only one type of bus.

The transceiver 1901 is configured to: communicate and interact with another device.

The processor 1902 is configured to implement the synchronization method shown in FIG. 21. For details, refer to the related descriptions in the embodiment shown in FIG. 21. The details are not described herein again.

The memory 1903 is configured to store a program and the like. For example, the program may include program code, and the program code includes a computer operation instruction. The memory 1903 may include a RAM, and may further include a non-volatile memory, for example, at least one magnetic disk storage. The processor 1902 performs the application program stored in the memory 1903, to implement the foregoing function, so as to implement the synchronization method shown in FIG. 21.

Based on the foregoing embodiments, an embodiment of this application further provides a second device. The second device is applied to the communications system shown in FIG. 1 or FIG. 2, and is configured to implement the synchronization method shown in FIG. 21. Referring to FIG. 20, the second device includes a transceiver 2001, a processor 2002, and a memory 2003.

The processor 2002 may be a CPU, an NP, a combination of a CPU and an NP, or the like. The processor 2002 may further include a hardware chip. The hardware chip may be an ASIC, a PLD, or a combination thereof. The PLD may be a CPLD, an FPGA, a GAL, or any combination thereof. The processor 2002 may implement the foregoing functions by hardware or certainly by hardware executing corresponding software.

The transceiver 2001, the processor 2002, and the memory 2003 are connected to each other. For example, the transceiver 2001, the processor 2002, and the memory 2003 are connected to each other by using a bus 2004. The bus 2004 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 20, but this does not mean that there is only one bus or only one type of bus.

The transceiver 2001 is configured to: communicate and interact with another device.

The processor 2002 is configured to implement the synchronization method shown in FIG. 21. For details, refer to the related descriptions in the embodiment shown in FIG. 21. The details are not described herein again.

The memory 2003 is configured to store a program and the like. For example, the program may include program code, and the program code includes a computer operation instruction. The memory 2003 may include a RAM, and may further include a non-volatile memory, for example, at least one magnetic disk storage. The processor 2002 performs the application program stored in the memory 2003, to implement the foregoing function, so as to implement the synchronization method shown in FIG. 21.

Based on the foregoing embodiments, an embodiment of this application further provides a first device. The first device is applied to the communications system shown in FIG. 1 or FIG. 23, and may be configured to implement the synchronization method shown in FIG. 24, FIG. 26, or FIG. 28. Similarly, referring to FIG. 18, the first device includes a transceiver 1801, a processor 1802, and a memory 1803.

The processor 1802 may be a CPU, an NP, a combination of a CPU and an NP, or the like. The processor 1802 may further include a hardware chip. The hardware chip may be an ASIC, a PLD, or a combination thereof. The PLD may be a CPLD, an FPGA, a GAL, or any combination thereof. The processor 1802 may implement the foregoing functions by hardware or certainly by hardware executing corresponding software.

The transceiver 1801, the processor 1802, and the memory 1803 are connected to each other. For example, the transceiver 1801, the processor 1802, and the memory 1803 are connected to each other by using a bus 1804. The bus 1804 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 18, but this does not mean that there is only one bus or only one type of bus.

The transceiver 1801 is configured to: communicate and interact with another device.

The processor 1802 is configured to implement the synchronization method shown in FIG. 24, FIG. 26, or FIG. 28. For details, refer to the related descriptions in the embodiment shown in FIG. 24, FIG. 26, or FIG. 28. The details are not described herein again.

The memory 1803 is configured to store a program and the like. For example, the program may include program code, and the program code includes a computer operation instruction. The memory 1803 may include a RAM, and may further include a non-volatile memory, for example, at least one magnetic disk storage. The processor 1802 performs the application program stored in the memory 1803, to implement the foregoing function, so as to implement the synchronization method shown in FIG. 24, FIG. 26, or FIG. 28.

Based on the foregoing embodiments, an embodiment of this application further provides an access device. The access device is applied to the communications system shown in FIG. 1 or FIG. 2, and is configured to implement the synchronization method shown in FIG. 24, FIG. 26, or FIG. 28. Referring to FIG. 19, the access device includes a transceiver 1901, a processor 1902, and a memory 1903.

The processor 1902 may be a CPU, an NP, a combination of a CPU and an NP, or the like. The processor 1902 may further include a hardware chip. The hardware chip may be an ASIC, a PLD, or a combination thereof. The PLD may be a CPLD, an FPGA, a GAL, or any combination thereof. The processor 1902 may implement the foregoing functions by hardware or certainly by hardware executing corresponding software.

The transceiver 1901, the processor 1902, and the memory 1903 are connected to each other. For example, the transceiver 1901, the processor 1902, and the memory 1903 are connected to each other by using a bus 1904. The bus 1904 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 19, but this does not mean that there is only one bus or only one type of bus.

The transceiver 1901 is configured to: communicate and interact with another device.

The processor 1902 is configured to implement the synchronization method shown in FIG. 24, FIG. 26, or FIG. 28. For details, refer to the related descriptions in the embodiment shown in FIG. 24, FIG. 26, or FIG. 28. The details are not described herein again.

The memory 1903 is configured to store a program and the like. For example, the program may include program code, and the program code includes a computer operation instruction. The memory 1903 may include a RAM, and may further include a non-volatile memory, for example, at least one magnetic disk storage. The processor 1902 performs the application program stored in the memory 1903, to implement the foregoing function, so as to implement the synchronization method shown in FIG. 24, FIG. 26, or FIG. 28.

Based on the foregoing embodiments, an embodiment of this application further provides a second device. The second device is applied to the communications system shown in FIG. 1 or FIG. 2, and is configured to implement the synchronization method shown in FIG. 24, FIG. 26, or FIG. 28. Referring to FIG. 20, the second device includes a transceiver 2001, a processor 2002, and a memory 2003.

The processor 2002 may be a CPU, an NP, a combination of a CPU and an NP, or the like. The processor 2002 may further include a hardware chip. The hardware chip may be an ASIC, a PLD, or a combination thereof. The PLD may be a CPLD, an FPGA, a GAL, or any combination thereof. The processor 2002 may implement the foregoing functions by hardware or certainly by hardware executing corresponding software.

The transceiver 2001, the processor 2002, and the memory 2003 are connected to each other. For example, the transceiver 2001, the processor 2002, and the memory 2003 are connected to each other by using a bus 2004. The bus 2004 may be a peripheral component interconnect (PCI) bus, an extended industry standard architecture (EISA) bus, or the like. The bus may be classified into an address bus, a data bus, a control bus, and the like. For ease of representation, only one thick line is used to represent the bus in FIG. 20, but this does not mean that there is only one bus or only one type of bus.

The transceiver 2001 is configured to: communicate and interact with another device.

The processor 2002 is configured to implement the synchronization method shown in FIG. 24, FIG. 26, or FIG. 28.

For details, refer to the related descriptions in the embodiment shown in FIG. 24, FIG. 26, or FIG. 28. The details are not described herein again.

The memory 2003 is configured to store a program and the like. For example, the program may include program code, and the program code includes a computer operation instruction. The memory 2003 may include a RAM, and may further include a non-volatile memory, for example, at least one magnetic disk storage. The processor 2002 performs the application program stored in the memory 2003, to implement the foregoing function, so as to implement the synchronization method shown in FIG. 24, FIG. 26, or FIG. 28.

In conclusion, according to the synchronization method and the apparatus that are provided in the embodiments of this application, in a clock synchronization process, impact of a transmission delay between the first device and the second device can be avoided, so that a clock precision requirement of an industrial factory can be met in a scenario in which the mobile network is connected to the Ethernet network.

One of ordinary skilled in the art should understand that the embodiments of this application may be provided as a method, a system, or a computer program product. Therefore, this application may be in a form of a full hardware embodiment, a full software embodiment, or a combination of software and hardware embodiments. In addition, this application may use a form of a computer program product that is implemented on one or more computer usable storage media (including but not limited to a magnetic disk storage, a CD-ROM, an optical memory, and the like) that include computer usable program code.

This application is described with reference to the flowcharts and/or block diagrams of the method, the device (system), and the computer program product according to the embodiments of this application. It should be understood that computer program instructions may be used to implement each procedure and/or each block in the flowcharts and/or the block diagrams and a combination of a procedure and/or a block in the flowcharts and/or the block diagrams. These computer program instructions may be provided for a general-purpose computer, a special-purpose computer, an embedded processor, or a processor of another programmable data processing device to generate a machine, so that the instructions executed by a computer or a processor of another programmable data processing device generate an apparatus for implementing a function in one or more procedures in the flowcharts and/or in one or more blocks in the block diagrams.

These computer program instructions may be stored in a computer readable memory that can instruct the computer or another programmable data processing device to work in a manner, so that the instructions stored in the computer readable memory generate an artifact that includes an instruction apparatus. The instruction apparatus implements a function in one or more procedures in the flowcharts and/or in one or more blocks in the block diagrams.

These computer program instructions may alternatively be loaded onto the computer or the another programmable data processing device, so that a series of operations and operations are performed on the computer or the another programmable device, thereby generating computer-implemented processing. Therefore, the instructions executed on the computer or the another programmable device provide operations for implementing a function in one or more procedures in the flowcharts and/or in one or more blocks in the block diagrams.

Definitely, one of ordinary skilled in the art can make various modifications and variations to the embodiments of this application without departing from the scope of the embodiments of this application. This application is intended to cover these modifications and variations provided that they fall within the scope of protection defined by the following claims and their equivalent technologies.

What is claimed is:

1. A synchronization method, comprising:

sending, by a first device, a first packet to an access device, wherein the first packet carries first timestamp information, wherein the first timestamp information is a moment in an Ethernet network at which the first device sends the first packet;

determining second timestamp information, wherein the second timestamp information is a moment in a mobile network at which the first device sends the first packet;

receiving, by the first device, a second packet from the access device, wherein the second packet carries third timestamp information and fourth timestamp information, wherein the third timestamp information is a moment in the mobile network at which a second device receives a third packet from the access device in response to the first packet, wherein the fourth timestamp information is a moment in the mobile network at which the second device sends a fourth packet to the access device, and wherein the second packet is sent by the access device to the first device in response to the fourth packet;

determining, by the first device, fifth timestamp information and sixth timestamp information, wherein the fifth timestamp information is a moment in the Ethernet network at which the first device receives the second packet, and wherein the sixth timestamp information is a moment in the mobile network at which the first device receives the second packet;

determining, by the first device, seventh timestamp information based on the second timestamp information, the third timestamp information, the fourth timestamp information, the fifth timestamp information, and the sixth timestamp information; and forwarding, by the first device, the seventh timestamp information to the second device via the access device, wherein a clock of the second device is synchronized with a clock of the first device based on the seventh timestamp information, wherein the first device is a user plane network element and the second device is a terminal device, or the first device is a terminal device and the second device is a user plane network element.

2. The method according to claim 1, wherein determining the seventh timestamp information comprises:

determining, by the first device, a round-trip transmission delay difference between the first device and the second device based on the second timestamp information, the third timestamp information, the fourth timestamp information, and the sixth timestamp information; and calculating, by the first device, a sum of the moment corresponding to the fifth timestamp information and the round-trip transmission delay difference, to obtain the seventh timestamp information.

3. The method according to claim 1, wherein after receiving the second packet from the access device, the method further comprises:
  extracting, by the first device, the third timestamp information and the fourth timestamp information that are carried in a first protocol field comprised in the second packet.

4. The method according to claim 3, wherein the first protocol field is a general packet radio service (GPRS) tunneling protocol (GTP) field when the first device is the user plane network element.

5. The method according to claim 3, wherein the first protocol field is a service data protocol (SDAP) field or a packet data convergence protocol (PDCP) field when the first device is the terminal device.

6. A synchronization method, comprising:
  receiving, by a second device, a third packet from an access device, wherein the third packet carries first timestamp information indicating a moment in an Ethernet network at which a first device sends a first packet, wherein the third packet is sent by the access device in response to the first packet, and wherein the first device is a user plane network element and the second device is a terminal device, or the first device is a terminal device and the second device is a user plane network element;
  determining, by the second device, third timestamp information and eighth timestamp information, wherein the third timestamp information is a moment in a mobile network at which the second device receives the third packet, and wherein the eighth timestamp information is a moment that is in the Ethernet network at which the second device receives the third packet;
  sending, by the second device, a fourth packet to the access device, wherein the fourth packet carries the third timestamp information and fourth timestamp information, and wherein the fourth timestamp information is a moment in the mobile network at which the second device sends the fourth packet to the access device;
  determining, by the second device, ninth timestamp information, wherein the ninth timestamp information is a moment in the Ethernet network at which the second device sends the fourth packet to the access device;
  receiving, by the second device, seventh timestamp information from the access device, wherein a clock of the second device is synchronized with a clock of the first device based on the seventh timestamp information; and
  determining, by the second device, a time offset between the first device and the second device based on the first timestamp information, the eighth timestamp information, the ninth timestamp information, and the seventh timestamp information; and
  performing time synchronization based on the time offset.

7. The method according to claim 6, further comprising:
  determining, by the second device based on the seventh timestamp information indicating a moment in the Ethernet network at which the first device receives a second packet, wherein the second packet is sent by the access device to the first device in response to the fourth packet.

8. The method according to claim 6, wherein
  the second device uses a second protocol field comprised in the fourth packet to carry the third timestamp information and the fourth timestamp information.

9. The method according to claim 8, wherein the second protocol field is a service data protocol (SDAP) field or a packet data convergence protocol (PDCP) field when the second device is the terminal device.

10. The method according to claim 8, wherein the second protocol field is a general packet radio service (GPRS) tunneling protocol (GTP) field when the second device is the user plane network element.

11. A first device, comprising:
  a memory to store program instructions; and
  a processor coupled to the memory, wherein the program instructions cause the processor to:
  send a first packet to an access device, wherein the first packet carries first timestamp information indicating a moment in an Ethernet network at which the first device sends the first packet;
  determine second timestamp information indicating a moment in a mobile network and at which the first device sends the first packet;
  receive a second packet from the access device, wherein the second packet carries third timestamp information and fourth timestamp information, wherein the third timestamp information is a moment in the mobile network at which a second device receives a third packet sent by the access device to the second device in response to the first packet, wherein the fourth timestamp information is a moment in the mobile network at which the second device sends a fourth packet to the access device, and wherein the second packet is sent by the access device to the first device in response to the fourth packet;
  determine fifth timestamp information and sixth timestamp information, wherein the fifth timestamp information is a moment in the Ethernet network at which the first device receives the second packet, and wherein the sixth timestamp information is a moment in the mobile network at which the first device receives the second packet;
  determine seventh timestamp information based on the second timestamp information, the third timestamp information, the fourth timestamp information, the fifth timestamp information, and the sixth timestamp information; and
  forward the seventh timestamp information to the second device by using the access device, wherein a clock of the second device is synchronized with a clock of the first device based on the seventh timestamp information, wherein
  the first device is a user plane network element and the second device is a terminal device, or the first device is a terminal device and the second device is a user plane network element.

12. The first device according to claim 11, wherein the processor is further to:
  determine a round-trip transmission delay difference between the first device and the second device based on the second timestamp information, the third timestamp information, the fourth timestamp information, and the sixth timestamp information; and
  calculate a sum of the moment corresponding to the fifth timestamp information and the round-trip transmission delay difference, to obtain the seventh timestamp information.

13. The first device according to claim 11, wherein the processor is further to:
  after receiving the second packet from the access device, extract the third timestamp information and the fourth timestamp information that are carried in a first protocol field comprised in the second packet.

14. The first device according to claim 13, wherein the first protocol field is a general packet radio service (GPRS) tunneling protocol (GTP) field when the first device is the user plane network element.

15. The first device according to claim 13, wherein the first protocol field is a service data protocol (SDAP) field or a packet data convergence protocol (PDCP) field when the first device is the terminal device.

16. A second device, comprising:
a memory to store program instructions; and
a processor coupled to the memory, wherein the program instructions cause the processor to:
receive a third packet from an access device, wherein the third packet carries first timestamp information, wherein the first timestamp information is a moment in an Ethernet network at which a first device sends a first packet, and wherein the third packet is sent by the access device in response to the first packet, and wherein the first device is a user plane network element and the second device is a terminal device, or the first device is a terminal device and the second device is a user plane network element;
determine third timestamp information and eighth timestamp information, wherein the third timestamp information is a moment in a mobile network at which the second device receives the third packet, and wherein the eighth timestamp information is a moment in the Ethernet network at which the second device receives the third packet; and
send a fourth packet to the access device, wherein the fourth packet carries the third timestamp information and fourth timestamp information, and wherein the fourth timestamp information is a moment in the mobile network at which the second device sends the fourth packet to the access device;
determine ninth timestamp information indicating a moment in the Ethernet network at which the second device sends the fourth packet to the access device;
receive seventh timestamp information from the access device, wherein a clock of the second device is synchronized with a clock of the first device based on the seventh timestamp information; and
determine a time offset between the first device and the second device based on the first timestamp information, the eighth timestamp information, the ninth timestamp information, and the seventh timestamp information; and
perform time synchronization based on the time offset.

17. The second device according to claim 16, wherein the processor is further to:
determine, based on the seventh timestamp information, a moment that is in the Ethernet network at which the first device receives a second packet, wherein the second packet is sent by the access device to the first device in response to the fourth packet.

18. The second device according to claim 16, wherein the processor is further to:
use a second protocol field comprised in the fourth packet to carry the third timestamp information and the fourth timestamp information when the fourth packet carries the third timestamp information and the fourth timestamp information.

19. The second device according to claim 18, wherein the second protocol field is a service data protocol (SDAP) field or a packet data convergence protocol (PDCP) field when the second device is the terminal device.

20. The second device according to claim 18, wherein the second protocol field is a general packet radio service (GPRS) tunneling protocol (GTP) field when the second device is the user plane network element.

* * * * *